(12) United States Patent
Fourcade et al.

(10) Patent No.: US 11,465,940 B2
(45) Date of Patent: *Oct. 11, 2022

(54) SINTERED ZIRCON MATERIAL FOR FORMING BLOCK

(71) Applicant: SAINT-GOBAIN CERAMICS & PLASTICS, INC., Worcester, MA (US)

(72) Inventors: Julien P. Fourcade, Shrewsbury, MA (US); David J. Lechevalier, Tokyo (JP); Olivier Citti, Wellesley, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,462

(22) Filed: Apr. 15, 2019

(65) Prior Publication Data

US 2019/0276365 A1 Sep. 12, 2019

Related U.S. Application Data

(63) Continuation of application No. 15/726,886, filed on Oct. 6, 2017, now Pat. No. 10,308,556, which is a
(Continued)

(51) Int. Cl.
*C04B 35/48* (2006.01)
*C03B 17/06* (2006.01)
(Continued)

(52) U.S. Cl.
CPC .......... *C04B 35/481* (2013.01); *C03B 17/064* (2013.01); *C04B 35/62685* (2013.01);
(Continued)

(58) Field of Classification Search
CPC .................................................. C04B 35/481
See application file for complete search history.

(56) References Cited

U.S. PATENT DOCUMENTS 3,972,722 A 8/1976 Holt et al.
4,152,166 A 5/1979 Rogers
(Continued)

FOREIGN PATENT DOCUMENTS

CN 1284487 A 2/2001
CN 101522589 A 9/2009
(Continued)

OTHER PUBLICATIONS

International Search Report and Written Opinion for PCT Application No. PCT/US2015/023497, dated Jun. 30, 2015, 11 pages.

*Primary Examiner* — Karl E Group
(74) *Attorney, Agent, or Firm* — Abel Schillinger, LLP; Robert N. Young

(57) ABSTRACT

A refractory object may include a zircon body that may include at least about 0.1 wt. % and not greater than about 5.5 wt. % of an $Al_2O_3$ containing component for a total weight of the zircon body. The zircon body may further include at least about 25 wt. % and not greater than about 35 wt. % of a $SiO_2$ component for a total weight of the zircon body.

16 Claims, 6 Drawing Sheets

Related U.S. Application Data continuation-in-part of application No. 14/674,263, filed on Mar. 31, 2015, now Pat. No. 9,809,500.

(60) Provisional application No. 61/973,133, filed on Mar. 31, 2014.

(51) Int. Cl.
    *C04B 35/626*     (2006.01)
    *C04B 35/64*     (2006.01)

(52) U.S. Cl.
    CPC ...... *C04B 35/64* (2013.01); *C04B 2235/3208* (2013.01); *C04B 2235/3217* (2013.01); *C04B 2235/3222* (2013.01); *C04B 2235/3224* (2013.01); *C04B 2235/3225* (2013.01); *C04B 2235/3232* (2013.01); *C04B 2235/3248* (2013.01); *C04B 2235/3251* (2013.01); *C04B 2235/3272* (2013.01); *C04B 2235/3287* (2013.01); *C04B 2235/34* (2013.01); *C04B 2235/3418* (2013.01); *C04B 2235/3463* (2013.01); *C04B 2235/604* (2013.01); *C04B 2235/6567* (2013.01); *C04B 2235/72* (2013.01); *C04B 2235/77* (2013.01); *C04B 2235/786* (2013.01); *C04B 2235/80* (2013.01); *C04B 2235/85* (2013.01); *C04B 2235/96* (2013.01); *C04B 2235/9692* (2013.01)

(56) References Cited

U.S. PATENT DOCUMENTS

| | | | |
|---|---|---|---|
| 4,587,225 A | 5/1986 | Tsukuma et al. | |
| 5,332,702 A | 7/1994 | Sempolinksi et al. | |
| 6,121,177 A | 9/2000 | Guigonis et al. | |
| 6,753,089 B2 | 6/2004 | Bryden | |
| 6,974,786 B2 | 12/2005 | Helfinstine et al. | |
| 7,238,635 B2 | 7/2007 | Ames et al. | |
| 8,236,719 B2 | 8/2012 | Citti et al. | |
| 8,258,068 B2 | 9/2012 | Citti et al. | |
| 8,268,742 B2 | 9/2012 | Sato | |
| 8,563,453 B2 | 10/2013 | Tomura et al. | |
| 9,809,500 B2 | 11/2017 | Fourcade et al. | |
| 10,308,556 B2 * | 6/2019 | Fourcade | C04B 35/62685 |
| 2009/0111679 A1 | 4/2009 | Lu | |
| 2010/0028665 A1 | 2/2010 | Lu | |
| 2010/0089098 A1 | 4/2010 | Citti et al. | |
| 2010/0251774 A1 | 10/2010 | Peterson | |
| 2011/0107796 A1 | 5/2011 | Citti et al. | |
| 2012/0141701 A1 | 6/2012 | Fourcade et al. | |
| 2012/0180528 A1 | 7/2012 | Ketcham et al. | |
| 2012/0227445 A1 | 9/2012 | Citti et al. | |
| 2013/0210606 A1 | 8/2013 | Tomura | |
| 2013/0225390 A1 | 8/2013 | Ellison et al. | |
| 2015/0274599 A1 | 10/2015 | Fourcade et al. | |
| 2018/0093924 A1 * | 4/2018 | Fourcade | C04B 35/64 |

FOREIGN PATENT DOCUMENTS

| | | | |
|---|---|---|---|
| CN | 101663254 A | | 3/2010 |
| CN | 102007089 A | | 4/2011 |
| CN | 103153909 A | | 6/2013 |
| CN | 103328387 A | | 9/2013 |
| JP | S61132559 A | | 6/1986 |
| JP | S61141667 A | | 6/1986 |
| JP | 2011502918 A | | 1/2011 |
| JP | 2011516396 A | | 5/2011 |
| JP | 2014502249 A | | 1/2014 |
| KR | 20110004871 A | | 1/2011 |
| RU | 2107674 C1 | | 3/1998 |
| RU | 2440952 C1 | * | 1/2012 |
| UA | 37213 C2 | | 5/2001 |
| WO | 2014127369 A1 | | 8/2014 |
| WO | 2015153551 A1 | | 10/2015 |

\* cited by examiner

SINTERED ZIRCON MATERIAL FOR FORMING BLOCK

CROSS-REFERENCE TO RELATED APPLICATIONS

The present application is a Continuation of U.S. patent application Ser. No. 15/726,886, filed on Oct. 6, 2017, entitled "SINTERED ZIRCON MATERIAL FOR FORMING BLOCK," naming as inventors Julien P. Fourcade et al., now U.S. Pat. No. 10,308,556, which is a Continuation-in-Part of U.S. patent application Ser. No. 14/674,263, filed on Mar. 31, 2015, entitled "SINTERED ZIRCON MATERIAL FOR FORMING BLOCK," naming as inventors Julien P. Fourcade et al., now U.S. Pat. No. 9,809,500 which claims priority to U.S. Provisional Patent Application No. 61/973,133, filed on Mar. 31, 2014, entitled "SINTERED ZIRCON MATERIAL FOR FORMING BLOCK," naming as inventors Julien P. Fourcade et al., which applications are assigned to the current assignee hereof and incorporated herein by reference in their entireties.

FIELD OF THE DISCLOSURE

The present disclosure is generally directed to zircon refractory objects and methods of forming and using zircon refractory objects.

BACKGROUND

High strain point alkali free alumino-silicate glasses, such as, glasses for ultra high resolution Liquid Crystal Display (LCD) substrates using amorphous silicon or oxide thin film transistors (TFTs), or glasses for organic light emitting diode (OLED) substrates using low temperature polysilicon (LTPS) TFT deposition have been designed to allow high temperature processing of the TFT (up to 700° C.) while not suffering from deformation. These glasses can be formed using a fusion draw process where liquid glass flows over the lips of a glass overflow forming block made of zircon ($ZrSiO_4$) material and fuses at the bottom of the glass overflow forming block to form a sheet. Zircon forming blocks that come in contact with alkali free alumino-borosilicate glasses offer good corrosion resistance and mechanical properties at the forming temperature of glass. However, the forming of these higher strain point alkali free aluminosilicate glasses is more demanding on the forming blocks because of the higher forming temperature (between +30 and 120° C.). The higher forming temperature can increase the rate of reaction between the glass and the zircon materials leading to higher formation of bubbles in the glass with current zircon materials which is not acceptable for the ultra high resolution TFT substrate applications. Secondly, the higher forming temperature activates the creep deformation rate of the zircon material leading to higher sag of the forming blocks (up to 10 times more deformation) that is not acceptable for the forming of these glasses. There's therefore a need for a new range of zircon materials with improved properties at high temperatures.

SUMMARY

According to one aspect of the invention, a refractory object may include a zircon body. The zircon body may include at least about 0.2 wt. % and not greater than about 5.5 wt. % of an $Al_2O_3$ containing component for a total weight of the zircon body. The zircon body may further include at least about 25 wt. % and not greater than about 35 wt. % of a $SiO_2$ component for a total weight of the zircon body.

According to another aspect of the invention, a refractory object may include a zircon body. The zircon body may include at least about 0.2 wt. % and not greater than about 5.5 wt. % of an $Al_2O_3$ containing component for a total weight of the zircon body. The zircon body may further include a ratio $CB_{SiO2}/CB_{AlC}$ of at least about 5 and not greater than about 50. $CB_{SiO2}$ may represent a content of a $SiO_2$ component in wt. % for a total weight of the zircon body and $CB_{AlC}$ may represent a total content of the $Al_2O_3$ containing component in wt. % for a total weight of the zircon body.

According to yet another aspect of the invention, a refractory object may include a zircon body. The zircon body may include zircon grains and a free silica intergranular phase present between the zircon grains. The free silica intergranular phase may be distributed substantially uniformly through the zircon body. The zircon body may further include at least about 0.2 wt. % and not greater than about 5.5 wt. % of an $Al_2O_3$ containing component for a total weight of the zircon body. The zircon body may also include at least about 0.1 wt. % and not greater than about 5 wt. % of free silica for a total weight of the zircon body.

According to another aspect of the invention, a refractory object may include a zircon body. The zircon body may include a blistering value of not greater than about 8 bubbles per $mm^2$ as measured with LCD A glass after 8 hours at a temperature of 1200° C.

According to another aspect of the invention, a refractory object may include a zircon body. The zircon body may include a blistering value of not greater than about 1 bubble per $mm^2$ as measured with LCD A glass after 360 hours at a temperature of 1200° C.

According to still another aspect of the invention, a refractory object may include a zircon body. The zircon body may include a creep deformation rate of not greater than about 1.1 E-04 $h^{-1}$ as measured using a three-point bend test at a temperature of 1350° C. and a stress of 2 MPa.

According to still another aspect of the invention, a refractory object may include a zircon body. The zircon body may include a creep deformation rate of not greater than about 5.0 E-5 $h^{-1}$ as measured using a four-point bend test at a temperature of 1350° C. and a stress of 2 MPa.

According to another aspect of the invention, a refractory object may include a zircon body. The zircon body may be formed from a zircon batch. The zircon batch may include at least about 0.2 wt. % and not greater than about 5.5 wt. % of an $Al_2O_3$ containing component for a total weight of the zircon body. The zircon batch may further include at least about 0.1 wt. % and not greater than about 5 wt. % of free silica for a total weight of the zircon batch.

According to yet another aspect of the invention, a method of forming a refractory object may include providing a zircon batch. The zircon batch may include at least about 0.2 wt. % and not greater than about 5.5 wt. % of an $Al_2O_3$ containing component for a total weight of the zircon body. The zircon batch may further include at least about 0.1 wt. % and not greater than about 5 wt. % of free silica for a total weight of the zircon batch. The method of forming the refractory object may further include forming the zircon batch into a zircon body.

BRIEF DESCRIPTION OF THE DRAWINGS

The present disclosure may be better understood, and its numerous features and advantages made apparent to those skilled in the art by referencing the accompanying drawings. Embodiments are illustrated by way of example and are not limited in the accompanying figures.

Figure 1:
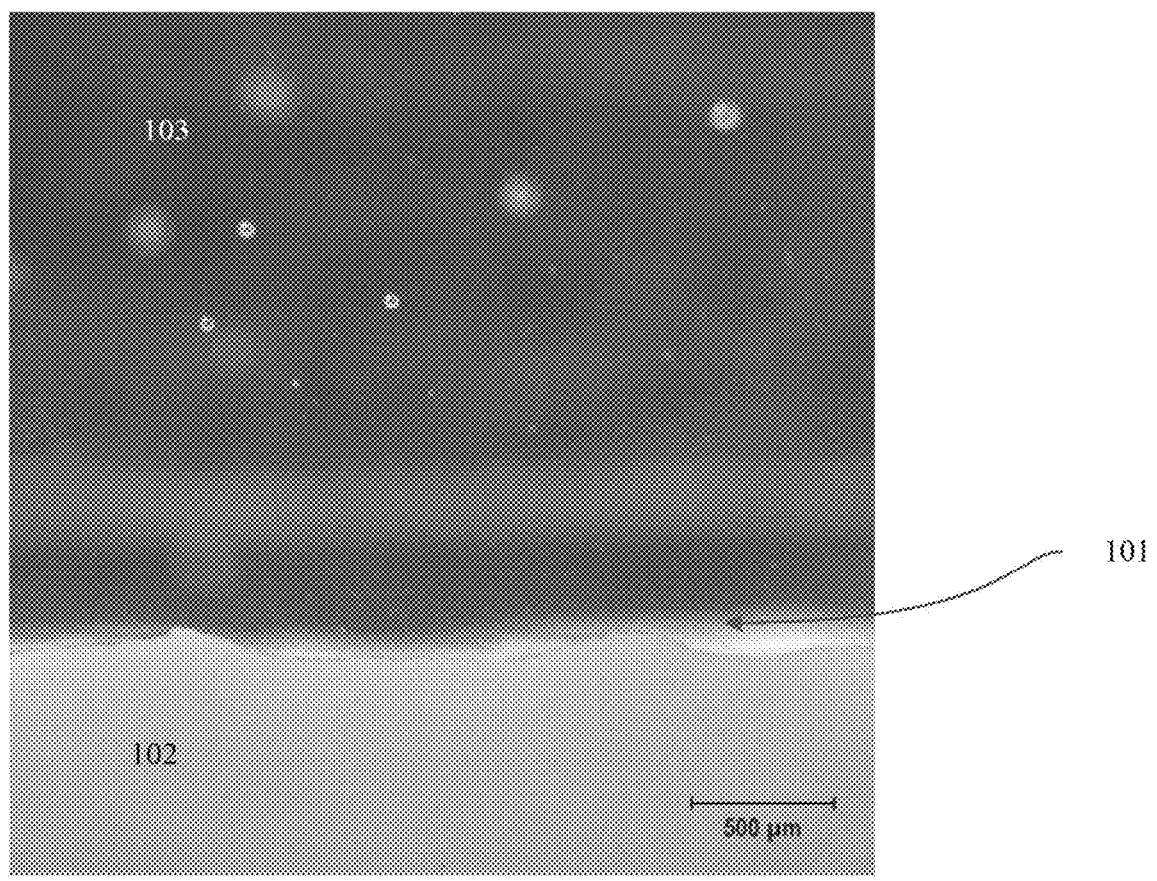
FIG. 1 includes a cross-sectional image of the interface between the surface of a zircon material formed according to embodiments described herein and a glass layer after a blistering test is conducted.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DESCRIPTION

The following is generally directed to a refractory object having a zircon body and a method of forming a refractory object having a zircon body. Notably, a zircon body may be defined as the body of a refractory object formed according to embodiments described herein, such that a majority of the composition of the zircon body is a zircon material (i.e., the zircon body may include a content of zircon of at least about 50 wt. % for a total weight of the zircon body). The zircon body may further include an $Al_2O_3$ containing component and a $SiO_2$ component.

According to a particular embodiment, the method of forming a refractory object having a zircon body in accordance with embodiments described herein may include providing a zircon batch and the forming the zircon batch into the zircon body of the refractory object.

The zircon batch may include a mixture of raw material powder used in forming the zircon body. This raw material powder may initially include an unprocessed raw material, for example, unprocessed zircon material (i.e., sand), $Al_2O_3$ containing material and a $SiO_2$ containing material. The unprocessed raw material may be initially processed by separating undesired components (e.g., impurities) from the unprocessed raw material. The unprocessed raw material may be processed using classifying techniques, for example, particle size separation, vibration or gravity table separation, electrostatic separation, electromagnetic separation or any combination thereof. Particle size separation allows for separation of particles within a powder based on its size, which reduces impurity content. Vibration or gravity table separation can separate particles within a powder based on density, which can reduce the amount of alumina rich silicates as well as silica grains from the raw material powder. Electrostatic separation can separate particles within a powder based on electrical conductivity, which may allow the separation of titaniferous mineral particles, ilmenite and rutile. Electromagnetic separation can separate particles within a powder based on the magnetic properties of the particles. It will be appreciated that initial processing of the unprocessed raw material may include any combination of the separation methods noted above and may include multiple applications of any of the separation methods noted above. It will be further appreciated that initial processing of the unprocessed raw material may include application of the separation methods above in sequence or in parallel.

Providing the zircon batch may include combining or mixing the raw material powder and any additional materials (i.e., sintering aids, binders, other additives, etc.) by any suitable method. Mixing or batch preparation may be performed dry or wet. Mixing may include an addition step of granulation. The granulation step may be added to improve flowability of the batch and therefore increase apparent density of the green body. In one example embodiment, granulation may be performed using spray drying. The raw material powders may be mixed into a blunge tank and then spray dried.

Forming the zircon batch into the zircon body may include shaping the spray dried powder or batch to form a green body having a particular shape using isostatic pressing. The spray dried powder forms a highly flowable powder that can be used to fill large isostatic molding cans to minimize filling defects, such as, non-uniform compaction of green density, voids or cracks. The raw material powder is filled into a rubber mold maintained in a solid metallic can. The bag is then sealed and a vacuum is applied to the raw material powder. The can is then submerged into a pressure vessel filled with a fluid and then pressed. After pressing, the mold is removed from the pressure vessel and the green body is removed.

Shaping may occur at a particular pressure, for example, by isostatic pressing at a pressure at least about 50 MPa, such as, at least about 60 MPa, at least about 70 MPa, at least about 80 MPa, at least about 90 MPa, at least about 100 MPa, at least about 110 MPa, at least about 120 MPa, at least about 130 MPa, at least about 140 MPa or even at least about 150 MPa. The pressure may be applied step by step to the green body using an isostatic pressing cycle lasting for about 10 minutes to about 120 minutes. These pressing cycles may limit formation of defects during the pressing stage. Shaping may also be performed using alternative techniques such as slip casting or unidirectional pressing.

The shape of the green body can be rectilinear, cylindrical, spherical, ellipsoidal or nearly any other shape. In a particular embodiment, the green body can be in the shape of a rectilinear block referred to as a blank that can subsequently be machined to form a glass overflow trough, a spout lip or a bushing block. In another particular embodiment, the green body may have at least one dimension larger than about 100 mm, such as, larger than about 200 mm, larger than about 300 mm, larger than about 400 mm, larger than about 500 mm, larger than about 600 mm, larger than about 700 mm or even larger than about 800 mm. In another embodiment, the green body can be structured in such a fashion to more closely match a final component, for example, a forming block, to limit post forming processes.

Figure 5:
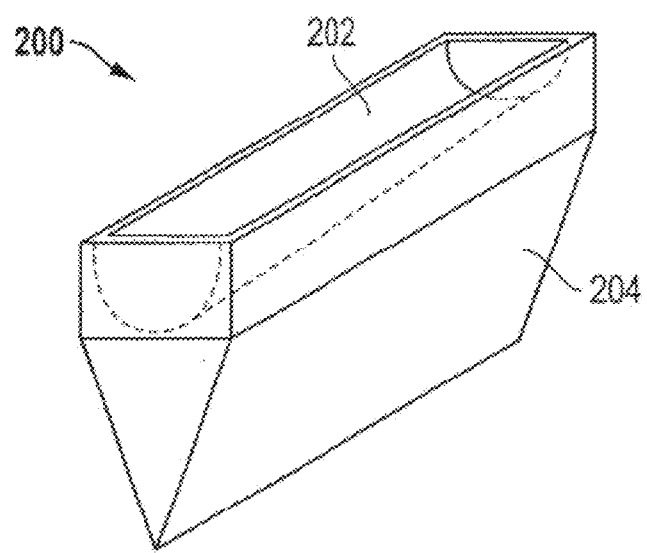
FIG. 5 includes a diagram illustrating a particular embodiment of a glass overflow forming block.
Figure 6:
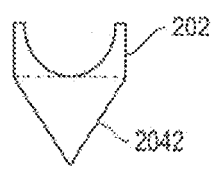
FIG. 6 includes a diagram illustrating a particular set of various cross-sectional perspectives of glass overflow forming blocks.
Figure 6:
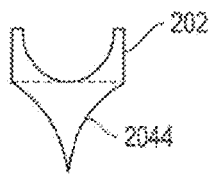
Figure 6:
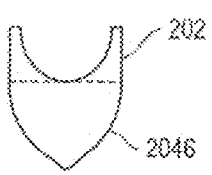

FIG. 5 illustrates a forming block 200. The forming block 200 can include an overflow trough portion 202 and a tapered portion 204. The overflow trough portion 202 can include a trough that has a depth that decreases along a length of the forming block 200. FIG. 6 includes a cross-sectional view of exemplary shapes of the tapered portion 204. More particularly, the tapered portion can include a wedge shape 2042, a concave shape 2044, or a convex shape 2046. Other shapes may be used to meet the needs or desires for a particular application.

After the green body is formed, the green body can be heated in an oven, heater, furnace, or the like to form the body that includes zircon material. The heating process can include an initial heating where moisture, a solvent, or another volatile component is evaporated, organic material is vaporized, or any combination thereof. The initial heating can be conducted at a temperature in a range of approximately 100° C. to approximately 300° C. for a time period in a range of approximately 10 hours to approximately 200 hours. In one embodiment, following the initial heating, the green body can be sintered at a temperature of at least about 1450° C., such as, at least about 1500° C., at least about 1550° C. or even at least about 1600° C. In another embodiment, following the initial heating, the green body can be sintered at a temperature of not greater than about 1650° C., such as, not greater than about 1600° C., not greater than about 1600° C., not greater than about 1550° C. or even not greater than about 1500° C. The green body can be sintered for a time period in a range of approximately 10 hours to approximately 100 hours to form the body.

Sintering can include heating the green body up to a sintering temperature at a particular heating rate for multiple time periods in a sintering cycle for a set duration and then cooling the sintered body at a particular cooling-rate.

According to one particular embodiment, the heating rate may be at least about 1° C./h, such as, at least about 3° C./h, at least about 5° C./h, at least about 8° C./h, at least about 10° C./h, at least about 13° C./h, at least about 15° C./h, at least about 18° C./h, at least about 20° C./h, at least about 23° C./h, at least about 25° C./h, at least about 28° C./h or even at least about 29° C./h. According to still other embodiments, the heating rate may be not greater than about 30° C./h, such as, not greater than about 27° C./h, not greater than about 25° C./h, not greater than about 22° C./h, not greater than about 20° C./h, not greater than about 17° C./h, not greater than about 15° C./h, not greater than about 12° C./h, not greater than about 10° C./h, not greater than about 7° C./h, not greater than about 5° C./h or even not greater than about 2° C./h. It will be appreciated that the heating rate may be any value between any of the minimum and maximum values noted above. It will be further appreciated that the heating rate may be any value within a range between any of the maximum and minimum values noted above.

According to still another embodiment, the duration of the sintering cycle may be at least about 15 days, such as, at least about 35 days, at least about 40 days, at least about 45 days, at least about 50 days, at least about 55 days, at least about 60 days, at least about 65 days, at least about 70 days, at least about 75 days, at least about 80 days or even at least about 85 days. Further, the sintering cycle duration may be not greater than about 90 days, such as, not greater than about 85 days, not greater than about 80 days, not greater than about 75 days, not greater than about 70 days, not greater than about 65 days, not greater than about 60 days, not greater than about 55 days, not greater than about 50 days, not greater than about 45 days or even not greater than about 30 days. It will be appreciated that the duration of the sintering cycle may be any value between any of the minimum and maximum values noted above. It will be further appreciated that the duration of the sintering cycle may be any value within a range between any of the maximum and minimum values noted above.

According to one particular embodiment, the cooling rate may be at least about 1° C./h, such as, at least about 3° C./h, at least about 5° C./h, at least about 8° C./h, at least about 10° C./h, at least about 13° C./h, at least about 15° C./h, at least about 18° C./h, at least about 20° C./h, at least about 23° C./h, at least about 25° C./h, at least about 28° C./h or even at least about 29° C./h. According to still other embodiments, the heating rate may be not greater than about 30° C./h, such as, not greater than about 27° C./h, not greater than about 25° C./h, not greater than about 22° C./h, not greater than about 20° C./h, not greater than about 17° C./h, not greater than about 15° C./h, not greater than about 12° C./h, not greater than about 10° C./h, not greater than about 7° C./h, not greater than about 5° C./h or even not greater than about 2° C./h. It will be appreciated that the cooling rate may be any value between any of the minimum and maximum values noted above. It will be further appreciated that the cooling rate may be any value within a range between any of the maximum and minimum values noted above.

The shape of the body after sintering generally corresponds to the shape of the green body prior to sintering. Thus, the body may have any of the shapes as previously described with respect to the green body. During sintering, some shrinkage may occur, and the body may be smaller than the green body.

After initial processing and milling, the raw material powder in the zircon batch may include zircon grains that may have a particular median (D50) particle size. For example, the zircon grains may have a median (D50) particle size of not greater than about 15 µm, such as, not greater than about 14 µm, not greater than about 12 µm, not greater than about 10 µm, not greater than about 9, µm, not greater than about 8 µm, not greater than about 7 µm, not greater than about 6 µm, not greater than about 5 µm, not greater than about 4 µm, not greater than about 3 µm or even not greater than about 2 µm. According to still other examples, the zircon grains may have a median (D50) particle size of at least about 1 µm, such as, at least about 2 µm, at least about 3, µm, at least about 4 µm, at least about 5 µm, at least about 6 µm, at least about 7 µm, at least about 8 µm, at least about 9 µm, at least about 10 µm, at least about 12 µm or even at least about 14 µm. It will be appreciated that the zircon grains may have a median (D50) particle size of any value between any of the minimum and maximum values noted above. It will be further appreciated that the zircon grains may have a median (D50) particle size of any value within a range between any of the maximum and minimum values noted above.

According to still other embodiments, the raw material powder in the zircon batch may have a particle size distribution controlled such that the zircon grains have a particular D90 particle size. For example, the zircon grains may have a D90 particle size of not greater than about 40 µm, such as, not greater than about 30 µm, not greater than about 20 µm, not greater than about 15 µm or even not greater than about 10 µm. In still other instances, the zircon grains may have a D90 particle size of at least about 5 µm, such as, at least about 10 µm, at least about 15 µm, at least about 20 µm or even at least about 30 µm. It will be appreciated that the zircon grains may have a D90 particle size of any value between any of the minimum and maximum values noted above. It will be further appreciated that the zircon grains may have a D90 particle size of any value within a range between any of the maximum and minimum values noted above.

According to still other embodiments, the raw material powder in the zircon batch may have a particle size distribution controlled such that the zircon grains have a particular D10 particle size. For example, the zircon grains may have a D10 particle size of at least about 0.2 µm, such as, at least about 0.5 µm, at least about 0.8 µm or even at least about 1.0 µm. In still other instances, the raw material powder may have a D10 particle size of not greater than about 1.1 µm, such as, not greater than about 1.0 µm, not greater than about 0.8 µm or even not greater than about 0.5 µm. It will be appreciated that the raw material powder may have a D10 particle size of any value within a range between any of the maximum and minimum values noted above. It will be further appreciated that the raw material powder may have a D10 particle size of any value within a range between any of the maximum and minimum values noted above.

According to still another embodiment, the raw material powder in the zircon batch may have a wide particle size distribution. According to still other embodiments, the raw material powder in the zircon batch may have a non-Gaussian particle size distribution. According to a particular embodiment, the non-Gaussian particle size distribution of the raw material powder may include distributions using at least two different average particle sizes. One such distribution can be a bimodal particle size distribution. In particular instances, it may be suitable to select at least one particle size that is significantly larger than another particle size. As will be further appreciated, a greater number of modes, such as, three, four, or more may be employed when forming the selected non-Gaussian particle size distribution for the raw material powder in the zircon batch. According to still other embodiments, the wide-particle size distribution may not necessarily include the selection and combining of two (or more) separate particle sizes, but the creation of a particular broad particle size distribution having a uniformity of representative particle sizes across the full range of the distribution.

The zircon batch may include a particular content of zircon. For example, zircon batch may include a content of zircon of at least about 50 wt. % for a total weight of the zircon batch, such as, at least about 52 wt. %, at least about 53 wt. %, at least about 54 wt. %, at least about 55 wt. %, at least about 56 wt. %, at least about 57 wt. %, at least about 57.5 wt. %, at least about 58 wt. %, at least about 58.5 wt. %, at least about 59 wt. %, at least about 59.5 wt. %, at least about 60 wt. %, at least about 60.5 wt. %, at least about 61 wt. %, at least about 61.5, wt. %, at least about 62 wt. %, at least about 62.5 wt. %, at least about 63 wt. %, at least about 62.5 wt. %, at least about 64 wt. %, at least about 64.5 wt. %, at least about five wt. %, at least about 65.5 wt. %, at least about 66 wt. %, at least about 66.5 wt. %, at least about 67 wt. %, at least about 68 wt. %, at least about 69 wt. %, at least about 70 wt. %, at least about 75 wt. %, at least about 80 wt. %, at least about 85 wt. %, at least about 90 wt. % or even at least about 95 wt. %. According to still another embodiment, the zircon batch may include a content of zircon of not greater than about 99 wt. % for total weight of the zircon batch, such as, not greater than about 95 wt. %, not greater than about 90 wt. %, not greater than about 85 wt. %, not greater than about 80 wt. %, not greater than about 75 wt. %, not greater than about 70 wt. %, not greater than about 69 wt. %, not greater than about 68 wt. %, not greater than about 67 wt. %, not greater than about 66.5 wt. %, not greater than about 66 wt. %, at least about 66.5 wt. %, not greater than about 65 wt. %, not greater than about 64.5 wt. %, not greater than about 64 wt. %, not greater than about 63.5 wt. %, not greater than about 53 wt. %, not greater than about 62.5 wt. %, not greater than about 62 wt. %, not greater than about 61.5 wt. %, not greater than about 61 wt. %, not greater than about 60.5 wt. %, not greater than about 60 wt. %, not greater than about 59.5 wt. %, not greater than about 59 wt. %, not greater than about 58 wt. %, not greater than about 58 wt. %, not greater than about 57 wt. %, not greater than about 57 wt. %, not greater than about 56 wt. %, not greater than about 55 wt. %, not greater than about 54 wt. %, not greater than about 53 wt. %, not greater than about 52 wt. % or even not greater than about 51 wt. %. It will be appreciated that the content of zircon in wt. % for the total weight of the zircon batch may be any value between any of the minimum and maximum values noted above. It will be further appreciated that the content of zircon in wt. % for the total weigh of the zircon batch may be within a range between any of the minimum and maximum values noted above.

According to another particular embodiment, the zircon batch may include a particular content of $Al_2O_3$ containing component. For example, the zircon batch may include not greater than about 4.9 wt. % of the $Al_2O_3$ containing component for a total weight of the zircon batch, such as, not greater than about 4.8 wt. % of the $Al_2O_3$ containing component, not greater than about 4.7 wt. % of the $Al_2O_3$ containing component, not greater than about 4.6 wt. % of the $Al_2O_3$ containing component, not greater than about 4.5 wt. % of the $Al_2O_3$ containing component, not greater than about 4.4 wt. % of the $Al_2O_3$ containing component, not greater than about 4.3 wt. % of the $Al_2O_3$ containing component, not greater than about 4.2 wt. % of the $Al_2O_3$ containing component, not greater than about 4.1 wt. % of the $Al_2O_3$ containing component, not greater than about 4.0 wt. % of the $Al_2O_3$ containing component, not greater than about 3.9 wt. % of the $Al_2O_3$ containing component, not greater than about 3.8 wt. % of the $Al_2O_3$ containing component, not greater than about 3.7 wt. % of the $Al_2O_3$ containing component, not greater than about 3.6 wt. % of the $Al_2O_3$ containing component or even not greater than about 3.5 wt. % of the $Al_2O_3$ containing component. According to still another embodiment, the zircon batch may include at least about 0.2 wt. % of the $Al_2O_3$ containing component for a total weight of the zircon batch, such as, at least about 0.5 wt. % of the $Al_2O_3$ containing component, at least about 1.0 wt. % of the $Al_2O_3$ containing component, at least about 1.5 wt. % of the $Al_2O_3$ containing component, at least about 1.6 wt. % of the $Al_2O_3$ containing component, at least about 1.7 wt. % of the $Al_2O_3$ containing component, at least about 1.8 wt. % of the $Al_2O_3$ containing component, at least about 1.9 wt. % of the $Al_2O_3$ containing component, at least about 2.0 wt. % of the $Al_2O_3$ containing component, at least about 2.1 wt. % of the $Al_2O_3$ containing component, at least about 2.2 wt. % of the $Al_2O_3$ containing component, at least about 2.3 wt. % of the $Al_2O_3$ containing component, at least about 2.4 wt. % of the $Al_2O_3$ containing component, at least about 2.5 wt. % of the $Al_2O_3$ containing component, at least about 2.6 wt. % of the $Al_2O_3$ containing component, at least about 2.7 wt. % of the $Al_2O_3$ containing component, at least about 2.8 wt. % of the $Al_2O_3$ containing component, at least about 2.9 wt. % of the $Al_2O_3$ containing component, at least about 3.0 wt. % of the $Al_2O_3$ containing component or even at least about 3.1 wt. % of the $Al_2O_3$ containing component. It will be appreciated that the content of $Al_2O_3$ containing component in wt. % for the total weight of the zircon batch may be any value between any of the minimum and maximum values noted above. It will be further appreciated that the content of $Al_2O_3$ containing component in wt. % for the total weigh of the zircon batch may be within a range between any of the minimum and maximum values noted above.

According to another particular embodiment, the $Al_2O_3$ containing component in the zircon batch may include alumina. According to still another embodiment, the $Al_2O_3$ containing component in the zircon batch may include a particular content of alumina. For example, the $Al_2O_3$ containing component in the zircon batch may include at least about 1 wt. % alumina for a total weight of the $Al_2O_3$ containing component, such as, at least about 2 wt. % alumina, at least about 5 wt. % alumina, at least about 10 wt. % alumina, at least about 15 wt. % alumina, at least about 20 wt. % alumina, at least about 25 wt. % alumina, at least about 30 wt. % alumina, at least about 35 wt. % alumina, at least about 40 wt. % alumina, at least about 45 wt. % alumina, at least about 50 wt. % alumina, at least about 55 wt. % alumina, at least about 60 wt. % alumina, at least about 65 wt. % alumina, at least about 70 wt. % alumina, at least about 75 wt. % alumina, at least about 80 wt. % alumina, at least about 85 wt. % alumina, at least about 90 wt. % alumina, at least about 95 wt. % alumina or the $Al_2O_3$ containing component may even consists essentially of alumina. It will be appreciated that content of alumina in the $Al_2O_3$ containing component in the zircon batch may be any value or at least about any value between any of the values noted above.

According to another particular embodiment, the $Al_2O_3$ containing component in the zircon batch may include corundum. According to still another embodiment, the $Al_2O_3$ containing component in the zircon batch may include a particular content of corundum. For example, the $Al_2O_3$ containing component in the zircon batch may include at least about 1 wt. % corundum for a total weight of the $Al_2O_3$ containing component, such as, at least about 2 wt. % corundum, at least about 5 wt. % corundum, at least about 10 wt. % corundum, at least about 15 wt. % corundum, at least about 20 wt. % corundum, at least about 25 wt. % corundum, at least about 30 wt. % corundum, at least about 35 wt. % corundum, at least about 40 wt. % corundum, at least about 45 wt. % corundum, at least about 50 wt. % corundum, at least about 55 wt. % corundum, at least about 60 wt. % corundum, at least about 65 wt. % corundum, at least about 70 wt. % corundum, at least about 75 wt. % corundum, at least about 80 wt. % corundum, at least about 85 wt. % corundum, at least about 90 wt. % corundum, at least about 95 wt. % corundum or the $Al_2O_3$ containing component may even consists essentially of corundum. It will be appreciated that content of corundum in the $Al_2O_3$ containing component in the zircon batch may be any value or at least about any value between any of the values noted above.

According to still another embodiment, the $Al_2O_3$ containing component in the zircon batch may include a particular content of a crystallographic form of alumina (i.e., bohemite, etc.). For example, the $Al_2O_3$ containing component in the zircon batch may include at least about 1 wt. % of a crystallographic form of alumina for a total weight of the $Al_2O_3$ containing component, such as, at least about 2 wt. % of a crystallographic form of alumina, at least about 5 wt. % of a crystallographic form of alumina, at least about 10 wt. % of a crystallographic form of alumina, at least about 15 wt. % of a crystallographic form of alumina, at least about 20 wt. % of a crystallographic form of alumina, at least about 25 wt. % of a crystallographic form of alumina, at least about 30 wt. % of a crystallographic form of alumina, at least about 35 wt. % of a crystallographic form of alumina, at least about 40 wt. % of a crystallographic form of alumina, at least about 45 wt. % of a crystallographic form of alumina, at least about 50 wt. % of a crystallographic form of alumina, at least about 55 wt. % of a crystallographic form of alumina, at least about 60 wt. % of a crystallographic form of alumina, at least about 65 wt. % of a crystallographic form of alumina, at least about 70 wt. % of a crystallographic form of alumina, at least about 75 wt. % of a crystallographic form of alumina, at least about 80 wt. % of a crystallographic form of alumina, at least about 85 wt. % of a crystallographic form of alumina, at least about 90 wt. % of a crystallographic form of alumina, at least about 95 wt. % of a crystallographic form of alumina or the $Al_2O_3$ containing component may even consists essentially of a crystallographic form of alumina. It will be appreciated that content of a crystallographic form of alumina in the $Al_2O_3$ containing component in the zircon batch may be any value or at least about any value between any of the values noted above.

According to a particular embodiment, the $Al_2O_3$ containing component in the zircon batch may include mullite. According to still another embodiment, the $Al_2O_3$ containing component in the zircon batch may include a particular content of mullite. For example, the $Al_2O_3$ containing component in the zircon batch may include at least about 1 wt. % mullite for a total weight of the $Al_2O_3$ containing component, such as, at least about 2 wt. % mullite, at least about 5 wt. % mullite, at least about 10 wt. % mullite, at least about 15 wt. % mullite, at least about 20 wt. % mullite, at least about 25 wt. % mullite, at least about 30 wt. % mullite, at least about 35 wt. % mullite, at least about 40 wt. % mullite, at least about 45 wt. % mullite, at least about 50 wt. % mullite, at least about 55 wt. % mullite, at least about 60 wt. % mullite, at least about 65 wt. % mullite, at least about 70 wt. % mullite, at least about 75 wt. % mullite, at least about 80 wt. % mullite, at least about 85 wt. % mullite, at least about 90 wt. % mullite, at least about 95 wt. % mullite or the $Al_2O_3$ containing component may even consists essentially of mullite. It will be appreciated that the content of mullite in the $Al_2O_3$ containing component in the zircon batch may be any value or may be at least about any value between any of the values noted above.

According to still another embodiment, the mullite in the zircon batch may include $Al_6Si_2O_{13}$. According to still another embodiment, the mullite in the zircon batch may include a particular content of $Al_6Si_2O_{13}$. For example, the mullite in the zircon batch may include at least about 1 wt. % $Al_6Si_2O_{13}$ for a total weight of the mullite, such as, at least about 2 wt. % $Al_6Si_2O_{13}$, at least about 5 wt. % $Al_6Si_2O_{13}$, at least about 10 wt. % $Al_6Si_2O_{13}$, at least about 15 wt. % $Al_6Si_2O_{13}$, at least about 20 wt. % $Al_6Si_2O_{13}$, at least about 25 wt. % $Al_6Si_2O_{13}$, at least about 30 wt. % $Al_6Si_2O_{13}$, at least about 35 wt. % $Al_6Si_2O_{13}$, at least about 40 wt. % $Al_6Si_2O_{13}$, at least about 45 wt. % $Al_6Si_2O_{13}$, at least about 50 wt. % $Al_6Si_2O_{13}$, at least about 55 wt. % $Al_6Si_2O_{13}$, at least about 60 wt. % $Al_6Si_2O_{13}$, at least about 65 wt. % $Al_6Si_2O_{13}$, at least about 70 wt. % $Al_6Si_2O_{13}$, at least about 75 wt. % $Al_6Si_2O_{13}$, at least about 80 wt. % $Al_6Si_2O_{13}$, at least about 85 wt. % $Al_6Si_2O_{13}$, at least about 90 wt. % $Al_6Si_2O_{13}$, at least about 95 wt. % $Al_6Si_2O_{13}$ or the mullite in the zircon batch may even consists essentially of $Al_6Si_2O_{13}$. It will be appreciated that the content of $Al_6Si_2O_{13}$ in mullite in the zircon batch may be any value or may be at least about any value between any of the values noted above.

According to yet another particular embodiment, the $Al_2O_3$ containing component may include an aluminosilicate species. According to still another embodiment, the aluminosilicate species may include at least one of a non-stoichiometric mullite, stoichiometric mullite, and a combination thereof. According to still another embodiment, the $Al_2O_3$ containing component may include a combination of an aluminate species and an aluminosilicate species. According to yet another embodiment, the aluminosilicate species is present in a greater content than the aluminate species. According to another particular embodiment, the zircon batch may include a particular content a $SiO_2$ component. The $SiO_2$ component may include the combination of $SiO_2$ added to the zircon batch as part of the zircon material, $SiO_2$ added to the zircon batch as part of the $Al_2O_3$ containing component and the $SiO_2$ added to the zircon batch as free silica. Free silica may be defined as $SiO_2$ that is not bonded as part of the crystalline form of the zircon material or the $Al_2O_3$ containing component. For example, the zircon batch may include not greater than about 34.5 wt. % of a $SiO_2$ component for a total weight of the zircon batch, not greater than about 33 wt. % of a $SiO_2$ component, not greater than about 32.5 wt. % of a $SiO_2$ component, not greater than about 32 wt. % of a $SiO_2$ component, not greater than about 31.5 wt. % of a $SiO_2$ component, not greater than about 30 wt. % of a $SiO_2$ component, not greater than about 29.5 wt. % of a $SiO_2$ component, not greater than about 29 wt. % of a $SiO_2$ component, not greater than about 28.5 wt. % of a $SiO_2$ component, not greater than about 28 wt. % of a $SiO_2$ component, not greater than about 27.5 wt. % of a $SiO_2$ component, not greater than about 27 wt. % of a $SiO_2$ component or even greater than about 26.5 wt. % of a $SiO_2$ component. According to still another embodiment, the zircon batch may include at least about 25.5 wt. % of a $SiO_2$ component for a total weight of the zircon batch, at least about 26 wt. % of a $SiO_2$ component, at least about 26.5 wt. % of a $SiO_2$ component, at least about 27 wt. % of a $SiO_2$ component, at least about 27.5 wt. % of a $SiO_2$ component, at least about 28 wt. % of a $SiO_2$ component, at least about 28.5 wt. % of a $SiO_2$ component, at least about 29 wt. % of a $SiO_2$ component, at least about 29.5 wt. % of a $SiO_2$ component, at least about 30 wt. % of a $SiO_2$ component, at least about 30.5 wt. % of a $SiO_2$ component, at least about 31 wt. % of a $SiO_2$ component, at least about 31.5 wt. % of a $SiO_2$ component, at least about 32 wt. % of a $SiO_2$ component, at least about 32.5 wt. % of a $SiO_2$ component, at least about 33 wt. % of a $SiO_2$ component, at least about 33.5 wt. % of a $SiO_2$ component, about 34 wt. % of a $SiO_2$ component or even at least about 34.5 wt. % of a $SiO_2$ component. It will be appreciated that the content of a $SiO_2$ component in wt. % for the total weight of the zircon batch may be any value between any of the minimum and maximum values noted above. It will be further appreciated that the content of a $SiO_2$ component in wt. % for the total weigh of the zircon batch may be within a range between any of the minimum and maximum values noted above.

According to still another embodiment, the zircon batch may include a particular content of free silica. For example, the zircon batch may include not greater than about 4.5 wt. % of free silica for a total weight of the zircon batch, such as, not greater than about 4.0 wt. % of free silica, not greater than about 3.9 wt. % of free silica, not greater than about 3.8 wt. % of free silica, not greater than about 3.7 wt. % of free silica, not greater than about 3.6 wt. % of free silica, not greater than about 3.5 wt. % of free silica, not greater than about 3.4 wt. % of free silica, not greater than about 3.3 wt. % of free silica, not greater than about 3.2 wt. % of free silica, not greater than about 3.1 wt. % of free silica, not greater than about 3.0 wt. % of free silica, not greater than about 2.9 wt. % of free silica, not greater than about 2.8 wt. % of free silica, not greater than about 2.7 wt. % of free silica, not greater than about 2.6 wt. % of free silica, not greater than about 2.5 wt. % of free silica, not greater than about 2.4 wt. % of free silica, not greater than about 2.3 wt. % of free silica, not greater than about 2.2 wt. % of free silica, not greater than about 2.1 wt. % of free silica, not greater than about 2.0 wt. % of free silica, not greater than about 1.9 wt. % of free silica, not greater than about 1.8 wt. % of free silica, not greater than about 1.7 wt. % of free silica, not greater than about 1.6 wt. % of free silica, not greater than about 1.5 wt. % of free silica, not greater than about 1.4 wt. % of free silica, not greater than about 1.3 wt. % of free silica, not greater than about 1.2 wt. % of free silica, not greater than about 1.1 wt. % of free silica, not greater than about 1.0 wt. % of free silica or even not greater than about 0.5 wt. % of free silica. According to another particular embodiment, the zircon batch may include at least about 0.1 wt. % of free silica for a total weight of the zircon batch, such as, at least about 0.5 wt. % of free silica, at least about 0.6 wt. % of free silica, at least about 0.7 wt. % of free silica, at least about 0.8 wt. % of free silica, at least about 0.9 wt. % of free silica, at least about 1.0 wt. % of free silica, at least about 1.1 wt. % of free silica, at least about 1.1 wt. % of free silica, at least about 1.2 wt. % of free silica, at least about 1.3 wt. % of free silica, at least about 1.4 wt. % of free silica, at least about 1.5 wt. % of free silica, at least about 1.6 wt. % of free silica, at least about 1.7 wt. % of free silica, at least about 1.8 wt. % of free silica, at least about 1.9 wt. % of free silica, at least about 2.0 wt. % of free silica, at least about 2.1 wt. % of free silica, at least about 2.2 wt. % of free silica, at least about 2.3 wt. % of free silica, at least about 2.4 wt. % of free silica, at least about 2.5 wt. % of free silica, at least about 2.6 wt. % of free silica, at least about 2.7 wt. % of free silica, at least about 2.8 wt. % of free silica, at least about 2.9 wt. % of free silica, at least about 3.0 wt. % of free silica, at least about 3.1 wt. % of free silica, at least about 3.2 wt. % of free silica, at least about 3.3 wt. % of free silica, at least about 3.4 wt. % of free silica, at least about 3.5 wt. % of free silica, at least about 3.6 wt. % of free silica, at least about 3.7 wt. % of free silica, at least about 3.8 wt. % of free silica, at least about 3.9 wt. % of free silica, at least about 4.0 wt. % of free silica or even at least about 4.5 wt. % of free silica. It will be appreciated that the content of free silica in wt. % for the total weight of the zircon batch may be any value between any of the minimum and maximum values noted above. It will be further appreciated that the content of free silica in wt. % for the total weigh of the zircon batch may be within a range between any of the minimum and maximum values noted above.

According to still another embodiment, the zircon batch may include a particular ratio $CM_{SiO2}/CM_{AlC}$. $CM_{SiO2}$ may represent a content of the $SiO_2$ component in wt. % for a total weight of the zircon batch and $CM_{AlC}$ may represent a content of $Al_2O_3$ containing component in wt. % for a total weight of the zircon batch. For example, the zircon batch may have a ratio $CM_{SiO2}/CM_{AlC}$ of at least about 5, such as, at least about 8, at least about 10, at least about 13, at least about 15, at least about 18, at least about 20, at least about 23, at least about 25, at least about 28, at least about 30, at least about 33, at least about 35, at least about 38, at least about 40, at least about 43, at least about 45 or even at least about 48. According to another embodiment, the zircon batch may include a ratio a ratio $CM_{SiO2}/CM_{AlC}$ of not greater than about 50, such as, not greater than about 47, not greater than about 45, not greater than about 42, not greater than about 40, not greater than about 37, not greater than about 35, not greater than about 32, not greater than about 30, not greater than about 27, not greater than about 20, not greater than about 17, not greater than about 12, not greater than about 10 or even not greater than about 7. It will be appreciated that the ratio $CM_{SiO2}/CM_{AlC}$ may be any value between any of the minimum and maximum values noted above. It will be further appreciated that the $CM_{SiO2}/CM_{AlC}$ may be within a range between any of the minimum and maximum values noted above.

According to still another embodiment, the zircon batch may include a particular ratio $CM_{FS}/CM_{AlC}$. $CM_{FS}$ may represent a content of free silica in wt. % for a total weight of the zircon batch and $CM_{AlC}$ may represent a content of $Al_2O_3$ containing component in wt. % for a total weight of the zircon batch. For example, the zircon batch may have a ratio $CM_{FS}/CM_{AlC}$ of at least about 0.3, such as, at least about 0.5, at least about 0.7, at least about 1.0, at least about 1.3, at least about 1.5, at least about 1.7, at least about 2.0, at least about 2.3, at least about 2.7, at least about 3.0, at least about 3.3, at least about 3.5 or even at least about 3.7. According to another embodiment, the zircon batch may include a ratio a ratio $CM_{FS}/CM_{AlC}$ of not greater than about 3.8, such as, not greater than about 3.5, not greater than about 3.3, not greater than about 3.0, not greater than about 2.8, not greater than about 2.5, not greater than about 2.3, not greater than about 2.0, not greater than about 1.8, not greater than about 1.5, not greater than about 1.3, not greater than about 1.0, not greater than about 0.8 or even not greater than about 0.5. It will be appreciated that the ratio $CM_{FS}/CM_{AlC}$ may be any value between any of the minimum and maximum values noted above. It will be further appreciated that the $CM_{FS}/CM_{AlC}$ may be within a range between any of the minimum and maximum values noted above.

According to still another embodiment, the zircon batch may include a particular ratio $CM_{AlC}/CM_Z$. $CM_{ALC}$ may represent a content of $Al_2O_3$ containing component in wt. % for a total weight of the zircon batch and $CM_Z$ may represent a content of zircon in wt. % for a total weight of the mixture. For example, the zircon batch may include a ratio $CM_{AlC}/CM_Z$ of not greater than about 0.08, such as, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.030, not greater than about 0.025, not greater than about 0.02, not greater than about 0.015 or even not greater than about 0.01. According to still another embodiment, the zircon batch may include a ratio of $CM_{AlC}/CM_Z$ of at least about 0.002, such as, at least about 0.005, at least about 0.01, at least about at least about 0.02, at least about 0.03, at least about 0.035, at least about 0.04, at least about 0.045, at least about 0.05, at least about 0.055, at least about 0.06, at least about 0.065, at least about 0.07, at least about 0.075, at least about 0.08, at least about 0.085 or even at least about 0.09. It will be appreciated that the ratio $CM_{AlC}/CM_Z$ may be any value between any of the minimum and maximum values noted above. It will be further appreciated that the $CM_{AlC}/CM_Z$ may be within a range between any of the minimum and maximum values noted above.

According to yet another particular embodiment, the zircon batch may include a sintering aid, for example, $Ta_2O_5$ or $Yb_2O_3$. According to still another particular embodiment, the zircon batch may include a particular content of a sintering aid. For example, the zircon batch may include not greater than about 5.0 wt. % of a sintering aid for a total weight of the zircon batch, such as, not greater than about 4.5 wt. % of a sintering aid, not greater than about 4.0 wt. % of a sintering aid, not greater than about 3.5 wt. % of a sintering aid, not greater than about 3.0 wt. % of a sintering aid, not greater than about 2.5 wt. % of a sintering aid, not greater than about 2.0 wt. % of a sintering aid, not greater than about 1.5 wt. % of a sintering aid, not greater than about 1.0 wt. % of a sintering aid, not greater than about 0.5 wt. % of a sintering aid, not greater than about 0.1 wt. % of a sintering aid or the zircon batch may even be essentially free of a sintering aid. According to still another particular embodiment, the zircon batch may include at least about 0.1 wt. % of a sintering aid a total weight of the zircon batch, at least about 0.2 wt. % of a sintering aid, at least about 0.3 wt. % of a sintering aid, at least about 0.4 wt. % of a sintering aid, at least about 0.5 wt. % of a sintering aid, at least about 0.6 wt. % of a sintering aid, at least about 0.7 wt. % of a sintering aid, at least about 0.8 wt. % of a sintering aid or even at least about 0.9 wt. % of a sintering aid. It will be appreciated that the content of a sintering aid in wt. % for the total weight of the zircon batch may be any value between any of the minimum and maximum values noted above. It will be further appreciated that the content of a sintering aid in wt. % for the total weigh of the zircon batch may be within a range between any of the minimum and maximum values noted above.

According to yet another embodiment, the zircon batch may include a particular ratio $CM_{SA}/CM_{SiO2}$. $CM_{SA}$ represents a content of a sintering aid in wt. % for a total weight of the zircon batch and $CM_{SiO2}$ represents a content of the $SiO_2$ component in wt. % for a total weight of the zircon batch. According to certain embodiments, the zircon batch may include a ratio $CM_{SA}/CM_{SiO2}$ of not greater than about 0.5, such as, not greater than about 0.1, not greater than about 0.05, not greater than about 0.04, not greater than about 0.03 or even not greater than about 0.02. According to another particular embodiment, the zircon batch may include a ratio $CM_{SA}/CM_{SiO2}$ of at least about 0.001, such as, at least about 0.005, at least about 0.01, at least about 0.02 or even at least about 0.03. It will be appreciated that the ratio $CM_{SA}/CM_{SiO2}$ may be any value between any of the minimum and maximum values noted above. It will be further appreciated that the $CM_{SA}/CM_{SiO2}$ may be within a range between any of the minimum and maximum values noted above.

According to still another embodiment, the zircon batch may include a particular content of $Ta_2O_5$. For example, the zircon batch may include at least about 0.1 wt. % of $Ta_2O_5$ for a total weight of the zircon batch, such as, at least about 0.2 wt. % of $Ta_2O_5$, at least about 0.3 wt. % of $Ta_2O_5$, at least about 0.4 wt. % of $Ta_2O_5$, at least about 0.5 wt. % of $Ta_2O_5$, at least about 0.6 wt. % of $Ta_2O_5$, at least about 0.7 wt. % of $Ta_2O_5$, at least about 0.8 wt. % of $Ta_2O_5$ or even at least about 0.9 wt. % of $Ta_2O_5$. According to still another embodiment, the zircon batch may include not greater than about 3.0 wt. % of $Ta_2O_5$ for a total weight of the zircon batch, such as, not greater than about 2.5 wt. % of $Ta_2O_5$, not greater than about 2.0 wt. % of $Ta_2O_5$, not greater than about 1.5 wt. % of $Ta_2O_5$, not greater than about 1.0 wt. % of $Ta_2O_5$, not greater than about 0.5 wt. % of $Ta_2O_5$, not greater than about 0.1 wt. % of $Ta_2O_5$ or the zircon batch may even be essentially free of $Ta_2O_5$. It will be appreciated that the content of $Ta_2O_5$ in wt. % for the total weight of the zircon batch may be any value between any of the minimum and maximum values noted above. It will be further appreciated that the content of $Ta_2O_5$ in wt. % for the total weigh of the zircon batch may be within a range between any of the minimum and maximum values noted above.

According to yet another embodiment, the zircon batch may include a particular ratio $CM_{Ta2O5}/CM_{SiO2}$. $CM_{Ta2O5}$ represents a content of $Ta_2O_5$ in wt. % for a total weight of the zircon batch and $CM_{SiO2}$ represents a content of the $SiO_2$ component in wt. % for a total weight of the zircon batch. According to certain embodiments, the zircon batch may include a ratio $CM_{Ta2O5}/CM_{SiO2}$ of not greater than about 0.5, such as, not greater than about 0.1, not greater than about 0.05, not greater than about 0.04, not greater than about 0.03 or even not greater than about 0.02. According to another particular embodiment, the zircon batch may include a ratio $CM_{Ta2O5}/CM_{SiO2}$ of at least about 0.001, such as, at least about 0.005, at least about 0.01, at least about 0.02 or even at least about 0.03. It will be appreciated that the ratio $CM_{Ta2O5}/CM_{SiO2}$ may be any value between any of the minimum and maximum values noted above. It will be further appreciated that the $CM_{Ta2O5}/CM_{SiO2}$ may be within a range between any of the minimum and maximum values noted above.

According to still another embodiment, the zircon batch may include a particular content of $Yb_2O_3$. For example, the zircon batch may include not greater than about 5.0 wt. % of $Yb_2O_3$ for a total weight of the zircon batch, such as, not greater than about 4.5 wt. % of $Yb_2O_3$, not greater than about 4.0 wt. % of $Yb_2O_3$, not greater than about 3.5 wt. % of $Yb_2O_3$, not greater than about 3.0 wt. % of $Yb_2O_3$, not greater than about 2.5 wt. % of $Yb_2O_3$, not greater than about 2.0 wt. % of $Yb_2O_3$, not greater than about 1.5 wt. % of $Yb_2O_3$, not greater than about 1.0 wt. % of $Yb_2O_3$, not greater than about 0.5 wt. % of $Yb_2O_3$, not greater than about 0.1 wt. % of $Yb_2O_3$ or the zircon batch may even be essentially free of $Yb_2O_3$. According to still another particular embodiment, the zircon batch may include at least about 0.1 wt. % of $Yb_2O_3$ for a total weight of the zircon batch, at least about 0.2 wt. % of $Yb_2O_3$, at least about 0.3 wt. % of $Yb_2O_3$, at least about 0.4 wt. % of $Yb_2O_3$, at least about 0.5 wt. % of $Yb_2O_3$, at least about 0.6 wt. % of $Yb_2O_3$, at least about 0.7 wt. % of $Yb_2O_3$, at least about 0.8 wt. % of $Yb_2O_3$ or even at least about 0.9 wt. % of $Yb_2O_3$. It will be appreciated that the content of $Yb_2O_3$ in wt. % for the total weight of the zircon batch may be any value between any of the minimum and maximum values noted above. It will be further appreciated that the content of $Yb_2O_3$ in wt. % for the total weigh of the zircon batch may be within a range between any of the minimum and maximum values noted above.

According to yet another embodiment, the zircon batch may include a particular ratio $CM_{Yb2O3}/CM_{SiO2}$. $CM_{Yb2O3}$ represents a content of $Yb_2O_3$ in wt. % for a total weight of the zircon batch and $CM_{SiO2}$ represents a content of the $SiO_2$ component in wt. % for a total weight of the zircon batch. According to certain embodiments, the zircon batch may include a ratio $CM_{Yb2O3}/CM_{SiO2}$ of not greater than about 0.5, such as, not greater than about 0.1, not greater than about 0.05, not greater than about 0.04, not greater than about 0.03 or even not greater than about 0.02. According to another particular embodiment, the zircon batch may include a ratio $CM_{Yb2O3}/CM_{SiO2}$ of at least about 0.001, such as, at least about 0.005, at least about 0.01, at least about 0.02 or even at least about 0.03. It will be appreciated that the ratio $CM_{Yb2O3}/CM_{SiO2}$ may be any value between any of the minimum and maximum values noted above. It will be further appreciated that the $CM_{Yb2O3}/CM_{SiO2}$ may be within a range between any of the minimum and maximum values noted above.

According to yet another embodiment, the zircon batch may include a particular content of $Ta_2O_5$ and $Yb_2O_3$ combined. For example, the zircon batch may include not greater than about 5.0 wt. % of $Ta_2O_5$ and $Yb_2O_3$ combined for a total weight of the zircon batch, such as, not greater than about 4.0 wt. % of $Ta_2O_5$ and $Yb_2O_3$ combined, not greater than about 3.0 wt. % of $Ta_2O_5$ and $Yb_2O_3$ combined, not greater than about 2.0 wt. % of $Ta_2O_5$ and $Yb_2O_3$ combined, not greater than about 1.0 wt. % of $Ta_2O_5$ and $Yb_2O_3$ combined, not greater than about 0.5 wt. % of $Ta_2O_5$ and $Yb_2O_3$ combined, not greater than about 0.1 wt. % of $Ta_2O_5$ and $Yb_2O_3$ combined or the zircon batch may even be essentially free of $Ta_2O_5$ and $Yb_2O_3$ combined. According to yet another embodiment, the zircon batch may include at least about 0.1 wt. % of $Ta_2O_5$ and $Yb_2O_3$ combined for a total weight of the zircon batch, such as, at least about 0.2 wt. % of $Ta_2O_5$ and $Yb_2O_3$ combined, at least about 0.3 wt. % of $Ta_2O_5$ and $Yb_2O_3$ combined, at least about 0.4 wt. % of $Ta_2O_5$ and $Yb_2O_3$ combined, at least about 0.5 wt. % of $Ta_2O_5$ and $Yb_2O_3$ combined, at least about 0.6 wt. % of $Ta_2O_5$ and $Yb_2O_3$ combined, at least about 0.7 wt. % of $Ta_2O_5$ and $Yb_2O_3$ combined $Ta_2O_5$ and $Yb_2O_3$ combined, at least about 0.8 wt. % of $Ta_2O_5$ and $Yb_2O_3$ combined or even at least about 0.9 wt. % of $Ta_2O_5$ and $Yb_2O_3$ combined. It will be appreciated that the content of $Ta_2O_5$ and $Yb_2O_3$ combined in wt. % for the total weight of the zircon batch may be any value between any of the minimum and maximum values noted above. It will be further appreciated that the content of $Ta_2O_5$ and $Yb_2O_3$ combined in wt. % for the total weigh of the zircon batch may be within a range between any of the minimum and maximum values noted above.

According to still another embodiment, the zircon batch may include a particular content of $TiO_2$. For example, the zircon batch may include not greater than about 1.0 wt. % of $TiO_2$ for a total weight of the zircon batch, such as, not greater than about 0.8 wt. % of $TiO_2$, not greater than about 0.5 wt. % of $TiO_2$, not greater than about 0.4 wt. % of $TiO_2$, not greater than about 0.3 wt. % of $TiO_2$, not greater than about 0.2 wt. % of $TiO_2$, not greater than about 0.1 wt. % of $TiO_2$ or the zircon batch may be essentially free of $TiO_2$.

According to still another embodiment, the zircon batch may include a particular content of CaO. For example, the zircon batch may include not greater than about 1.0 wt. % of CaO for a total weight of the zircon batch, such as, not greater than about 0.8 wt. % of CaO, not greater than about 0.5 wt. % of CaO, not greater than about 0.4 wt. % of CaO, not greater than about 0.3 wt. % of CaO, not greater than about 0.2 wt. % of CaO, not greater than about 0.1 wt. % of CaO or the zircon batch may be essentially free of CaO.

According to still another embodiment, the zircon batch may include a particular content of MgO. For example, the zircon batch may include not greater than about 1.0 wt. % of MgO for a total weight of the zircon batch, such as, not greater than about 0.8 wt. % of MgO, not greater than about 0.5 wt. % of MgO, not greater than about 0.4 wt. % of MgO, not greater than about 0.3 wt. % of MgO, not greater than about 0.2 wt. % of MgO, not greater than about 0.1 wt. % of MgO or the zircon batch may be essentially free of MgO.

According to still another embodiment, the zircon batch may include a particular content of $K_2O$. For example, the zircon batch may include not greater than about 1.0 wt. % of $K_2O$ for a total weight of the zircon batch, such as, not greater than about 0.8 wt. % of $K_2O$, not greater than about 0.5 wt. % of $K_2O$, not greater than about 0.4 wt. % of $K_2O$, not greater than about 0.3 wt. % of $K_2O$, not greater than about 0.2 wt. % of $K_2O$, not greater than about 0.1 wt. % of $K_2O$ or the zircon batch may be essentially free of $K_2O$.

According to still another embodiment, the zircon batch may include a particular content of $Na_2O$. For example, the zircon batch may include not greater than about 1.0 wt. % of $Na_2O$ for a total weight of the zircon batch, such as, not greater than about 0.8 wt. % of $Na_2O$, not greater than about 0.5 wt. % of $Na_2O$, not greater than about 0.4 wt. % of $Na_2O$, not greater than about 0.3 wt. % of $Na_2O$, not greater than about 0.2 wt. % of $Na_2O$, not greater than about 0.1 wt. % of $Na_2O$ or the zircon batch may be essentially free of $Na_2O$.

According to still another embodiment, the zircon batch may include a particular content of $Y_2O_3$. For example, the zircon batch may include not greater than about 1.0 wt. % of $Y_2O_3$ for a total weight of the zircon batch, such as, not greater than about 0.8 wt. % of $Y_2O_3$, not greater than about 0.5 wt. % of $Y_2O_3$, not greater than about 0.4 wt. % of $Y_2O_3$, not greater than about 0.3 wt. % of $Y_2O_3$, not greater than about 0.2 wt. % of $Y_2O_3$, not greater than about 0.1 wt. % of $Y_2O_3$ or the zircon batch may be essentially free of $Y_2O_3$.

According to still another embodiment, the zircon batch may include a particular content of $P_2O_5$. For example, the zircon batch may include not greater than about 1.0 wt. % of $P_2O_5$ for a total weight of the zircon batch, such as, not greater than about 0.8 wt. % of $P_2O_5$, not greater than about 0.5 wt. % of $P_2O_5$, not greater than about 0.4 wt. % of $P_2O_5$, not greater than about 0.3 wt. % of $P_2O_5$, not greater than about 0.2 wt. % of $P_2O_5$, not greater than about 0.1 wt. % of $P_2O_5$ or the zircon batch may be essentially free of $P_2O_5$.

According to still another embodiment, the zircon batch may include a particular content of $Fe_2O_3$. For example, the zircon batch may include not greater than about 1.0 wt. % of $Fe_2O_3$ for a total weight of the zircon batch, such as, not greater than about 0.8 wt. % of $Fe_2O_3$, not greater than about 0.5 wt. % of $Fe_2O_3$, not greater than about 0.4 wt. % of $Fe_2O_3$, not greater than about 0.3 wt. % of $Fe_2O_3$, not greater than about 0.2 wt. % of $Fe_2O_3$, not greater than about 0.1 wt. % of $Fe_2O_3$ or the zircon batch may be essentially free of $Fe_2O_3$.

According to still another embodiment, the zircon batch may include a particular content of ZnO. For example, the zircon batch may include not greater than about 1.0 wt. % of ZnO for a total weight of the zircon batch, such as, not greater than about 0.8 wt. % of ZnO, not greater than about 0.5 wt. % of ZnO, not greater than about 0.4 wt. % of ZnO, not greater than about 0.3 wt. % of ZnO, not greater than about 0.2 wt. % of ZnO, not greater than about 0.1 wt. % of ZnO or the zircon batch may be essentially free of ZnO.

According to still another embodiment, the zircon batch may include a particular content of $TiO_2$, CaO, MgO, $K_2O$, $Na_2O$, $Y_2O_3$, $P_2O_5$, $Fe_2O_3$ and ZnO combined. For example, the zircon batch may include not greater than about 1.5 wt. % of $TiO_2$, CaO, MgO, $K_2O$, $Na_2O$, $Y_2O_3$, $P_2O_5$, $Fe_2O_3$ and ZnO combined for a total weight of the zircon batch, such as, not greater than about 1.2 wt. % of $TiO_2$, CaO, MgO, $K_2O$, $Na_2O$, $Y_2O_3$, $P_2O_5$, $Fe_2O_3$ and ZnO combined, not greater than about 1.0 wt. % of $TiO_2$, CaO, MgO, $K_2O$, $Na_2O$, $Y_2O_3$, $P_2O_5$, $Fe_2O_3$ and ZnO combined, not greater than about 0.7 wt. % of $TiO_2$, CaO, MgO, $K_2O$, $Na_2O$, $Y_2O_3$, $P_2O_5$, $Fe_2O_3$ and ZnO combined, not greater than about 0.5 wt. % of $TiO_2$, CaO, MgO, $K_2O$, $Na_2O$, $Y_2O_3$, $P_2O_5$, $Fe_2O_3$ and ZnO combined, not greater than about 0.2 wt. % of $TiO_2$, CaO, MgO, $K_2O$, $Na_2O$, $Y_2O_3$, $P_2O_5$, $Fe_2O_3$ and ZnO combined, not greater than about 0.1 wt. % of $TiO_2$, CaO, MgO, $K_2O$, $Na_2O$, $Y_2O_3$, $P_2O_5$, $Fe_2O_3$ and ZnO combined or the zircon batch may be essentially free of $TiO_2$, CaO, MgO, $K_2O$, $Na_2O$, $Y_2O_3$, $P_2O_5$, $Fe_2O_3$ and ZnO combined.

In other embodiments, the zircon batch may have a minimal content of metal oxides, such as, for example, rare earth oxides, alkali earth oxides, alkali oxides and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide Alkali earth oxides may include any oxide compositions that include group two metals (i.e., beryllium, magnesium, calcium, strontium, barium and radium), for example, magnesium oxide, calcium oxide and barium oxide Alkali oxides may include any oxide compositions that include group one metals, (i.e., lithium, sodium, potassium, rubidium, cesium, and francium), for example, lithium oxide, potassium oxide and cesium oxide. A zircon batch that has a minimal content of any oxide noted above, for example, rare earth oxides, alkali earth oxides, alkali oxides and any transition metal oxide not expressly disclosed herein, may have a content of that oxide of not greater than about 1 wt. %, such as, not greater than about 0.7 wt. %, not greater than about 0.5 wt. % or even not greater than about 0.2 wt. % of the total weight of the zircon batch.

The zircon body formed according to embodiments described herein may include a particular content of zircon. For example, the zircon body may include a content of zircon of at least 50 wt. % for a total weight of the zircon body, such as, at least about 52 wt. %, at least about 53 wt. %, at least about 54 wt. %, at least about 55 wt. %, at least about 56 wt. %, at least about 57 wt. %, at least about 57.5 wt. %, at least about 58 wt. %, at least about 58.5 wt. %, at least about 59 wt. %, at least about 59.5 wt. %, at least about 60 wt. %, at least about 60.5 wt. %, at least about 61 wt. %, at least about 61.5, wt. %, at least about 62 wt. %, at least about 62.5 wt. %, at least about 63 wt. %, at least about 62.5 wt. %, at least about 64 wt. %, at least about 64.5 wt. %, at least about five wt. %, at least about 65.5 wt. %, at least about 66 wt. %, at least about 66.5 wt. %, at least about 67 wt. %, at least about 68 wt. %, at least about 69 wt. %, at least about 70 wt. %, at least about 75 wt. %, at least about 80 wt. %, at least about 85 wt. %, at least about 90 wt. % or even at least about 95 wt. %. According to still another embodiment, the zircon body may include a content of zircon of not greater than about 99 wt. % for total weight of the zircon body, such as, not greater than about 95 wt. %, not greater than about 90 wt. %, not greater than about 85 wt. %, not greater than about 80 wt. %, not greater than about 75 wt. %, not greater than about 70 wt. %, not greater than about 69 wt. %, not greater than about 68 wt. %, not greater than about 67 wt. %, not greater than about 66.5 wt. %, not greater than about 66 wt. %, not greater than about 66.5 wt. %, not greater than about 65 wt. %, not greater than about 64.5 wt. %, not greater than about 64 wt. %, not greater than about 63.5 wt. %, not greater than about 53 wt. %, not greater than about 62.5 wt. %, not greater than about 62 wt. %, not greater than about 61.5 wt. %, not greater than about 61 wt. %, not greater than about 60.5 wt. %, not greater than about 60 wt. %, not greater than about 59.5 wt. %, not greater than about 59 wt. %, not greater than about 58 wt. %, not greater than about 58 wt. %, at least about 57 wt. %, not greater than about 57 wt. %, not greater than about 56 wt. %, not greater than about 55 wt. %, not greater than about 54 wt. %, not greater than about 53 wt. %, not greater than about 52 wt. % or even not greater than about 51 wt. %. It will be appreciated that the content of zircon in wt. % for the total weight of the zircon body may be any value between any of the minimum and maximum values noted above. It will be further appreciated that the content of zircon in wt. % for the total weigh of the zircon body may be within a range between any of the minimum and maximum values noted above.

According to another particular embodiment, the zircon body may include a particular content of $Al_2O_3$ containing component. For example, the zircon body may include not greater than about 4.9 wt. % of the $Al_2O_3$ containing component for a total weight of the zircon body, such as, not greater than about 4.8 wt. % of the Al$_2$O$_3$ containing component, not greater than about 4.7 wt. % of the Al$_2$O$_3$ containing component, not greater than about 4.6 wt. % of the Al$_2$O$_3$ containing component, not greater than about 4.5 wt. % of the Al$_2$O$_3$ containing component, not greater than about 4.4 wt. % of the Al$_2$O$_3$ containing component, not greater than about 4.3 wt. % of the Al$_2$O$_3$ containing component, not greater than about 4.2 wt. % of the Al$_2$O$_3$ containing component, not greater than about 4.1 wt. % of the Al$_2$O$_3$ containing component, not greater than about 4.0 wt. % of the Al$_2$O$_3$ containing component, not greater than about 3.9 wt. % of the Al$_2$O$_3$ containing component, not greater than about 3.8 wt. % of the Al$_2$O$_3$ containing component, not greater than about 3.7 wt. % of the Al$_2$O$_3$ containing component, not greater than about 3.6 wt. % of the Al$_2$O$_3$ containing component or even not greater than about 3.5 wt. % of the Al$_2$O$_3$ containing component. According to still another embodiment, the zircon body may include at least about 0.2 wt. % of the Al$_2$O$_3$ containing component for a total weight of the zircon body, such as, at least about 0.5 wt. % of the Al$_2$O$_3$ containing component, at least about 1.0 wt. % of the Al$_2$O$_3$ containing component, at least about 1.5 wt. % of the Al$_2$O$_3$ containing component, at least about 1.6 wt. % of the Al$_2$O$_3$ containing component, at least about 1.7 wt. % of the Al$_2$O$_3$ containing component, at least about 1.8 wt. % of the Al$_2$O$_3$ containing component, at least about 1.9 wt. % of the Al$_2$O$_3$ containing component, at least about 2.0 wt. % of the Al$_2$O$_3$ containing component, at least about 2.1 wt. % of the Al$_2$O$_3$ containing component, at least about 2.2 wt. % of the Al$_2$O$_3$ containing component, at least about 2.3 wt. % of the Al$_2$O$_3$ containing component, at least about 2.4 wt. % of the Al$_2$O$_3$ containing component, at least about 2.5 wt. % of the Al$_2$O$_3$ containing component, at least about 2.6 wt. % of the Al$_2$O$_3$ containing component, at least about 2.7 wt. % of the Al$_2$O$_3$ containing component, at least about 2.8 wt. % of the Al$_2$O$_3$ containing component, at least about 2.9 wt. % of the Al$_2$O$_3$ containing component, at least about 3.0 wt. % of the Al$_2$O$_3$ containing component or even at least about 3.1 wt. % of the Al$_2$O$_3$ containing component. It will be appreciated that the content of Al$_2$O$_3$ containing component in wt. % for the total weight of the zircon body may be any value between any of the minimum and maximum values noted above. It will be further appreciated that the content of Al$_2$O$_3$ containing component in wt. % for the total weigh of the zircon body may be within a range between any of the minimum and maximum values noted above.

According to another particular embodiment, the zircon body may include a particular content of Al$_2$O$_3$. For example, the zircon body may include not greater than about 5.5 wt. % of the Al$_2$O$_3$ for a total weight of the zircon body, such as, not greater than about 5.4 wt. % of the Al$_2$O$_3$, not greater than about 5.3 wt. % of the Al$_2$O$_3$, not greater than about 5.2 wt. % of the Al$_2$O$_3$, not greater than about 5.1 wt. % of the Al$_2$O$_3$, not greater than about 5.0 wt. % of the Al$_2$O$_3$, not greater than about 4.9 wt. % of the Al$_2$O$_3$, not greater than about 4.8 wt. % of the Al$_2$O$_3$, not greater than about 4.7 wt. % of the Al$_2$O$_3$, not greater than about 4.6 wt. % of the Al$_2$O$_3$, not greater than about 4.5 wt. % of the Al$_2$O$_3$, not greater than about 4.4 wt. % of the Al$_2$O$_3$, not greater than about 4.3 wt. % of the Al$_2$O$_3$, not greater than about 4.2 wt. % of the Al$_2$O$_3$, not greater than about 4.1 wt. % of the Al$_2$O$_3$, not greater than about 4.0 wt. % of the Al$_2$O$_3$, not greater than about 3.9 wt. % of the Al$_2$O$_3$, not greater than about 3.8 wt. % of the Al$_2$O$_3$, not greater than about 3.7 wt. % of the Al$_2$O$_3$, not greater than about 3.6 wt. % of the Al$_2$O$_3$ or even not greater than about 3.5 wt. % of the Al$_2$O$_3$. According to still another embodiment, the zircon body may include at least about 0.2 wt. % of the Al$_2$O$_3$ for a total weight of the zircon body, such as, at least about 0.5 wt. % of the Al$_2$O$_3$, at least about 1.0 wt. % of the Al$_2$O$_3$, at least about 1.5 wt. % of the Al$_2$O$_3$, at least about 1.6 wt. % of the Al$_2$O$_3$, at least about 1.7 wt. % of the Al$_2$O$_3$, at least about 1.8 wt. % of the Al$_2$O$_3$, at least about 1.9 wt. % of the Al$_2$O$_3$, at least about 2.0 wt. % of the Al$_2$O$_3$, at least about 2.1 wt. % of the Al$_2$O$_3$, at least about 2.2 wt. % of the Al$_2$O$_3$, at least about 2.3 wt. % of the Al$_2$O$_3$, at least about 2.4 wt. % of the Al$_2$O$_3$, at least about 2.5 wt. % of the Al$_2$O$_3$, at least about 2.6 wt. % of the Al$_2$O$_3$, at least about 2.7 wt. % of the Al$_2$O$_3$, at least about 2.8 wt. % of the Al$_2$O$_3$, at least about 2.9 wt. % of the Al$_2$O$_3$, at least about 3.0 wt. % of the Al$_2$O$_3$ or even at least about 3.1 wt. % of the Al$_2$O$_3$. It will be appreciated that the content of Al$_2$O$_3$ in wt. % for the total weight of the zircon body may be any value between any of the minimum and maximum values noted above. It will be further appreciated that the content of Al$_2$O$_3$ in wt. % for the total weigh of the zircon body may be within a range between any of the minimum and maximum values noted above.

According to a particular embodiment, the Al$_2$O$_3$ containing component in the zircon body may include alumina. According to still another embodiment, the Al$_2$O$_3$ containing component in the zircon body may include a particular content of alumina. For example, the Al$_2$O$_3$ containing component in the zircon body may include at least about 1 wt. % alumina for a total weight of the Al$_2$O$_3$ containing component, such as, at least about 2 wt. % alumina, at least about 5 wt. % alumina, at least about 10 wt. % alumina, at least about 15 wt. % alumina, at least about 20 wt. % alumina, at least about 25 wt. % alumina, at least about 30 wt. % alumina, at least about 35 wt. % alumina, at least about 40 wt. % alumina, at least about 45 wt. % alumina, at least about 50 wt. % alumina, at least about 55 wt. % alumina, at least about 60 wt. % alumina, at least about 65 wt. % alumina, at least about 70 wt. % alumina, at least about 75 wt. % alumina, at least about 80 wt. % alumina, at least about 85 wt. % alumina, at least about 90 wt. % alumina, at least about 95 wt. % alumina or the Al$_2$O$_3$ containing component may even consists essentially of alumina. It will be appreciated that content of alumina in the Al$_2$O$_3$ containing component in the zircon body may be any value or at least about any value between any of the values noted above.

According to a particular embodiment, the Al$_2$O$_3$ containing component in the zircon body may include mullite. According to still another embodiment, the Al$_2$O$_3$ containing component in the zircon body may include a particular content of mullite. For example, the Al$_2$O$_3$ containing component in the zircon body may include at least about 1 wt. % mullite for a total weight of the Al$_2$O$_3$ containing component, such as, at least about 2 wt. % mullite, at least about 5 wt. % mullite, at least about 10 wt. % mullite, at least about 15 wt. % mullite, at least about 20 wt. % mullite, at least about 25 wt. % mullite, at least about 30 wt. % mullite, at least about 35 wt. % mullite, at least about 40 wt. % mullite, at least about 45 wt. % mullite, at least about 50 wt. % mullite, at least about 55 wt. % mullite, at least about 60 wt. % mullite, at least about 65 wt. % mullite, at least about 70 wt. % mullite, at least about 75 wt. % mullite, at least about 80 wt. % mullite, at least about 85 wt. % mullite, at least about 90 wt. % mullite, at least about 95 wt. % mullite or the Al$_2$O$_3$ containing component may even consists essentially of mullite. It will be appreciated that content of mullite in the $Al_2O_3$ containing component in the zircon body may be any value or at least about any value between any of the values noted above.

According to still another embodiment, the mullite in the zircon body may include $Al_6Si_2O_{13}$. According to still another embodiment, the mullite in the zircon body may include a particular content of $Al_6Si_2O_{13}$. For example, the mullite in the zircon body may include at least about 1 wt. % $Al_6Si_2O_{13}$ for a total weight of the mullite, such as, at least about 2 wt. % $Al_6Si_2O_{13}$, at least about 5 wt. % $Al_6Si_2O_{13}$, at least about 10 wt. % $Al_6Si_2O_{13}$, at least about 15 wt. % $Al_6Si_2O_{13}$, at least about 20 wt. % $Al_6Si_2O_{13}$, at least about 25 wt. % $Al_6Si_2O_{13}$, at least about 30 wt. % $Al_6Si_2O_{13}$, at least about 35 wt. % $Al_6Si_2O_{13}$, at least about 40 wt. % $Al_6Si_2O_{13}$, at least about 45 wt. % $Al_6Si_2O_{13}$, at least about 50 wt. % $Al_6Si_2O_{13}$, at least about 55 wt. % $Al_6Si_2O_{13}$, at least about 60 wt. % $Al_6Si_2O_{13}$, at least about 65 wt. % $Al_6Si_2O_{13}$, at least about 70 wt. % $Al_6Si_2O_{13}$, at least about 75 wt. % $Al_6Si_2O_{13}$, at least about 80 wt. % $Al_6Si_2O_{13}$, at least about 85 wt. % $Al_6Si_2O_{13}$, at least about 90 wt. % $Al_6Si_2O_{13}$, at least about 95 wt. % $Al_6Si_2O_{13}$ or the mullite in the zircon body may even consists essentially of $Al_6Si_2O_{13}$. It will be appreciated that content of $Al_6Si_2O_{13}$ in mullite in the zircon body may be any value or at least about any value between any of the values noted above.

According to yet another particular embodiment, the $Al_2O_3$ containing component may include an aluminosilicate species. According to still another embodiment, the aluminosilicate species may include at least one of a non-stoichiometric mullite, stoichiometric mullite, and a combination thereof. According to still another embodiment, the $Al_2O_3$ containing component may include a combination of an aluminate species and an aluminosilicate species. According to yet another embodiment, the aluminosilicate species is present in a greater content than the aluminate species.

According to another particular embodiment, the zircon body may include a particular content of a $SiO_2$ component. The $SiO_2$ component may include the combination of $SiO_2$ added to the zircon body as part of the zircon material, $SiO_2$ added to the zircon body as part of the $Al_2O_3$ containing component and the $SiO_2$ added to the zircon body as free silica. Free silica may be defined as $SiO_2$ that is not bonded as part of the crystalline form of the zircon material or the $Al_2O_3$ containing component. For example, the zircon body may include not greater than about 34.5 wt. % of a $SiO_2$ component for a total weight of the zircon body, not greater than about 33 wt. % of a $SiO_2$ component, not greater than about 32.5 wt. % of a $SiO_2$ component, not greater than about 32 wt. % of a $SiO_2$ component, not greater than about 31.5 wt. % of a $SiO_2$ component, not greater than about 30 wt. % of a $SiO_2$ component, not greater than about 29.5 wt. % of a $SiO_2$ component, not greater than about 29 wt. % of a $SiO_2$ component, not greater than about 28.5 wt. % of a $SiO_2$ component, not greater than about 28 wt. % of a $SiO_2$ component, not greater than about 27.5 wt. % of a $SiO_2$ component, not greater than about 27 wt. % of a $SiO_2$ component or even greater than about 26.5 wt. % of a $SiO_2$ component. According to still another embodiment, the zircon body may include at least about 25.5 wt. % of a $SiO_2$ component for a total weight of the zircon body, at least about 26 wt. % of a $SiO_2$ component, at least about 26.5 wt. % of a $SiO_2$ component, at least about 27 wt. % of a $SiO_2$ component, at least about 27.5 wt. % of a $SiO_2$ component, at least about 28 wt. % of a $SiO_2$ component, at least about 28.5 wt. % of a $SiO_2$ component, at least about 29 wt. % of a $SiO_2$ component, at least about 29.5 wt. % of a $SiO_2$ component, at least about 30 wt. % of a $SiO_2$ component, at least about 30.5 wt. % of a $SiO_2$ component, at least about 31 wt. % of a $SiO_2$ component, at least about 31.5 wt. % of a $SiO_2$ component, at least about 32 wt. % of a $SiO_2$ component, at least about 32.5 wt. % of a $SiO_2$ component, at least about 33 wt. % of a $SiO_2$ component, at least about 33.5 wt. % of a $SiO_2$ component, about 34 wt. % of a $SiO_2$ component or even at least about 34.5 wt. % of a $SiO_2$ component. It will be appreciated that the content of a $SiO_2$ component in wt. % for the total weight of the zircon body may be any value between any of the minimum and maximum values noted above. It will be further appreciated that the content of a $SiO_2$ component in wt. % for the total weigh of the zircon body may be within a range between any of the minimum and maximum values noted above.

According to still another embodiment, the zircon body may include a particular ratio $CB_{SiO2}/CB_{AlC}$. $CB_{SiO2}$ may represent a content of the $SiO_2$ component in wt. % for a total weight of the zircon body and $CB_{AlC}$ may represent a content of $Al_2O_3$ containing component in wt. % for a total weight of the zircon body. For example, the zircon body may have a ratio $CB_{SiO2}/CB_{AlC}$ of at least about 5, such as, at least about 8, at least about 10, at least about 13, at least about 15, at least about 18, at least about 20, at least about 23, at least about 25, at least about 28, at least about 30, at least about 33, at least about 35, at least about 38, at least about 40, at least about 43, at least about 45 or even at least about 48. According to another embodiment, the zircon body may include a ratio a ratio $CB_{SiO2}/CB_{AlC}$ of not greater than about 50, such as, not greater than about 47, not greater than about 45, not greater than about 42, not greater than about 40, not greater than about 37, not greater than about 35, not greater than about 32, not greater than about 30, not greater than about 27, not greater than about 20, not greater than about 17, not greater than about 12, not greater than about 10 or even not greater than about 7. It will be appreciated that the ratio $CB_{SiO2}/CB_{AlC}$ may be any value between any of the minimum and maximum values noted above. It will be further appreciated that the $CB_{SiO2}/CB_{AlC}$ may be within a range between any of the minimum and maximum values noted above.

According to still another embodiment, the zircon body may include a particular ratio $CB_{AlC}/CB_Z$. $CB_{ALC}$ may represent a content of $Al_2O_3$ containing component in wt. % for a total weight of the zircon body and $CB_Z$ may represent a content of zircon in wt. % for a total weight of the body. For example, the zircon body may include a ratio $CB_{AlC}/CB_Z$ of not greater than about 0.08, such as, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.030, not greater than about 0.025, not greater than about 0.02, not greater than about 0.015 or even not greater than about 0.01. According to still another embodiment, the zircon body may include a ratio of $CB_{AlC}/CB_Z$ of at least about 0.002, such as, at least about 0.005, at least about 0.01, at least about at least about 0.02, at least about 0.03, at least about 0.035, at least about 0.04, at least about 0.045, at least about 0.05, at least about 0.055, at least about 0.06, at least about 0.065, at least about 0.07, at least about 0.075, at least about 0.08, at least about 0.085 or even at least about 0.09. It will be appreciated that the ratio $CB_{AlC}/CB_Z$ may be any value between any of the minimum and maximum values noted above. It will be further appreciated that the $CB_{AlC}/CB_Z$ may be within a range between any of the minimum and maximum values noted above.

According to yet another particular embodiment, the zircon body may include a sintering aid, for example, $Ta_2O_5$ or $Yb_2O_3$. According to still another particular embodiment, the zircon body may include a particular content of a sintering aid. For example, the zircon body may include not greater than about 5.0 wt. % of a sintering aid for a total weight of the zircon body, such as, not greater than about 4.5 wt. % of a sintering aid, not greater than about 4.0 wt. % of a sintering aid, not greater than about 3.5 wt. % of a sintering aid, not greater than about 3.0 wt. % of a sintering aid, not greater than about 2.5 wt. % of a sintering aid, not greater than about 2.0 wt. % of a sintering aid, not greater than about 1.5 wt. % of a sintering aid, not greater than about 1.0 wt. % of a sintering aid, not greater than about 0.5 wt. % of a sintering aid, not greater than about 0.1 wt. % of a sintering aid or the zircon body may even be essentially free of a sintering aid. According to still another particular embodiment, the zircon body may include at least about 0.1 wt. % of a sintering aid a total weight of the zircon body, at least about 0.2 wt. % of a sintering aid, at least about 0.3 wt. % of a sintering aid, at least about 0.4 wt. % of a sintering aid, at least about 0.5 wt. % of a sintering aid, at least about 0.6 wt. % of a sintering aid, at least about 0.7 wt. % of a sintering aid, at least about 0.8 wt. % of a sintering aid or even at least about 0.9 wt. % of a sintering aid. It will be appreciated that the content of a sintering aid in wt. % for the total weight of the zircon body may be any value between any of the minimum and maximum values noted above. It will be further appreciated that the content of a sintering aid in wt. % for the total weigh of the zircon body may be within a range between any of the minimum and maximum values noted above.

According to yet another embodiment, the zircon body may include a particular ratio $CB_{SA}/CB_{SiO2}$. $CB_{SA}$ represents a content of a sintering aid in wt. % for a total weight of the zircon body and $CB_{SiO2}$ represents a content of the $SiO_2$ component in wt. % for a total weight of the zircon body. According to certain embodiments, the zircon body may include a ratio $CB_{SA}/CB_{SiO2}$ of not greater than about 0.5, such as, not greater than about 0.1, not greater than about 0.05, not greater than about 0.04, not greater than about 0.03 or even not greater than about 0.02. According to another particular embodiment, the zircon body may include a ratio $CB_{SA}/CB_{SiO2}$ of at least about 0.001, such as, at least about 0.005, at least about 0.01, at least about 0.02 or even at least about 0.03. It will be appreciated that the ratio $CB_{SA}/CB_{SiO2}$ may be any value between any of the minimum and maximum values noted above. It will be further appreciated that the $CB_{SA}/CB_{SiO2}$ may be within a range between any of the minimum and maximum values noted above.

According to still another embodiment, the zircon body may include a particular content of $Ta_2O_5$. For example, the zircon body may include at least about 0.1 wt. % of $Ta_2O_5$ for a total weight of the zircon body, such as, at least about 0.2 wt. % of $Ta_2O_5$, at least about 0.3 wt. % of $Ta_2O_5$, at least about 0.4 wt. % of $Ta_2O_5$, at least about 0.5 wt. % of $Ta_2O_5$, at least about 0.6 wt. % of $Ta_2O_5$, at least about 0.7 wt. % of $Ta_2O_5$, at least about 0.8 wt. % of $Ta_2O_5$ or even at least about 0.9 wt. % of $Ta_2O_5$. According to still another embodiment, the zircon body may include not greater than about 3.0 wt. % of $Ta_2O_5$ for a total weight of the zircon body, such as, not greater than about 2.5 wt. % of $Ta_2O_5$, not greater than about 2.0 wt. % of $Ta_2O_5$, not greater than about 1.5 wt. % of $Ta_2O_5$, not greater than about 1.0 wt. % of $Ta_2O_5$, not greater than about 0.5 wt. % of $Ta_2O_5$, not greater than about 0.1 wt. % of $Ta_2O_5$ or the zircon body may even be essentially free of $Ta_2O_5$. It will be appreciated that the content of $Ta_2O_5$ in wt. % for the total weight of the zircon body may be any value between any of the minimum and maximum values noted above. It will be further appreciated that the content of $Ta_2O_5$ in wt. % for the total weigh of the zircon body may be within a range between any of the minimum and maximum values noted above.

According to yet another embodiment, the zircon body may include a particular ratio $CB_{Ta2O5}/CB_{SiO2}$. $CB_{Ta2O5}$ represents a content of $Ta_2O_5$ in wt. % for a total weight of the zircon body and $CB_{SiO2}$ represents a content of the $SiO_2$ component in wt. % for a total weight of the zircon body. According to certain embodiments, the zircon body may include a ratio $CB_{Ta2O5}/CB_{SiO2}$ of not greater than about 0.5, such as, not greater than about 0.1, not greater than about 0.05, not greater than about 0.04, not greater than about 0.03 or even not greater than about 0.02. According to another particular embodiment, the zircon body may include a ratio $CB_{Ta2O5}/CB_{SiO2}$ of at least about 0.001, such as, at least about 0.005, at least about 0.01, at least about 0.02 or even at least about 0.03. It will be appreciated that the ratio $CB_{Ta2O5}/CB_{SiO2}$ may be any value between any of the minimum and maximum values noted above. It will be further appreciated that the $CB_{Ta2O5}/CB_{SiO2}$ may be within a range between any of the minimum and maximum values noted above.

According to still another embodiment, the zircon body may include a particular content of $Yb_2O_3$. For example, the zircon body may include not greater than about 5.0 wt. % of $Yb_2O_3$ for a total weight of the zircon body, such as, not greater than about 4.5 wt. % of $Yb_2O_3$, not greater than about 4.0 wt. % of $Yb_2O_3$, not greater than about 3.5 wt. % of $Yb_2O_3$, not greater than about 3.0 wt. % of $Yb_2O_3$, not greater than about 2.5 wt. % of $Yb_2O_3$, not greater than about 2.0 wt. % of $Yb_2O_3$, not greater than about 1.5 wt. % of $Yb_2O_3$, not greater than about 1.0 wt. % of $Yb_2O_3$, not greater than about 0.5 wt. % of $Yb_2O_3$, not greater than about 0.1 wt. % of $Yb_2O_3$ or the zircon body may even be essentially free of $Yb_2O_3$. According to still another particular embodiment, the zircon body may include at least about 0.1 wt. % of $Yb_2O_3$ for a total weight of the zircon body, at least about 0.2 wt. % of $Yb_2O_3$, at least about 0.3 wt. % of $Yb_2O_3$, at least about 0.4 wt. % of $Yb_2O_3$, at least about 0.5 wt. % of $Yb_2O_3$, at least about 0.6 wt. % of $Yb_2O_3$, at least about 0.7 wt. % of $Yb_2O_3$, at least about 0.8 wt. % of $Yb_2O_3$ or even at least about 0.9 wt. % of $Yb_2O_3$. It will be appreciated that the content of $Yb_2O_3$ in wt. % for the total weight of the zircon body may be any value between any of the minimum and maximum values noted above. It will be further appreciated that the content of $Yb_2O_3$ in wt. % for the total weigh of the zircon body may be within a range between any of the minimum and maximum values noted above.

According to yet another embodiment, the zircon body may include a particular ratio $CB_{Yb2O3}/CB_{SiO2}$. $CB_{Yb2O3}$ represents a content of $Yb_2O_3$ in wt. % for a total weight of the zircon body and $CB_{SiO2}$ represents a content of the $SiO_2$ component in wt. % for a total weight of the zircon body. According to certain embodiments, the zircon body may include a ratio $CB_{Yb2O3}/CB_{SiO2}$ of not greater than about 0.5, such as, not greater than about 0.1, not greater than about 0.05, not greater than about 0.04, not greater than about 0.03 or even not greater than about 0.02. According to another particular embodiment, the zircon body may include a ratio $CB_{Yb2O3}/CB_{SiO2}$ of at least about 0.001, such as, at least about 0.005, at least about 0.01, at least about 0.02 or even at least about 0.03. It will be appreciated that the ratio $CB_{Yb2O3}/CB_{SiO2}$ may be any value between any of the minimum and maximum values noted above. It will be further appreciated that the $CB_{Yb2O3}/CB_{SiO2}$ may be within a range between any of the minimum and maximum values noted above.

According to yet another embodiment, the zircon body may include a particular content of $Ta_2O_5$ and $Yb_2O_3$ combined. For example, the zircon body may include not greater than about 5.0 wt. % of $Ta_2O_5$ and $Yb_2O_3$ combined for a total weight of the zircon body, such as, not greater than about 4.0 wt. % of $Ta_2O_5$ and $Yb_2O_3$ combined, not greater than about 3.0 wt. % of $Ta_2O_5$ and $Yb_2O_3$ combined, not greater than about 2.0 wt. % of $Ta_2O_5$ and $Yb_2O_3$ combined, not greater than about 1.0 wt. % of $Ta_2O_5$ and $Yb_2O_3$ combined, not greater than about 0.5 wt. % of $Ta_2O_5$ and $Yb_2O_3$ combined, not greater than about 0.1 wt. % of $Ta_2O_5$ and $Yb_2O_3$ combined or the zircon body may even be essentially free of $Ta_2O_5$ and $Yb_2O_3$ combined. According to yet another embodiment, the zircon body may include at least about 0.1 wt. % of $Ta_2O_5$ and $Yb_2O_3$ combined for a total weight of the zircon body, such as, at least about 0.2 wt. % of $Ta_2O_5$ and $Yb_2O_3$ combined, at least about 0.3 wt. % of $Ta_2O_5$ and $Yb_2O_3$ combined, at least about 0.4 wt. % of $Ta_2O_5$ and $Yb_2O_3$ combined, at least about 0.5 wt. % of $Ta_2O_5$ and $Yb_2O_3$ combined, at least about 0.6 wt. % of $Ta_2O_5$ and $Yb_2O_3$ combined, at least about 0.7 wt. % of $Ta_2O_5$ and $Yb_2O_3$ combined $Ta_2O_5$ and $Yb_2O_3$ combined, at least about 0.8 wt. % of $Ta_2O_5$ and $Yb_2O_3$ combined or even at least about 0.9 wt. % of $Ta_2O_5$ and $Yb_2O_3$ combined. It will be appreciated that the content of $Ta_2O_5$ and $Yb_2O_3$ combined in wt. % for the total weight of the zircon body may be any value between any of the minimum and maximum values noted above. It will be further appreciated that the content of $Ta_2O_5$ and $Yb_2O_3$ combined in wt. % for the total weigh of the zircon body may be within a range between any of the minimum and maximum values noted above.

According to still another embodiment, the zircon body may include a particular content of $TiO_2$. For example, the zircon body may include not greater than about 1.0 wt. % of $TiO_2$ for a total weight of the zircon body, such as, not greater than about 0.8 wt. % of $TiO_2$, not greater than about 0.5 wt. % of $TiO_2$, not greater than about 0.4 wt. % of $TiO_2$, not greater than about 0.3 wt. % of $TiO_2$, not greater than about 0.2 wt. % of $TiO_2$, not greater than about 0.1 wt. % of $TiO_2$ or the zircon body may be essentially free of $TiO_2$.

According to still another embodiment, the zircon body may include a particular content of CaO. For example, the zircon body may include not greater than about 1.0 wt. % of CaO for a total weight of the zircon body, such as, not greater than about 0.8 wt. % of CaO, not greater than about 0.5 wt. % of CaO, not greater than about 0.4 wt. % of CaO, not greater than about 0.3 wt. % of CaO, not greater than about 0.2 wt. % of CaO, not greater than about 0.1 wt. % of CaO or the zircon body may be essentially free of CaO.

According to still another embodiment, the zircon body may include a particular content of MgO. For example, the zircon body may include not greater than about 1.0 wt. % of MgO for a total weight of the zircon body, such as, not greater than about 0.8 wt. % of MgO, not greater than about 0.5 wt. % of MgO, not greater than about 0.4 wt. % of MgO, not greater than about 0.3 wt. % of MgO, not greater than about 0.2 wt. % of MgO, not greater than about 0.1 wt. % of MgO or the zircon body may be essentially free of MgO.

According to still another embodiment, the zircon body may include a particular content of $K_2O$. For example, the zircon body may include not greater than about 1.0 wt. % of $K_2O$ for a total weight of the zircon body, such as, not greater than about 0.8 wt. % of $K_2O$, not greater than about 0.5 wt. % of $K_2O$, not greater than about 0.4 wt. % of $K_2O$, not greater than about 0.3 wt. % of $K_2O$, not greater than about 0.2 wt. % of $K_2O$, not greater than about 0.1 wt. % of $K_2O$ or the zircon body may be essentially free of $K_2O$.

According to still another embodiment, the zircon body may include a particular content of $Na_2O$. For example, the zircon body may include not greater than about 1.0 wt. % of $Na_2O$ for a total weight of the zircon body, such as, not greater than about 0.8 wt. % of $Na_2O$, not greater than about 0.5 wt. % of $Na_2O$, not greater than about 0.4 wt. % of $Na_2O$, not greater than about 0.3 wt. % of $Na_2O$, not greater than about 0.2 wt. % of $Na_2O$, not greater than about 0.1 wt. % of $Na_2O$ or the zircon body may be essentially free of $Na_2O$.

According to still another embodiment, the zircon body may include a particular content of $Y_2O_3$. For example, the zircon body may include not greater than about 1.0 wt. % of $Y_2O_3$ for a total weight of the zircon body, such as, not greater than about 0.8 wt. % of $Y_2O_3$, not greater than about 0.5 wt. % of $Y_2O_3$, not greater than about 0.4 wt. % of $Y_2O_3$, not greater than about 0.3 wt. % of $Y_2O_3$, not greater than about 0.2 wt. % of $Y_2O_3$, not greater than about 0.1 wt. % of $Y_2O_3$ or the zircon body may be essentially free of $Y_2O_3$.

According to still another embodiment, the zircon body may include a particular content of $P_2O_5$. For example, the zircon body may include not greater than about 1.0 wt. % of $P_2O_5$ for a total weight of the zircon body, such as, not greater than about 0.8 wt. % of $P_2O_5$, not greater than about 0.5 wt. % of $P_2O_5$, not greater than about 0.4 wt. % of $P_2O_5$, not greater than about 0.3 wt. % of $P_2O_5$, not greater than about 0.2 wt. % of $P_2O_5$, not greater than about 0.1 wt. % of $P_2O_5$ or the zircon body may be essentially free of $P_2O_5$.

According to still another embodiment, the zircon body may include a particular content of $Fe_2O_3$. For example, the zircon body may include not greater than about 1.0 wt. % of $Fe_2O_3$ for a total weight of the zircon body, such as, not greater than about 0.8 wt. % of $Fe_2O_3$, not greater than about 0.5 wt. % of $Fe_2O_3$, not greater than about 0.4 wt. % of $Fe_2O_3$, not greater than about 0.3 wt. % of $Fe_2O_3$, not greater than about 0.2 wt. % of $Fe_2O_3$, not greater than about 0.1 wt. % of $Fe_2O_3$ or the zircon body may be essentially free of $Fe_2O_3$.

According to still another embodiment, the zircon body may include a particular content of ZnO. For example, the zircon body may include not greater than about 1.0 wt. % of ZnO for a total weight of the zircon body, such as, not greater than about 0.8 wt. % of ZnO, not greater than about 0.5 wt. % of ZnO, not greater than about 0.4 wt. % of ZnO, not greater than about 0.3 wt. % of ZnO, not greater than about 0.2 wt. % of ZnO, not greater than about 0.1 wt. % of ZnO or the zircon body may be essentially free of ZnO.

According to still another embodiment, the zircon body may include a particular content of $TiO_2$, CaO, MgO, $K_2O$, $Na_2O$, $Y_2O_3$, $P_2O_5$, $Fe_2O_3$ and ZnO combined. For example, the zircon body may include not greater than about 1.5 wt. % of $TiO_2$, CaO, MgO, $K_2O$, $Na_2O$, $Y_2O_3$, $P_2O_5$, $Fe_2O_3$ and ZnO combined for a total weight of the zircon body, such as, not greater than about 1.2 wt. % of $TiO_2$, CaO, MgO, $K_2O$, $Na_2O$, $Y_2O_3$, $P_2O_5$, $Fe_2O_3$ and ZnO combined, not greater than about 1.0 wt. % of $TiO_2$, CaO, MgO, $K_2O$, $Na_2O$, $Y_2O_3$, $P_2O_5$, $Fe_2O_3$ and ZnO combined, not greater than about 0.7 wt. % of $TiO_2$, CaO, MgO, $K_2O$, $Na_2O$, $Y_2O_3$, $P_2O_5$, $Fe_2O_3$ and ZnO combined, not greater than about 0.5 wt. % of TiO₂, CaO, MgO, K₂O, Na₂O, Y₂O₃, P₂O₅, Fe₂O₃ and ZnO combined, not greater than about 0.2 wt. % of TiO₂, CaO, MgO, K₂O, Na₂O, Y₂O₃, P₂O₅, Fe₂O₃ and ZnO combined, not greater than about 0.1 wt. % of TiO₂, CaO, MgO, K₂O, Na₂O, Y₂O₃, P₂O₅, Fe₂O₃ and ZnO combined or the zircon body may be essentially free of TiO₂, CaO, MgO, K₂O, Na₂O, Y₂O₃, P₂O₅, Fe₂O₃ and ZnO combined.

In other embodiments, the zircon body may have a minimal content of metal oxides, such as, for example, rare earth oxides, alkali earth oxides, alkali oxides and any transition metal oxide not expressly disclosed herein. Rare earth oxides may include any oxide compositions that include rare earth metals from the lanthanide series (i.e., elements having atomic numbers between 57 and 71), for example, lanthanum oxide, cerium oxide and europium oxide Alkali earth oxides may include any oxide compositions that include group two metals (i.e., beryllium, magnesium, calcium, strontium, barium and radium), for example, magnesium oxide, calcium oxide and barium oxide Alkali oxides may include any oxide compositions that include group one metals, (i.e., lithium, sodium, potassium, rubidium, cesium, and francium), for example, lithium oxide, potassium oxide and cesium oxide. A zircon body that has a minimal content of any oxide noted above, for example, rare earth oxides, alkali earth oxides, alkali oxides and any transition metal oxide not expressly disclosed herein, may have a content of that oxide of not greater than about 1 wt. %, such as, not greater than about 0.7 wt. %, not greater than about 0.5 wt. % or even not greater than about 0.2 wt. % of the total weight of the zircon body.

According to a particular embodiment, refractory objects formed according to methods described herein may have zircon body that includes zircon grains and a free silica intergranular phase present between the zircon grains. Free silica may be defined as SiO₂ that is not bonded as part of the crystalline form of the zircon material or the Al₂O₃ containing component. The free silica intergranular phase may be distributed substantially uniformly to the zircon body.

According to still other embodiments, the zircon body may include a particular content of free silica. For example, the zircon body may include not greater than about 4.5 wt. % of free silica for a total weight of the zircon body, such as, not greater than about 4.0 wt. % of free silica, not greater than about 3.9 wt. % of free silica, not greater than about 3.8 wt. % of free silica, not greater than about 3.7 wt. % of free silica, not greater than about 3.6 wt. % of free silica, not greater than about 3.5 wt. % of free silica, not greater than about 3.4 wt. % of free silica, not greater than about 3.3 wt. % of free silica, not greater than about 3.2 wt. % of free silica, not greater than about 3.1 wt. % of free silica, not greater than about 3.0 wt. % of free silica, not greater than about 2.9 wt. % of free silica, not greater than about 2.8 wt. % of free silica, not greater than about 2.7 wt. % of free silica, not greater than about 2.6 wt. % of free silica, not greater than about 2.5 wt. % of free silica, not greater than about 2.4 wt. % of free silica, not greater than about 2.3 wt. % of free silica, not greater than about 2.2 wt. % of free silica, not greater than about 2.1 wt. % of free silica, not greater than about 2.0 wt. % of free silica, not greater than about 1.9 wt. % of free silica, not greater than about 1.8 wt. % of free silica, not greater than about 1.7 wt. % of free silica, not greater than about 1.6 wt. % of free silica, not greater than about 1.5 wt. % of free silica, not greater than about 1.4 wt. % of free silica, not greater than about 1.3 wt. % of free silica, not greater than about 1.2 wt. % of free silica, not greater than about 1.1 wt. % of free silica, not greater than about 1.0 wt. % of free silica or even not greater than about 0.5 wt. % of free silica. According to still other embodiments, the zircon body may include at least about 0.1 wt. % of free silica for a total weight of the zircon body, such as, at least about 0.5 wt. % of free silica, at least about 0.6 wt. % of free silica, at least about 0.7 wt. % of free silica, at least about 0.8 wt. % of free silica, at least about 0.9 wt. % of free silica, at least about 1.0 wt. % of free silica, at least about 1.1 wt. % of free silica, at least about 1.1 wt. % of free silica, at least about 1.2 wt. % of free silica, at least about 1.3 wt. % of free silica, at least about 1.4 wt. % of free silica, at least about 1.5 wt. % of free silica, at least about 1.6 wt. % of free silica, at least about 1.7 wt. % of free silica, at least about 1.8 wt. % of free silica, at least about 1.9 wt. % of free silica, at least about 2.0 wt. % of free silica, at least about 2.1 wt. % of free silica, at least about 2.2 wt. % of free silica, at least about 2.3 wt. % of free silica, at least about 2.4 wt. % of free silica, at least about 2.5 wt. % of free silica, at least about 2.6 wt. % of free silica, at least about 2.7 wt. % of free silica, at least about 2.8 wt. % of free silica, at least about 2.9 wt. % of free silica, at least about 3.0 wt. % of free silica, at least about 3.1 wt. % of free silica, at least about 3.2 wt. % of free silica, at least about 3.3 wt. % of free silica, at least about 3.4 wt. % of free silica, at least about 3.5 wt. % of free silica, at least about 3.6 wt. % of free silica, at least about 3.7 wt. % of free silica, at least about 3.8 wt. % of free silica, at least about 3.9 wt. % of free silica, at least about 4.0 wt. % of free silica or even at least about 4.5 wt. % of free silica. It will be appreciated that the content of free silica in the zircon body in wt. % for the total weight of the zircon body may be any value between any of the minimum and maximum values noted above. It will be further appreciated that the content of free silica in the zircon body in wt. % for the total weigh of the zircon body may be within a range between any of the minimum and maximum values noted above.

According to another particular embodiment, the zircon grains in the zircon body may include a particular content of free silica. For example, the zircon grains may include not greater than about 4.5 wt. % of free silica for a total weight of the zircon body, such as, not greater than about 4.0 wt. % of free silica, not greater than about 3.9 wt. % of free silica, not greater than about 3.8 wt. % of free silica, not greater than about 3.7 wt. % of free silica, not greater than about 3.6 wt. % of free silica, not greater than about 3.5 wt. % of free silica, not greater than about 3.4 wt. % of free silica, not greater than about 3.3 wt. % of free silica, not greater than about 3.2 wt. % of free silica, not greater than about 3.1 wt. % of free silica, not greater than about 3.0 wt. % of free silica, not greater than about 2.9 wt. % of free silica, not greater than about 2.8 wt. % of free silica, not greater than about 2.7 wt. % of free silica, not greater than about 2.6 wt. % of free silica, not greater than about 2.5 wt. % of free silica, not greater than about 2.4 wt. % of free silica, not greater than about 2.3 wt. % of free silica, not greater than about 2.2 wt. % of free silica, not greater than about 2.1 wt. % of free silica, not greater than about 2.0 wt. % of free silica, not greater than about 1.9 wt. % of free silica, not greater than about 1.8 wt. % of free silica, not greater than about 1.7 wt. % of free silica, not greater than about 1.6 wt. % of free silica, not greater than about 1.5 wt. % of free silica, not greater than about 1.4 wt. % of free silica, not greater than about 1.3 wt. % of free silica, not greater than about 1.2 wt. % of free silica, not greater than about 1.1 wt. % of free silica, not greater than about 1.0 wt. % of free silica or even not greater than about 0.5 wt. % of free silica. According to still other embodiments, the zircon grains may include at least about 0.1 wt. % of free silica for a total weight of the zircon body, such as, at least about 0.5 wt. % of free silica, at least about 0.6 wt. % of free silica, at least about 0.7 wt. % of free silica, at least about 0.8 wt. % of free silica, at least about 0.9 wt. % of free silica, at least about 1.0 wt. % of free silica, at least about 1.1 wt. % of free silica, at least about 1.1 wt. % of free silica, at least about 1.2 wt. % of free silica, at least about 1.3 wt. % of free silica, at least about 1.4 wt. % of free silica, at least about 1.5 wt. % of free silica, at least about 1.6 wt. % of free silica, at least about 1.7 wt. % of free silica, at least about 1.8 wt. % of free silica, at least about 1.9 wt. % of free silica, at least about 2.0 wt. % of free silica, at least about 2.1 wt. % of free silica, at least about 2.2 wt. % of free silica, at least about 2.3 wt. % of free silica, at least about 2.4 wt. % of free silica, at least about 2.5 wt. % of free silica, at least about 2.6 wt. % of free silica, at least about 2.7 wt. % of free silica, at least about 2.8 wt. % of free silica, at least about 2.9 wt. % of free silica, at least about 3.0 wt. % of free silica, at least about 3.1 wt. % of free silica, at least about 3.2 wt. % of free silica, at least about 3.3 wt. % of free silica, at least about 3.4 wt. % of free silica, at least about 3.5 wt. % of free silica, at least about 3.6 wt. % of free silica, at least about 3.7 wt. % of free silica, at least about 3.8 wt. % of free silica, at least about 3.9 wt. % of free silica, at least about 4.0 wt. % of free silica or even at least about 4.5 wt. % of free silica. It will be appreciated that the content of free silica in the zircon grains in wt. % for the total weight of the zircon body may be any value between any of the minimum and maximum values noted above. It will be further appreciated that the content of free silica in the zircon grains in wt. % for the total weigh of the zircon body may be within a range between any of the minimum and maximum values noted above.

According to still other embodiments, the zircon grains in the zircon body may have a particular average grain size. For example, the zircon grains may have an average grain size of at least about 3 µm, such as, at least about 4 µm, at least about 5 µm, at least about 6 µm, at least about 7 µm, at least about 8 µm, at least about 9 µm, at least about 10 µm, at least about 12 µm or even at least about 14 µm. According to still other embodiments, the zircon grains may have an average grain size of not greater than about 44 µm, not greater than about 30 µm, not greater than about 20 µm, not greater than about 15 µm or even not greater than about 10 µm. It will be appreciated that zircon grains in the zircon body may have an average grain size of any value between any of the maximum and minimum values noted above. It will be further appreciated the zircon grains in the zircon body may have an average grain size within a range between any of the maximum and minimum values noted above.

According to still another embodiment, the zircon body may include a particular content of apparent porosity. Apparent porosity may be measured using ASTM C20. For example, the zircon body may include an apparent porosity of at least about 0.1 vol. % for the total volume of the zircon body, such as, at least about 0.5 vol. %, at least about 1.0 vol. %, at least about 1.5 vol. %, at least about 2.0 vol. %, at least about 2.5 vol. %, at least about 3.0 vol. %, at least about 3.5 vol. %, at least about 4.0 vol. %, at least about 4.5 vol. %, at least about 5.0 vol. %, at least about 6 vol. %, at least about 7 vol. %, at least about 8 vol. %, at least about 9 vol. %, at least about 10 vol. %, at least about 11 vol. %, at least about 12 vol. %, at least about 13 vol. %, at least about or even at least about 14 vol. %. According to still other embodiments, the zircon body may include an apparent porosity of not greater than about 15 vol. % for a total volume of the zircon body, such as, not greater than about 14 vol. %, not greater than about 13 vol. %, not greater than about 12 vol. %, not greater than about 11 vol. %, not greater than about 10 vol. %, not greater than about 9 vol. %, not greater than about 8 vol. %, not greater than about 7 vol. %, not greater than about 6 vol. %, not greater than about 5 vol. %, not greater than about 4.5 vol. %, not greater than about 4.0 vol. %, not greater than about 3.5 vol. %, not greater than about 3.0 vol. %, not greater than about 2.5 vol. %, not greater than about 2.0 vol. %, not greater than about 1.5 vol. %, not greater than about 1.0 vol. % and not greater than about 0.5 vol. %. It will be appreciated that the zircon body may have an apparent porosity of any value between any of the maximum and minimum values noted above. It will be further appreciated that the zircon body may have an apparent porosity of any value within a range between any of the maximum and minimum values noted above.

Another particular embodiment of a refractory object formed as described herein may include a zircon body that may include zircon grains and the zircon body may have an outer portion and an interior portion. The intersection of the outer portion and the inner portion may be measured at a depth of 5000 µm from an outer surface of the body. The body may have a free silica intergranular phase present between the zircon grains. The outer portion of the body may have an apparent porosity measured in volume percent ($P_{op}$) and the interior portion of the body may have an apparent porosity measured in volume percent ($P_{ip}$).

Apparent porosity may be measured using ASTM C20. In certain embodiments, $P_{op}$ and $P_{ip}$ may be substantially similar. For example, $P_{op}$ and $P_{ip}$ may have a difference of not greater than about 25%, such as, not greater than about 20%, not greater than about 15%, not greater than about 10%, not greater than about 5%, not greater than about 4%, not greater than about 3% or not greater than about 2% volume. In other embodiments, $P_{op}$ and $P_{ip}$ may have a difference of at least about 1%, such as, at least about 2%, at least about 3%, at least about 4%, at least about 5% or at least about 9% volume. It will be appreciated that the difference in apparent porosity between $P_{op}$ and $P_{ip}$ may be any value between any of the maximum and minimum values noted above. It will be further appreciated that the difference in apparent porosity between $P_{op}$ and $P_{ip}$ may be any value within a range between any of the maximum and minimum values noted above.

According to still other embodiments, the zircon body may have a particular ratio of the apparent porosity of the outer portion of the body ($P_{op}$) to apparent porosity of the inner portion of the body ($P_{ip}$). The ratio may be expressed mathematically as $P_{op}/P_{ip}$. $P_{op}$ can represent the apparent porosity of the outer portion of the zircon body measured in volume percent. $P_{ip}$ can represent the apparent porosity of the interior portion of the body measured in volume percent. In certain embodiments, the body may include an apparent porosity ratio $P_{op}/P_{ip}$ of not greater than about 1.9, such as, not greater than about 1.8, not greater than about 1.7, not greater than about 1.6, not greater than about 1.5, not greater than about 1.4, not greater than about 1.3, not greater than about 1.2 or even not greater than about 1.1. In other embodiments, the body may include an apparent porosity ratio $P_{op}/P_{ip}$ of about 1. In still other embodiments, the body may include an apparent porosity ratio $P_{op}/P_{ip}$ of at least about 0.8, such as, at least about 0.85, at least about 0.9 or even at least about 0.95. It will be appreciated that the porosity ratio $P_{op}/P_{ip}$ may be any value between any of the maximum and minimum values noted above. It will be further appreciated that the porosity ratio $P_{op}/P_{ip}$ may be any value within a range between any of the maximum and minimum values noted above.

According to still other embodiment, a zircon body formed according to methods described herein may have a particular density. Density (D) may be determined using apparent specific gravity according to ASTM C20. In one embodiment, the zircon body may have a density or at least about 3.7 g/cm³, such as, 3.8 g/cm³, 3.9 g/cm³, 4.0 g/cm³, 4.1 g/cm³, at least about 4.2 g/cm³, at least about 4.3 g/cm³ or even at least about 4.4 g/cm³. In still other instances, the zircon body may have a density of not greater than about 4.5 g/cm³, such as, not greater than about 4.4 g/cm³, not greater than about 4.3 g/cm³, not greater than about 4.2 g/cm³, not greater than about 4.1 g/cm³, not greater than about 4.0 g/cm³, not greater than about 3.9 g/cm³, not greater than about 3.8 g/cm³ or even not greater than about 3.7 g/cm³. It will be appreciated that the density may be any value between any of the maximum and minimum values noted above. It will be further appreciated that the density may be any value within a range between any of the minimum and maximum values noted above.

According to still other embodiment, a zircon body formed according to methods described herein may have particular creep deformation rate for a particular temperature. Creep deformation rate may be measured using an isothermal three point or four point creep test.

In a three point isothermal creep test, a three point bending test configuration is used where two supports are placed under a sample and a single loading member applies force on top of the sample. The sample bar may have a height "a" of 2.5 mm, a width "b" of 3 mm and a length of 15 mm with a distance "L" between the outer supports of 12 mm During testing, the sample bar may be placed on the two supports and loading member may apply a stress of 2 MPa at the center of the sample bar. Testing occurs in a heating chamber. The temperature of the heating chamber during testing may be maintained at a set testing temperature, such as, for example, at a temperature of 1350° C., 1325° C. or 1300° C. for a total testing time of between 12 to 32 hours. Instantaneous displacement of the sample in millimeters (mm) may be measured during the test by measuring the displacement of the single loading member on the top surface of the sample. Sample displacement may then be used to calculate a creep deformation rate per hour (i.e., creep deformation rate) for the sample at the testing temperature under the applied stress using Hollenberg models (i.e., creep deformation rate "$R_{def}$" is derived from the displacement rate $R_{disp}$ by the formula: $R_{def}=R_{disp}*(6 \cdot a/L^2)$).

According to a particular embodiment, zircon bodies formed according to methods described herein may have a particular creep deformation rate as measured using a three point bending test at a temperature of 1350° C. under an applied stress of 2 MPa. For example, the zircon body may have a creep deformation rate as measured using a three point bending test at a temperature of 1350° C. under an applied stress of 2 MPa of not greater than about 1.1 E-4*h⁻¹, such as, not greater than about 1.0 E-4 h⁻¹ as measured using a three point bend test at a temperature of 1350° C. and a stress of 2 MPa, not greater than about 9.5 E-5 h⁻¹, not greater than about 9.0 E-5 h⁻¹, not greater than about 8.5 E-5 h⁻¹, not greater than about 8.0 E-5 h⁻¹ or even not greater than about 7.5 E-5 h⁻¹. It will be appreciated that the creep deformation rate as measured using a three point bending test at a temperature of 1350° C. under an applied stress of 2 MPa may be any value or may be not greater than any value between any of the values noted above.

According to another embodiment, zircon bodies formed according to methods described herein may have a particular creep deformation rate as measured using a three point bending test at a temperature of 1325° C. under an applied stress of 2 MPa. For example, the zircon body may have a creep deformation rate as measured using a three point bending test at a temperature of 1325° C. under an applied stress of 2 MPa of not greater than about 7.4 E-5 h⁻¹, such as, not greater than about 7.0 E-5 h⁻¹, not greater than about 6.5 E-5 h⁻¹, not greater than about 6.0 E-5 h⁻¹, not greater than about 5.5 E-5 h⁻¹ or even not greater than about 5.0 E-5 h⁻¹. It will be appreciated that the creep deformation rate as measured using a three point bending test at a temperature of 1325° C. under an applied stress of 2 MPa may be any value or may be not greater than any value between any of the values noted above.

According to still another embodiment, zircon bodies formed according to methods described herein may have a particular creep deformation rate as measured using a three point bending test at a temperature of 1300° C. under an applied stress of 2 MPa. For example, the zircon body may have a creep deformation rate as measured using a three point bending test at a temperature of 1300° C. under an applied stress of 2 MPa of not greater than about 4.0 E-5 h⁻¹, such as, not greater than about 3.9 E-5 h⁻¹ or even not greater than about 3.8 E-5 h⁻¹. It will be appreciated that the creep deformation rate as measured using a three point bending test at a temperature of 1300° C. under an applied stress of 2 MPa may be any value or may be not greater than any value between any of the values noted above.

In a four point isothermal creep test, a four point bending test configuration is used where two outer supports are placed under a sample and two inner loading members apply force on top of the sample. A distance L between the outer supports may be 80 mm and a distance l between the inner loading members may be 40 mm. The sample bar may have a height "a" of 8 mm, a width "b" of 9 mm and a length of 100 mm During testing, the sample bar may be placed on the supporting members and the loading members may apply a stress of 2 MPa on the sample bar. Testing may occur in a heating chamber. The temperature of the heating chamber during testing may be maintained at a set testing temperature, such as, for example, at a temperature of 1350° C., 1325° C., 1300° C. or 1275° C. for a total testing time of between 12 to 48 hours. The instantaneous deflection of the sample in millimeters (mm) may be measured during the test using a LVDT in contact with the bottom surface of the sample. A reference displacement is subtracted from an instantaneous displacement to provide a particular sample displacement during the test. Sample displacement may then be used to calculate the creep deformation rate per hour (i.e., creep deformation rate). The deformation rate $R_{def}$ is derived from the particular sample displacement rate "$R_{disp}$" by the formula:

$$R_{def}=R_{disp} \cdot 12 \cdot a/(3 \cdot L^2-(L-1))^2.$$

According to a particular embodiment, zircon bodies formed according to methods described herein may have a particular creep deformation rate as measured using a four point bending test at a temperature of 1350° C. under an applied stress of 2 MPa. For example, the zircon body may have a creep deformation rate as measured using a four point bending test at a temperature of 1350° C. under an applied stress of 2 MPa of not greater than about 5.0 E-5 h⁻¹, such as, not greater than about 4.9 E-5 h⁻¹, not greater than about 4.8 E-5 h⁻¹, not greater than about 4.7 E-5 h⁻¹, not greater than about 4.6 E-5 h⁻¹, not greater than about 4.5 E-5 h⁻¹, not greater than about 4.4 E-5 h$^{-1}$, not greater than about 4.3 E-5 h$^{-1}$, not greater than about 4.2 E-5 h$^{-1}$, not greater than about 4.1 E-5 h$^{-1}$, not greater than about 4.0 E-5 h$^{-1}$, not greater than about 3.9 E-5 h$^{-1}$, not greater than about 3.8 E-5 h$^{-1}$, not greater than about 3.7 E-5 h$^{-1}$, not greater than about 3.6 E-5 h$^{-1}$, not greater than about 3.5 E-5 h$^{-1}$, not greater than about 3.4 E-5 h$^{-1}$, not greater than about 3.3 E-5 h$^{-1}$, not greater than about 3.2 E-5 h$^{-1}$, not greater than about 3.1 E-5 h$^{-1}$ or even not greater than about 3.0 E-5 h$^{-1}$. It will be appreciated that the creep deformation rate as measured using a four point bending test at a temperature of 1350° C. under an applied stress of 2 MPa may be any value or may be not greater than any value between any of the values noted above.

According to another embodiment, zircon bodies formed according to methods described herein may have a particular creep deformation rate as measured using a four point bending test at a temperature of 1325° C. under an applied stress of 2 MPa. For example, the zircon body may have a creep deformation rate as measured using a four point bending test at a temperature of 1325° C. under an applied stress of 2 MPa of not greater than about 2.6 E-5 h$^{-1}$, such as, not greater than about 2.5 E-5 h$^{-1}$, not greater than about 2.4 E-5 h$^{-1}$, not greater than about 2.3 E-5 h$^{-1}$, not greater than about 2.2 E-5 h$^{-1}$, not greater than about 2.1 E-5 h$^{-1}$, not greater than about 2.0 E-5 h$^{-1}$, not greater than about 1.5 E-5 h$^{-1}$ or even not greater than about 1.5 E-5 h$^{-1}$. It will be appreciated that the creep deformation rate as measured using a four point bending test at a temperature of 1325° C. under an applied stress of 2 MPa may be any value or may be not greater than any value between any of the values noted above.

According to still another embodiment, zircon bodies formed according to methods described herein may have a particular creep deformation rate as measured using a three point bending test at a temperature of 1300° C. under an applied stress of 2 MPa. For example, the zircon body may have a creep deformation rate as measured using a three point bending test at a temperature of 1300° C. under an applied stress of 2 MPa of not greater than about 1.1 E-5 h$^{-1}$, such as, not greater than about 1.0 E-5 h$^{-1}$, not greater than about 9 E-6 h$^{-1}$, not greater than about 8 E-6 h$^{-1}$, not greater than about 7 E-6 h$^{-1}$, not greater than about 6 E-6 h$^{-1}$ or even not greater than about 5 E-6 h$^{-1}$. It will be appreciated that the creep deformation rate as measured using a four point bending test at a temperature of 1300° C. under an applied stress of 2 MPa may be any value or may be not greater than any value between any of the values noted above.

According to still another embodiment, zircon bodies formed according to methods described herein may have a particular creep deformation rate as measured using a four point bending test at a temperature of 1275° C. under an applied stress of 2 MPa. For example, the zircon body may have a creep deformation rate as measured using a four point bending test at a temperature of 1275° C. under an applied stress of 2 MPa of not greater than about 5.5 E-6 h$^{-1}$ as measured using a four point bend test at a temperature of 1275° C. and a stress of 2 MPa, not greater than about 5.4 E-6 h$^{-1}$, not greater than about 5.2 E-6 h$^{-1}$, not greater than about 5.0 E-6 h$^{-1}$, not greater than about 4.8 E-6 h$^{-1}$, not greater than about 4.6 E-6 h$^{-1}$, not greater than about 4.4 E-6 h$^{-1}$, not greater than about 4.2 E-6 h$^{-1}$ or even not greater than about 4.0 E-6 h$^{-1}$. It will be appreciated that the creep deformation rate as measured using a four point bending test at a temperature of 1275° C. under an applied stress of 2 MPa may be any value or may be not greater than any value between any of the values noted above.

According to still another embodiment, zircon bodies formed according to methods described herein may have a particular blistering value as measured using a short term or a long term blistering test conducted using a glass called LCD A glass. LCD A glass is a commercially available alkali-free boroalumino silicate glass substrate used in the production of AMLCD displays. LCD A glass contains between 58.5 and 63.0 wt. % $SiO_2$, between 15.5 and 17.0 wt. % $Al_2O_3$, between 9 and 11 wt. % $B_2O_3$ and between 10 and 15 wt. % of alkali-earth components (MgO, CaO and SrO). LCD A glass also includes a variety of other minor constituent, such as BaO and fining agents (i.e. $SnO_2$), and it is essentially free of $As_2O_3$. The sum of all constituents being 100 wt. %. Additionally LCD A glass has a density between 2.4 and 2.5 g/cc and a strain point between 650 and 670° C. after 8 hours of exposure to a temperature of 1200° C.

In a short term plaque blistering test, a square or cylinder sample was prepared. The square sample may have a length and width or 1 inch and a thickness of ¼ in. The cylinder sample may have a diameter of 1 in and a thickness of ¼ in. A face of the sample may be ground down with a 30 micron surface finish, cleaned in an ultra sound bath and dried. A glass sheet (i.e., LCD A glass) may be placed on the surface of the sample and the sample may be heated at 5° C. per minute to a testing temperature of 1200° C. The sample may be held at the testing temperature for 8 hours and then rapidly cooled at least 10° C. per minute to room temperature in order to avoid devitrification of the glass. The sample may then be cut in half and the cross section may be polished to 1 micron. A stereo-microscope or binocular may then be used to observe the cross-section and count the number of bubbles visible in a section of 3000 microns along the interface to a depth of 500 microns into the glass. The number of bubbles may then be divided by 1.5 provide the number of bubble per square mm at the interface between sample and the glass.

In a long term crucible blistering test, a crucible is core drilled from a sample block. The crucible may have a height of 40 mm and a diameter of 50 mm, with a hole in the middle of the crucible having a height of 30 mm and a diameter of 30 mm Once prepared, the crucible may be cleaned using DI water in an ultrasonic bath to eliminate any possible residues from machining and then dried. Once dried, the crucible may be filled with 20 g of broken pieces of glass (i.e., LCD A glass) and then heated up to the testing temperature and soaked for an extended period of time (72 hours, 120 hours, or 360 hours). After the soak is completed the crucible is cooled down to room temperature. The crucible is then cut vertically to expose the glass and blistering intensity is observed. In a long term crucible blistering test, the materials are tested at 1200° C. in LCD glass A for 360 hours. A stereo-microscope or binocular may then be used to observe the cross-section and count the number of bubbles visible in a section of 3000 microns along the interface to a depth of 500 microns into the glass. The number of bubbles may then be divided by 1.5 provide the number of bubble per square mm at the interface between sample and the glass.

According to particular embodiments, zircon bodies formed according to methods described herein may have a particular blistering value as measured using a short term plaque blistering test on LCD A glass. For example, the blistering value as measured using a short term plaque blistering test on LCD A glass after 8 hours of exposure to a temperature of 1200° C. may be not greater than about 8 bubbles per mm$^2$, such as, not greater than about 7 bubbles per mm$^2$, not greater than about 6 bubbles per mm$^2$, not greater than about 5 bubbles per mm$^2$, not greater than about 4 bubbles per mm$^2$, not greater than about 3 bubbles per mm$^2$, not greater than about 2 bubbles per mm$^2$ or even not greater than about 1 bubbles per mm$^2$. It will be appreciated that the blistering value as measured using a short term plaque blistering test on LCD A glass after 8 hours of exposure to a temperature of 1200° C. may be any value or may be not great than any value between any of the values noted above.

According to still another embodiment, zircon bodies formed according to methods described herein may have a particular blistering value as measured using a long term crucible blistering test measured on LCD A glass after 360 hours of exposure to a temperature of 1200° C. For example, the blistering value as measured using a long term crucible blistering test on LCD A glass after 360 hours of exposure to a temperature of 1200° C. may be not greater than about 1 bubble per mm2.

Notably, blistering values in refractory objects that include zircon formed according to embodiments described herein has been determined to be lower as compared to conventional zircon-based materials formed according to conventional methods. For example, FIG. 1 illustrates a cross-sectional image of an interface 101 between the surface of a zircon material 102 formed according to embodiments described herein and a glass layer 103 after a blistering test is conducted. Length L shows a distance of 500 microns into glass layer 103 from the surface of zircon material 102. FIG. 1 shows that no blistering occurred in zircon material 102 during the blistering test because no bubbles formed along the interface 101 to a depth of 500 microns into glass layer 103 from interface 101.

Figure 2:
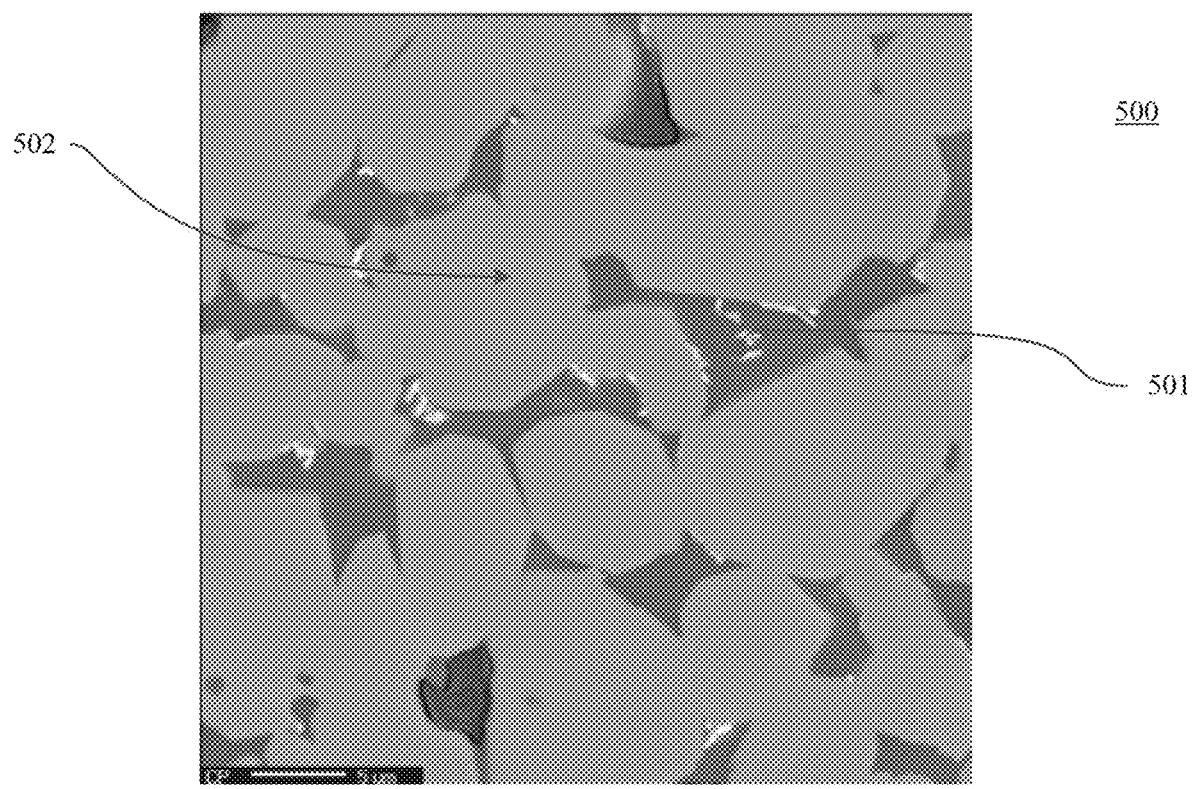
FIG. 2 includes an image of the microstructure of a zircon body of a refractory object formed according to embodiments described herein.

FIG. 2 illustrates an image of the microstructure of the zircon body of a refractory object formed according to embodiments described herein. Notably, when analyzed using scanning electron microscopy with either wavelength dispersive X-ray spectroscopy or energy dispersive X-ray spectroscopy, the zircon body 500 formed according to embodiments described herein may be shown to include zircon grains 501 and an Al$_2$O$_3$ rich intergranular phases 502.

According to a particular embodiment, the zircon body may include a maximum cross-sectional width as measured using scanning electron microscopy. For example, the Al$_2$O$_3$ rich intergranular phase may include a maximum cross-sectional width of at least about 0.5 microns, such as, at least about 0.6 microns, at least about 0.7 microns, at least about 0.8 microns, at least about 0.9 microns, at least about 1 micron, at least about 1.1 micron, at least about 1.2 micron, at least about 1.3 micron, at least about 1.4 micron, at least about 1.5 micron, at least about 2 microns, at least about 3 microns, at least about 4 microns, at least about 5 microns, at least about 6 microns, at least about 7 microns, at least about 8 microns, at least about 9 microns, at least about 10 microns. According to still other embodiments, the Al$_2$O$_3$ rich intergranular phase may include a maximum cross-sectional width of not greater than about 15 microns, such as, not greater than about 10 microns, not greater than about 9 microns, not greater than about 8 microns, not greater than about 7 microns, not greater than about 6 microns, not greater than about 5 microns, not greater than about 4 microns, not greater than about 3 microns, not greater than about 2 microns, not greater than about 1.5 microns, not greater than about 1.4 microns, not greater than about 1.3 microns, not greater than about 1.2 microns or even not greater than about 1.1 microns. It will be appreciated that the maximum cross-sectional width of the Al$_2$O$_3$ rich intergranular phase may be any value between any of the maximum and minimum values noted above. It will be further appreciated that the maximum cross-sectional width of the Al$_2$O$_3$ rich intergranular phase may be any value within a range between any of the maximum and minimum values noted above.

According to still another particular embodiment, the Al$_2$O$_3$ rich intergranular phase of the zircon body may include a particular content of Al$_2$O$_3$ as measured using scanning electron microscopy with wavelength dispersive X-ray spectroscopy. For example, the Al$_2$O$_3$ rich intergranular phase may include a content of Al$_2$O$_3$ of at least about 40 wt. % for a total weight of the Al$_2$O$_3$ rich intergranular phase as shown by wavelength dispersive X-ray spectroscopy, such as, at least about 45 wt. %, at least about 50 wt. %, at least about 55 wt. %, at least about 60 wt. %, at least about 65 wt. %, at least about 70 wt. %, at least about 80 wt. %, at least about 85 wt. % or even at least about 90 wt. %. According to still another embodiment, the Al$_2$O$_3$ rich intergranular phase may include a content of Al$_2$O$_3$ of not greater than about 95 wt. % for a total weight of the Al$_2$O$_3$ rich intergranular phase as shown by wavelength dispersive X-ray spectroscopy, such as, not greater than about 90 wt. %, not greater than about 85 wt. %, not greater than about 80 wt. %, not greater than about 75 wt. %, not greater than about 70 wt. %, not greater than about 65 wt. % or even not greater than about 60 wt. %. It will be appreciated that the content of Al$_2$O$_3$ in the Al$_2$O$_3$ rich intergranular phase may be any value between any of the maximum and minimum values noted above. It will be further appreciated that the content of Al$_2$O$_3$ in the Al$_2$O$_3$ rich intergranular phase may be any value within a range between any of the maximum and minimum values noted above.

According to still another particular embodiment, the Al$_2$O$_3$ rich intergranular phase of the zircon body may include a particular content of Al$_2$O$_3$ as measured using scanning electron microscopy with energy dispersive X-ray spectroscopy. For example, the Al$_2$O$_3$ rich intergranular phase may include a content of Al$_2$O$_3$ of at least about 40 wt. % for a total weight of the Al$_2$O$_3$ rich intergranular phase as shown by energy dispersive X-ray spectroscopy, such as, at least about 45 wt. %, at least about 50 wt. %, at least about 55 wt. %, at least about 60 wt. %, at least about 65 wt. %, at least about 70 wt. %, at least about 80 wt. %, at least about 85 wt. % or even at least about 90 wt. %. According to still another embodiment, the Al$_2$O$_3$ rich intergranular phase may include a content of Al$_2$O$_3$ of not greater than about 95 wt. % for a total weight of the Al$_2$O$_3$ rich intergranular phase as shown by wavelength dispersive X-ray spectroscopy, such as, not greater than about 90 wt. %, not greater than about 85 wt. %, not greater than about 80 wt. %, not greater than about 75 wt. %, not greater than about 70 wt. %, not greater than about 65 wt. % or even not greater than about 60 wt. %. It will be appreciated that the content of Al$_2$O$_3$ in the Al$_2$O$_3$ rich intergranular phase may be any value between any of the maximum and minimum values noted above. It will be further appreciated that the content of Al$_2$O$_3$ in the Al$_2$O$_3$ rich intergranular phase may be any value within a range between any of the maximum and minimum values noted above.

According to still another particular embodiment, the Al$_2$O$_3$ rich intergranular phase of the zircon body may include a particular content of SiO$_2$ as measured using scanning electron microscopy with wavelength dispersive X-ray spectroscopy. For example, the Al$_2$O$_3$ rich intergranular phase may include a content of SiO$_2$ of at least about 20 wt. % for a total weight of the Al$_2$O$_3$ rich intergranular phase as shown by wavelength dispersive X-ray spectroscopy, such as, at least about 23 wt. %, at least about 25 wt. %, at least about 28 wt. %, at least about 30 wt. %, at least about 33 wt. %, at least about 35 wt. %, at least about 37 wt. %, at least about 40 wt. % or even at least about 45 wt. %. According to still another embodiment, the $Al_2O_3$ rich intergranular phase may include a content of $SiO_2$ of not greater than about 50 wt. % for a total weight of the $Al_2O_3$ rich intergranular phase for a total weight of the $Al_2O_3$ rich intergranular phase as shown by wavelength dispersive X-ray spectroscopy, such as, not greater than about 45 wt. %, not greater than about 40 wt. %, not greater than about 37 wt. %, not greater than about 35 wt. %, not greater than about 33 wt. %, not greater than about 30 wt. % or even not greater than about 27 wt. %. It will be appreciated that the content of $SiO_2$ in the $Al_2O_3$ rich intergranular phase may be any value between any of the maximum and minimum values noted above. It will be further appreciated that the content of $SiO_2$ in the $Al_2O_3$ rich intergranular phase may be any value within a range between any of the maximum and minimum values noted above.

According to still another particular embodiment, the $Al_2O_3$ rich intergranular phase of the zircon body may include a particular content of $SiO_2$ as measured using scanning electron microscopy with energy dispersive X-ray spectroscopy. For example, the $Al_2O_3$ rich intergranular phase may include a content of $SiO_2$ of at least about 20 wt. % for a total weight of the $Al_2O_3$ rich intergranular phase as shown by energy dispersive X-ray spectroscopy, such as, at least about 23 wt. %, at least about 25 wt. %, at least about 28 wt. %, at least about 30 wt. %, at least about 33 wt. %, at least about 35 wt. %, at least about 37 wt. %, at least about 40 wt. % or even at least about 45 wt. %. According to still another embodiment, the $Al_2O_3$ rich intergranular phase may include a content of $SiO_2$ of not greater than about 50 wt. % for a total weight of the $Al_2O_3$ rich intergranular phase as shown by wavelength dispersive X-ray spectroscopy, such as, not greater than about 45 wt. %, not greater than about 40 wt. %, not greater than about 37 wt. %, not greater than about 35 wt. %, not greater than about 33 wt. %, not greater than about 30 wt. % or even not greater than about 27 wt. %. It will be appreciated that the content of $SiO_2$ in the $Al_2O_3$ rich intergranular phase may be any value between any of the maximum and minimum values noted above. It will be further appreciated that the content of $SiO_2$ in the $Al_2O_3$ rich intergranular phase may be any value within a range between any of the maximum and minimum values noted above.

Items

Many different aspects and embodiments are possible. Some of these aspects and embodiments are described below. After reading this specification, those skilled in the art will appreciate that these aspects and embodiments are only illustrative and do not limit the scope of the present invention. Embodiments may be in accordance with any one or more of the items as listed below.

Item 1. A refractory object comprising: a zircon body, wherein the zircon body comprises: at least about 0.1 wt. % and not greater than about 5 wt. % of an $Al_2O_3$ containing component for a total weight of the zircon body; and at least about 25 wt. % and not greater than about 35 wt. % of $SiO_2$ component for a total weight of the zircon body.

Item 2. A refractory object comprising: a zircon body, wherein the zircon body comprises: at least about 0.1 wt. % and not greater than about 5 wt. % of an $Al_2O_3$ containing component for a total weight of the zircon body; and a ratio $CB_{SiO2}/CB_{AlC}$ of at least about 5 and not greater than about 50, wherein $CB_{SiO2}$ represents a content of a $SiO_2$ component in wt. % for a total weight of the zircon body and $CB_{AlC}$ represents a content of the $Al_2O_3$ containing component in wt. % for a total weight of the zircon body.

Item 3. A refractory object comprising: a zircon body comprising zircon grains and a free silica intergranular phase present between the zircon grains and distributed substantially uniformly through the body; wherein the zircon body comprises: at least about 0.1 wt. % and not greater than about 5 wt. % of an $Al_2O_3$ containing component for a total weight of the zircon body; and at least about 0.1 wt. % and not greater than about 5 wt. % of free silica for a total weight of the zircon body.

Item 4. A refractory object comprising: a zircon body comprising a blistering value of not greater than about 8 bubbles per mm2 measured after 8 hours at a temperature of 1200° C.

Item 5. A refractory object comprising: a zircon body comprising a blistering value of not greater than about 1 bubble per mm2 measured after 360 hours at a temperature of 1200° C.

Item 6. A refractory object comprising: a zircon body comprising a creep deformation rate of not greater than about 1.1 E-4 $h^{-1}$ as measured using a three point bend test at a temperature of 1350° C. and a stress of 2 MPa.

Item 7. A refractory object comprising: a zircon body comprising a creep deformation rate of not greater than about 5.0 E-5 $h^{-1}$ as measured using a four point bend test at a temperature of 1350° C. and a stress of 2 MPa.

Item 8. A refractory object comprising: a zircon body formed from a zircon batch comprising: at least about 0.1 wt. % and not greater than about 5 wt. % of an $Al_2O_3$ containing component for a total weight of the zircon batch; and at least about 0.1 wt. % and not greater than about 5 wt. % of free silica for a total weight of the zircon batch.

Item 9. A method of forming a refractory object comprising: providing a zircon batch comprising: at least about 0.1 wt. % and not greater than about 5 wt. % of an $Al_2O_3$ containing component for a total weight of the zircon batch; and at least about 0.1 wt. % and not greater than about 5 wt. % of free silica for a total weight of the zircon batch; and forming the zircon batch into a zircon body.

Item 10. The refractory object or method of any one of items 1, 2, 3, 4, 6, 7, 8 and 9, wherein the zircon body comprises a content of zircon of at least about 50 wt. % for a total weight of the zircon body, at least about 51 wt. %, at least about 52 wt. %, at least about 53 wt. %, at least about 54 wt. %, at least about 55 wt. %, at least about 56 wt. %, at least about 57 wt. %, at least about 57.5 wt. %, at least about 58 wt. %, at least about 58.5 wt. %, at least about 59 wt. %, at least about 59.5 wt. %, at least about 60 wt. %, at least about 60.5 wt. %, at least about 61 wt. %, at least about 61.5 wt. %, at least about 62 wt. %, at least about 62.5 wt. %, at least about 63 wt. %, at least about 63.5 wt. %, at least about 64 wt. %, at least about 64.5 wt. %, at least about 65 wt. %, at least about 65.5 wt. %, at least about 66 wt. %, at least about 66.5 wt. %, at least about 67 wt. %, at least about 68 wt. %, at least about 69 wt. %, at least about 70 wt. %, at least about 75 wt. %, at least about 80 wt. %, at least about 85 wt. %, at least about 90 wt. % at least about 95 wt. %, at least about 96 wt. %, at least about 97 wt. %, at least about 98 wt. % and at least about 99 wt. %.

Item 11. The refractory object or method of any one of items 1, 2, 3, 4, 6, 7, 8 and 9, wherein the zircon body comprises a content of zircon of not greater than about 99 wt. % for a total weight of the zircon body, not greater than about 95 wt. %, not greater than about 90 wt. %, not greater than about 85 wt. %, not greater than about 80 wt. %, not greater than about 75 wt. %, not greater than about 70 wt. %, not greater than about 69 wt. %, not greater than about 68 wt. %, not greater than about 67 wt. %, not greater than about 66.5 wt. %, not greater than about 66 wt. %, not greater than about 65.5 wt. %, not greater than about 65 wt. %, not greater than about 64.5 wt. %, not greater than about 64 wt. %, not greater than about 63.5 wt. %, not greater than about 63 wt. %, not greater than about 62.5 wt. %, not greater than about 62 wt. %, not greater than about 61.5 wt. %, not greater than about 61 wt. %, not greater than about 60.5 wt. %, not greater than about 60 wt. %, not greater than about 59.5 wt. %, not greater than about 59 wt. %, not greater than about 58.5 wt. %, not greater than about 58 wt. %, not greater than about 57.5 wt. %, not greater than about 57 wt. %, not greater than about 56 wt. %, not greater than about 55 wt. %, not greater than about 54 wt. %, not greater than about 53 wt. %, not greater than about 52 wt. % and not greater than about 51 wt. %.

Item 12. The refractory object or method of any one of items 8 and 9, wherein the zircon batch comprises a content of zircon of at least about 50 wt. % for a total weight of the zircon batch, at least about 55 wt. %, at least about 60 wt. %, at least about 65 wt. %, at least about 70 wt. %, at least about 75 wt. %, at least about 80 wt. %, at least about 85 wt. %, at least about 87 wt. %, at least about 89 wt. %, at least about 90 wt. %, at least about 90.5 wt. %, at least about 91 wt. %, at least about 91.5 wt. %, at least about 92 wt. %, at least about 92.5 wt. %, at least about 93 wt. %, at least about 93.1 wt. %, at least about 93.2 wt. %, at least about 93.3 wt. %, at least about 93.4 wt. %, at least about 93.5 wt. %, at least about 93.6 wt. %, at least about 93.7 wt. %, at least about 93.8 wt. %, at least about 93.9 wt. %, at least about 94 wt. %, at least about 94.1 wt. %, at least about 94.2 wt. %, at least about 94.3 wt. %, at least about 94.4 wt. %, at least about 94.5 wt. %, at least about 94.6 wt. %, at least about 94.7 wt. %, at least about 94.8 wt. %, at least about 94.9 wt. %, at least about 95 wt. %, at least about 96 wt. %, at least about 97 wt. %, at least about 98 wt. % and at least about 99 wt. %.

Item 13. The refractory object or method of any one of items 8 and 9, wherein the zircon batch comprises a content of zircon of not greater than about 99 wt. % for a total weight of the zircon batch, not greater than about 97.5 wt. %, not greater than about 97 wt. %, not greater than about 96.5 wt. %, not greater than about 96 wt. %, not greater than about 95.5 wt. %, not greater than about 95 wt. %, not greater than about 94.9 wt. %, not greater than about 94.8 wt. %, not greater than about 94.7 wt. %, not greater than about 94.6 wt. %, not greater than about 94.5 wt. %, not greater than about 94.4 wt. %, not greater than about 94.3 wt. %, not greater than about 94.2 wt. %, not greater than about 94.1 wt. %, not greater than about 94 wt. %, not greater than about 93.9 wt. %, not greater than about 93.8 wt. %, not greater than about 93.7 wt. %, not greater than about 93.6 wt. %, not greater than about 93.5 wt. %, not greater than about 93.4 wt. %, not greater than about 93.3 wt. %, not greater than about 93.2 wt. %, not greater than about 93.1 wt. %, not greater than about 93 wt. %, not greater than about 92.5 wt. %, not greater than about 92.0 wt. %, not greater than about 91.5 wt. %, not greater than about 91 wt. %, not greater than about 90.5 wt. %, not greater than about 90 wt. %, not greater than about 89 wt. %, not greater than about 87 wt. %, not greater than about 85 wt. %, not greater than about 80 wt. %, not greater than about 75 wt. %, not greater than about 70 wt. %, not greater than about 65 wt. %, not greater than about 60 wt. % and not greater than about 55 wt. %.

Item 14. The refractory object or method of any one of items 4, 5, 6, 7, 8 and 9, wherein the zircon body comprises at least about 0.1 wt. % and not greater than about 5 wt. % of an $Al_2O_3$ containing component for a total weight of the zircon body.

Item 15. The refractory object or method of any one of items 1, 2, 3 and 14, wherein the zircon body comprises not greater than about 4.9 wt. % of the $Al_2O_3$ containing component for a total weight of the zircon body, not greater than about 4.8 wt. % of the $Al_2O_3$ containing component, not greater than about 4.7 wt. % of the $Al_2O_3$ containing component, not greater than about 4.6 wt. % of the $Al_2O_3$ containing component, not greater than about 4.5 wt. % of the $Al_2O_3$ containing component, not greater than about 4.4 wt. % of the $Al_2O_3$ containing component, not greater than about 4.3 wt. % of the $Al_2O_3$ containing component, not greater than about 4.2 wt. % of the $Al_2O_3$ containing component, not greater than about 4.1 wt. % of the $Al_2O_3$ containing component, not greater than about 4.0 wt. % of the $Al_2O_3$ containing component, not greater than about 3.9 wt. % of the $Al_2O_3$ containing component, not greater than about 3.8 wt. % of the $Al_2O_3$ containing component, not greater than about 3.7 wt. % of the $Al_2O_3$ containing component, not greater than about 3.6 wt. % of the $Al_2O_3$ containing component and not greater than about 3.5 wt. % of the $Al_2O_3$ containing component.

Item 16. The refractory object or method of any one of items 1, 2, 3, 14 and 15, wherein the zircon body comprises at least about 0.2 wt. % of the $Al_2O_3$ containing component for a total weight of the zircon body, at least about 0.5 wt. % of the $Al_2O_3$ containing component, at least about 1.0 wt. % of the $Al_2O_3$ containing component, at least about 1.5 wt. % of the $Al_2O_3$ containing component, at least about 1.6 wt. % of the $Al_2O_3$ containing component, at least about 1.7 wt. % of the $Al_2O_3$ containing component, at least about 1.8 wt. % of the $Al_2O_3$ containing component, at least about 1.9 wt. % of the $Al_2O_3$ containing component, at least about 2.0 wt. % of the $Al_2O_3$ containing component, at least about 2.1 wt. % of the $Al_2O_3$ containing component, at least about 2.2 wt. % of the $Al_2O_3$ containing component, at least about 2.3 wt. % of the $Al_2O_3$ containing component, at least about 2.4 wt. % of the $Al_2O_3$ containing component, at least about 2.5 wt. % of the $Al_2O_3$ containing component, at least about 2.6 wt. % of the $Al_2O_3$ containing component, at least about 2.7 wt. % of the $Al_2O_3$ containing component, at least about 2.8 wt. % of the $Al_2O_3$ containing component, at least about 2.9 wt. % of the $Al_2O_3$ containing component, at least about 3.0 wt. % of the $Al_2O_3$ containing component and at least about 3.1 wt. % of the $Al_2O_3$ containing component.

Item 17. The refractory object or method of any one of items 8 and 9, wherein the zircon batch comprises not greater than about 4.9 wt. % of the $Al_2O_3$ containing component for a total weight of the zircon batch, not greater than about 4.8 wt. % of the $Al_2O_3$ containing component, not greater than about 4.7 wt. % of the $Al_2O_3$ containing component, not greater than about 4.6 wt. % of the $Al_2O_3$ containing component, not greater than about 4.5 wt. % of the $Al_2O_3$ containing component, not greater than about 4.4 wt. % of the $Al_2O_3$ containing component, not greater than about 4.3 wt. % of the $Al_2O_3$ containing component, not greater than about 4.2 wt. % of the $Al_2O_3$ containing component, not greater than about 4.1 wt. % of the $Al_2O_3$ containing component, not greater than about 4.0 wt. % of the $Al_2O_3$ containing component, not greater than about 3.9 wt. % of the $Al_2O_3$ containing component, not greater than about 3.8 wt. % of the $Al_2O_3$ containing component, not greater than about 3.7 wt. % of the $Al_2O_3$ containing component, not greater than about 3.6 wt. % of the $Al_2O_3$ containing component and not greater than about 3.5 wt. % of the $Al_2O_3$ containing component.

Item 18. The refractory object or method of any one of items 8 and 9, wherein the zircon batch comprises at least about 0.2 wt. % of the $Al_2O_3$ containing component for a total weight of the zircon batch, at least about 0.5 wt. % of the $Al_2O_3$ containing component, at least about 1.0 wt. % of the $Al_2O_3$ containing component, at least about 1.5 wt. % of the $Al_2O_3$ containing component, at least about 1.6 wt. % of the $Al_2O_3$ containing component, at least about 1.7 wt. % of the $Al_2O_3$ containing component, at least about 1.8 wt. % of the $Al_2O_3$ containing component, at least about 1.9 wt. % of the $Al_2O_3$ containing component, at least about 2.0 wt. % of the $Al_2O_3$ containing component, at least about 2.1 wt. % of the $Al_2O_3$ containing component, at least about 2.2 wt. % of the $Al_2O_3$ containing component, at least about 2.3 wt. % of the $Al_2O_3$ containing component, at least about 2.4 wt. % of the $Al_2O_3$ containing component, at least about 2.5 wt. % of the $Al_2O_3$ containing component, at least about 2.6 wt. % of the $Al_2O_3$ containing component, at least about 2.7 wt. % of the $Al_2O_3$ containing component, at least about 2.8 wt. % of the $Al_2O_3$ containing component, at least about 2.9 wt. % of the $Al_2O_3$ containing component, at least about 3.0 wt. % of the $Al_2O_3$ containing component and at least about 3.1 wt. % of the $Al_2O_3$ containing component.

Item 19. The refractory object or method of any one of items 2, 3, 4, 5, 6, 7, 8 and 9, wherein the zircon body comprises at least about 25 wt. % and not greater than about 35 wt. % of a $SiO_2$ component for a total weight of the zircon body.

Item 20. The refractory object or method of any one of items 1 and 19, wherein the zircon body comprises not greater than about 34.5 wt. % of a $SiO_2$ component for a total weight of the zircon body, not greater than about 33 wt. % of a $SiO_2$ component, not greater than about 32.5 wt. % of a $SiO_2$ component, not greater than about 32 wt. % of a $SiO_2$ component, not greater than about 31.5 wt. % of a $SiO_2$ component, not greater than about 30 wt. % of a $SiO_2$ component, not greater than about 29.5 wt. % of a $SiO_2$ component, not greater than about 29 wt. % of a $SiO_2$ component, not greater than about 28.5 wt. % of a $SiO_2$ component, not greater than about 28 wt. % of a $SiO_2$ component, not greater than about 27.5 wt. % of a $SiO_2$ component, not greater than about 27 wt. % of a $SiO_2$ component and not greater than about 26.5 wt. % of a $SiO_2$ component.

Item 21. The refractory object or method of any one of items 1, 13 and 19, wherein the zircon body comprises at least about 25.5 wt. % of a $SiO_2$ component for a total weight of the zircon body, at least about 26 wt. % of a $SiO_2$ component, at least about 26.5 wt. % of a $SiO_2$ component, at least about 27 wt. % of a $SiO_2$ component, at least about 27.5 wt. % of a $SiO_2$ component, at least about 28 wt. % of a $SiO_2$ component, at least about 28.5 wt. % of a $SiO_2$ component, at least about 29 wt. % of a $SiO_2$ component, at least about 29.5 wt. % of a $SiO_2$ component, at least about 30 wt. % of a $SiO_2$ component, at least about 30.5 wt. % of a $SiO_2$ component, at least about 31 wt. % of a $SiO_2$ component, at least about 31.5 wt. % of a $SiO_2$ component, at least about 32 wt. % of a $SiO_2$ component, at least about 32.5 wt. % of a $SiO_2$ component, at least about 33 wt. % of a $SiO_2$ component, at least about 33.5 wt. % of a $SiO_2$ component, about 34 wt. % of a $SiO_2$ component and about 34.5 wt. % of a $SiO_2$ component.

Item 22. The refractory object or method of any one of items 8 and 9, wherein the zircon batch comprises not greater than about 4.5 wt. % of free silica for a total weight of the zircon batch, not greater than about 4.0 wt. % of free silica, not greater than about 3.9 wt. % of free silica, not greater than about 3.8 wt. % of free silica, not greater than about 3.7 wt. % of free silica, not greater than about 3.6 wt. % of free silica, not greater than about 3.5 wt. % of free silica, not greater than about 3.4 wt. % of free silica, not greater than about 3.3 wt. % of free silica, not greater than about 3.2 wt. % of free silica, not greater than about 3.1 wt. % of free silica, not greater than about 3.0 wt. % of free silica, not greater than about 2.9 wt. % of free silica, not greater than about 2.8 wt. % of free silica, not greater than about 2.7 wt. % of free silica, not greater than about 2.6 wt. % of free silica, not greater than about 2.5 wt. % of free silica, not greater than about 2.4 wt. % of free silica, not greater than about 2.3 wt. % of free silica, not greater than about 2.2 wt. % of free silica, not greater than about 2.1 wt. % of free silica, not greater than about 2.0 wt. % of free silica, not greater than about 1.9 wt. % of free silica, not greater than about 1.8 wt. % of free silica, not greater than about 1.7 wt. % of free silica, not greater than about 1.6 wt. % of free silica, not greater than about 1.5 wt. % of free silica, not greater than about 1.4 wt. % of free silica, not greater than about 1.3 wt. % of free silica, not greater than about 1.2 wt. % of free silica, not greater than about 1.1 wt. % of free silica, not greater than about 1.0 wt. % of free silica and not greater than about 0.5 wt. % of free silica.

Item 23. The refractory object or method of any one of items 8 and 9, wherein the zircon batch comprises at least about 0.1 wt. % of free silica for a total weight of the zircon batch, at least about 0.5 wt. % of free silica, at least about 0.6 wt. % of free silica, at least about 0.7 wt. % of free silica, at least about 0.8 wt. % of free silica, at least about 0.9 wt. % of free silica, at least about 1.0 wt. % of free silica, at least about 1.1 wt. % of free silica, at least about 1.1 wt. % of free silica, at least about 1.2 wt. % of free silica, at least about 1.3 wt. % of free silica, at least about 1.4 wt. % of free silica, at least about 1.5 wt. % of free silica, at least about 1.6 wt. % of free silica, at least about 1.7 wt. % of free silica, at least about 1.8 wt. % of free silica, at least about 1.9 wt. % of free silica, at least about 2.0 wt. % of free silica, at least about 2.1 wt. % of free silica, at least about 2.2 wt. % of free silica, at least about 2.3 wt. % of free silica, at least about 2.4 wt. % of free silica, at least about 2.5 wt. % of free silica, at least about 2.6 wt. % of free silica, at least about 2.7 wt. % of free silica, at least about 2.8 wt. % of free silica, at least about 2.9 wt. % of free silica, at least about 3.0 wt. % of free silica, at least about 3.1 wt. % of free silica, at least about 3.2 wt. % of free silica, at least about 3.3 wt. % of free silica, at least about 3.4 wt. % of free silica, at least about 3.5 wt. % of free silica, at least about 3.6 wt. % of free silica, at least about 3.7 wt. % of free silica, at least about 3.8 wt. % of free silica, at least about 3.9 wt. % of free silica, at least about 4.0 wt. % of free silica and at least about 4.5 wt. % of free silica.

Item 24. The refractory object or method of any one of items 1, 3, 4, 5, 6, 7, 8 and 9, wherein the zircon body comprises a ratio $CB_{SiO2}/CB_{AlC}$ of at least about 5 and not greater than about 50, wherein $CB_{SiO2}$ represents a content of a $SiO_2$ component in wt. % for a total weight of the zircon body and $CB_{AlC}$ represents a content of the $Al_2O_3$ containing component in wt. % for a total weight of the zircon body.

Item 25. The refractory object or method of any one of items 2 and 24, wherein the zircon body comprises a ratio $CB_{SiO2}/CB_{AlC}$ of at least about 8, at least about 10, at least about 13, at least about 15, at least about 18, at least about 20, at least about 23, at least about 25, at least about 28, at least about 30, at least about 33, at least about 35, at least about 38, at least about 40, at least about 43, at least about 45 and at least about 48.

Item 26. The refractory object or method of any one of items 2, 24 and 25, wherein the zircon body comprises a ratio $CB_{SiO2}/CB_{AlC}$ of not greater than about 47, not greater than about 45, not greater than about 42, not greater than about 40, not greater than about 37, not greater than about 35, not greater than about 32, not greater than about 30, not greater than about 27, not greater than about 20, not greater than about 17, not greater than about 12, not greater than about 10 and not greater than about 7.

Item 27. The refractory object or method of any one of items 8 and 9, wherein the zircon batch comprises a ratio $CM_{SiO2}/CM_{AlC}$ of at least about 5 and not greater than about 50, wherein $CM_{SiO2}$ represents a content of a $SiO_2$ component in wt. % for a total weight of the zircon batch and $CM_{AlC}$ represents a content of the $Al_2O_3$ containing component in wt. % for a total weight of the zircon batch.

Item 28. The refractory object or method of item 27, wherein the zircon batch comprises a ratio $CM_{SiO2}/CM_{AlC}$ of at least about 8, at least about 10, at least about 13, at least about 15, at least about 18, at least about 20, at least about 23, at least about 25, at least about 28, at least about 30, at least about 33, at least about 35, at least about 38, at least about 40, at least about 43, at least about 45 and at least about 48.

Item 29. The refractory object or method of any one of items 27 and 28, wherein the zircon batch comprises a ratio $CM_{SiO2}/CM_{AlC}$ of not greater than about 47, not greater than about 45, not greater than about 42, not greater than about 40, not greater than about 37, not greater than about 35, not greater than about 32, not greater than about 30, not greater than about 27, not greater than about 20, not greater than about 17, not greater than about 12, not greater than about 10 and not greater than about 7.

Item 30. The refractory object or method of any one of items 1, 2, 3, 4, 5, 6, 7, 8 and 9, wherein the zircon body comprises a ratio of $CB_{AlC}/CB_Z$ of not greater than about 0.08, wherein $CB_{AlC}$ represents a content of the $Al_2O_3$ containing component in wt. % for a total weight of the zircon body and $CB_Z$ represents a content of zircon in wt. % for the total weight of the zircon body, not greater than about 0.075, not greater than about 0.07, not greater than about 0.065, not greater than about 0.06, not greater than about 0.055, not greater than about 0.05, not greater than about 0.045, not greater than about 0.04, not greater than about 0.035, not greater than about 0.030, not greater than about 0.025, not greater than about 0.02, not greater than about 0.015 and not greater than about 0.01.

Item 31. The refractory object or method of any one of items 1, 2, 3, 4, 5, 6, 7, 8, 9 and 30, wherein the zircon body comprises a ratio of $CB_{AlC}/CB_Z$ of at least about 0.002, wherein $CB_{AlC}$ represents a content of the $Al_2O_3$ containing component in wt. % for a total weight of the zircon body and $CB_Z$ represents a content of zircon in wt. % for the total weight of the zircon body, at least about 0.005, at least about 0.01, at least about at least about 0.02, at least about 0.03, at least about 0.035, at least about 0.04, at least about 0.045, at least about 0.05, at least about 0.055, at least about 0.06, at least about 0.065, at least about 0.07, at least about 0.075, at least about 0.08, at least about 0.085 and at least about 0.09.

Item 32. The refractory object or method of any one of items 8 and 9, wherein the zircon batch comprises a ratio of $CM_{AlC}/CM_Z$ of not greater than about 0.08, wherein $CM_{AlC}$ represents a content of the $Al_2O_3$ containing component in wt. % for a total weight of the zircon batch and $CM_Z$ represents a content of zircon in wt. % for the total weight of the zircon batch, at least about 0.005, at least about 0.01, at least about at least about 0.02, at least about 0.03, at least about 0.035, at least about 0.04, at least about 0.045, at least about 0.05, at least about 0.055, at least about 0.06, at least about 0.065, at least about 0.07, at least about 0.075, at least about 0.08, at least about 0.085 and at least about 0.09.

Item 33. The refractory object or method of any one of items 8 and 9, wherein the zircon batch comprises a ratio of $CM_{AlC}/CM_Z$ of at least about 0.002, wherein $CM_{AlC}$ represents a content of the $Al_2O_3$ containing component in wt. % for a total weight of the zircon batch and $CM_Z$ represents a content of zircon in wt. % for the total weight of the zircon batch, at least about 0.015, at least about 0.02, at least about at least about 0.025, at least about 0.03, at least about 0.035, at least about 0.04, at least about 0.045, at least about 0.05, at least about 0.055, at least about 0.06, at least about 0.065, at least about 0.07, at least about 0.075, at least about 0.08, at least about 0.085 and at least about 0.09.

Item 34. The refractory object or method of any one of items 1, 2, 3, 4, 5, 6, 7, 8 and 9, wherein the zircon body comprises a ratio $CB_{Ta2O5}/CB_{SiO2}$ of not greater than about 5, where $CB_{Ta2O5}$ represents a content of $Ta_2O_5$ in wt. % for a total weight of the zircon body and $CB_{SiO2}$ represents a content of a $SiO_2$ component in wt. % for a total weight of the zircon body, not greater than about 4, not greater than about 3, not greater than about 2, not greater than about 1, not greater than about 0.5, not greater than about 0.1, not greater than about 0.05, not greater than about 0.04, not greater than about 0.03 and not greater than about 0.02.

Item 35. The refractory object or method of any one of items 1, 2, 3, 4, 5, 6, 7, 8, 9 and 34, wherein the zircon body comprises a ratio $CB_{Ta2O5}/CB_{SiO2}$ of at least about 0.001, where $CB_{Ta2O5}$ represents a content of $Ta_2O_5$ in wt. % for a total weight of the zircon body and $CB_{SiO2}$ represents a content of a $SiO_2$ component in wt. % for a total weight of the zircon body, at least about 0.005, at least about 0.01, at least about 0.02 and at least about 0.03.

Item 36. The refractory object or method of any one of items 8 and 9, wherein the zircon batch comprises a ratio $CM_{Ta2O5}/CM_{SiO2}$ of not greater than about 0.5, where $CM_{Ta2O5}$ represents a content of $Ta_2O_5$ in wt. % for a total weight of the zircon batch and $CM_{SiO2}$ represents a content of a $SiO_2$ component in wt. % for a total weight of the zircon batch, not greater than about 0.1, not greater than about 0.05, not greater than about 0.04, not greater than about 0.03 and not greater than about 0.02.

Item 37. The refractory object or method of any one of items 8, 9 and 36, wherein the zircon batch comprises a ratio $CM_{Ta2O5}/CM_{SiO2}$ of at least about 0.001, where $CM_{Ta2O5}$ represents a content of $Ta_2O_5$ in wt. % for a total weight of the zircon batch and $CM_{SiO2}$ represents a content of a $SiO_2$ component in wt. % for a total weight of the zircon batch, at least about 0.005, at least about 0.01, at least about 0.02 and at least about 0.03.

Item 38. The refractory object or method of any one of items 1, 2, 3, 8, 9 and 14, wherein the $Al_2O_3$ containing component comprises alumina.

Item 39. The refractory object or method of item 38, wherein the $Al_2O_3$ containing component comprises at least about 1 wt. % alumina for a total weight of the $Al_2O_3$ containing component, at least about 2 wt. % alumina, at least about 5 wt. % alumina, at least about 10 wt. % alumina, at least about 15 wt. % alumina, at least about 20 wt. % alumina, at least about 25 wt. % alumina, at least about 30 wt. % alumina, at least about 35 wt. % alumina, at least about 40 wt. % alumina, at least about 45 wt. % alumina, at least about 50 wt. % alumina, at least about 55 wt. % alumina, at least about 60 wt. % alumina, at least about 65 wt. % alumina, at least about 70 wt. % alumina, at least about 75 wt. % alumina, at least about 80 wt. % alumina, at least about 85 wt. % alumina, at least about 90 wt. % alumina, at least about 95 wt. % alumina and consists essentially of alumina.

Item 40. The refractory object or method of any one of items 1, 2, 3, 8, 9 and 14, wherein the $Al_2O_3$ containing component comprises mullite.

Item 41. The refractory object or method of item 40, wherein the $Al_2O_3$ containing component comprises at least about 1 wt. % mullite for a total weight of the $Al_2O_3$ containing component, at least about 2 wt. % mullite, at least about 5 wt. % mullite, at least about 10 wt. % mullite, at least about 15 wt. % mullite, at least about 20 wt. % mullite, at least about 25 wt. % mullite, at least about 30 wt. % mullite, at least about 35 wt. % mullite, at least about 40 wt. % mullite, at least about 45 wt. % mullite, at least about 50 wt. % mullite, at least about 55 wt. % mullite, at least about 60 wt. % mullite, at least about 65 wt. % mullite, at least about 70 wt. % mullite, at least about 75 wt. % mullite, at least about 80 wt. % mullite, at least about 85 wt. % mullite, at least about 90 wt. % mullite, at least about 95 wt. % mullite and consists essentially of mullite.

Item 42. The refractory object or method of any one of items 40 and 41, wherein the mullite comprises Al6Si2O13, wherein the mullite consists essentially of Al6Si2O13.

Item 43. The refractory object or method of any one of items 1, 2, 3, 8, 9 and 14, wherein the $Al_2O_3$ containing component comprises an aluminosilicate species, wherein the aluminosilicate species comprise at least one of a non-stoichiometric mullite, stoichiometric mullite, and a combination thereof, wherein the $Al_2O_3$ containing component comprises a combination of a an aluminate species and an aluminosilicate species, wherein the $Al_2O_3$ containing component comprises an aluminate species and an aluminosilicate species, and wherein the aluminosilicate species is present in a greater content than the aluminate species.

Item 44. The refractory object or method of any one of items 1, 2, 3, 4, 5, 6, 7, 8 and 9, wherein the zircon body comprises not greater than about 3.0 wt. % of $Ta_2O_5$ for a total weight of the zircon body, not greater than about 2.5 wt. % of $Ta_2O_5$, not greater than about 2.0 wt. % of $Ta_2O_5$, not greater than about 1.5 wt. % of $Ta_2O_5$, not greater than about 1.0 wt. % of $Ta_2O_5$, not greater than about 0.5 wt. % of $Ta_2O_5$, not greater than about 0.1 wt. % of $Ta_2O_5$ and is essentially free of $Ta_2O_5$.

Item 45. The refractory object or method of any one of items 1, 2, 3, 4, 5, 6, 7, 8 and 9, wherein the zircon body comprises at least about 0.1 wt. % of $Ta_2O_5$ for a total weight of the zircon body, at least about 0.2 wt. % of $Ta_2O_5$, at least about 0.3 wt. % of $Ta_2O_5$, at least about 0.4 wt. % of $Ta_2O_5$, at least about 0.5 wt. % of $Ta_2O_5$, at least about 0.6 wt. % of $Ta_2O_5$, at least about 0.7 wt. % of $Ta_2O_5$, at least about 0.8 wt. % of $Ta_2O_5$ and at least about 0.9 wt. % of $Ta_2O_5$.

Item 46. The refractory object or method of any one of items 8 and 9, wherein the zircon batch comprises not greater than about 3.0 wt. % of $Ta_2O_5$ for a total weight of the zircon batch, not greater than about 2.5 wt. % of $Ta_2O_5$, not greater than about 2.0 wt. % of $Ta_2O_5$, not greater than about 1.5 wt. % of $Ta_2O_5$, not greater than about 1.0 wt. % of $Ta_2O_5$, not greater than about 0.5 wt. % of $Ta_2O_5$, not greater than about 0.1 wt. % of $Ta_2O_5$ and is essentially free of $Ta_2O_5$.

Item 47. The refractory object or method of any one of items 8 and 9, wherein the zircon batch comprises at least about 0.1 wt. % of $Ta_2O_5$ for a total weight of the zircon batch, at least about 0.2 wt. % of $Ta_2O_5$, at least about 0.3 wt. % of $Ta_2O_5$, at least about 0.4 wt. % of $Ta_2O_5$, at least about 0.5 wt. % of $Ta_2O_5$, at least about 0.6 wt. % of $Ta_2O_5$, at least about 0.7 wt. % of $Ta_2O_5$, at least about 0.8 wt. % of $Ta_2O_5$ and at least about 0.9 wt. % of $Ta_2O_5$.

Item 48. The refractory object or method of any one of items 1, 2, 3, 4, 5, 6, 7, 8 and 9, wherein the zircon body comprises not greater than about 5.0 wt. % of $Yb_2O_3$ for a total weight of the zircon body, not greater than about 4.5 wt. % of $Yb_2O_3$, not greater than about 4.0 wt. % of $Yb_2O_3$, not greater than about 3.5 wt. % of $Yb_2O_3$, not greater than about 3.0 wt. % of $Yb_2O_3$, not greater than about 2.5 wt. % of $Yb_2O_3$, not greater than about 2.0 wt. % of $Yb_2O_3$, not greater than about 1.5 wt. % of $Yb_2O_3$, not greater than about 1.0 wt. % of $Yb_2O_3$, not greater than about 0.5 wt. % of $Yb_2O_3$, not greater than about 0.1 wt. % of $Yb_2O_3$ and is essentially free of $Yb_2O_3$.

Item 49. The refractory object or method of any one of items 1, 2, 3, 4, 5, 6, 7, 8 and 9, wherein the zircon body comprises at least about 0.1 wt. % of $Yb_2O_3$ for a total weight of the zircon body, at least about 0.2 wt. % of $Yb_2O_3$, at least about 0.3 wt. % of $Yb_2O_3$, at least about 0.4 wt. % of $Yb_2O_3$, at least about 0.5 wt. % of $Yb_2O_3$, at least about 0.6 wt. % of $Yb_2O_3$, at least about 0.7 wt. % of $Yb_2O_3$, at least about 0.8 wt. % of $Yb_2O_3$ and at least about 0.9 wt. % of $Yb_2O_3$.

Item 50. The refractory object or method of any one of items 8 and 9, wherein the zircon batch comprises not greater than about 5.0 wt. % of $Yb_2O_3$ for a total weight of the zircon batch, not greater than about 4.5 wt. % of $Yb_2O_3$, not greater than about 4.0 wt. % of $Yb_2O_3$, not greater than about 3.5 wt. % of $Yb_2O_3$, not greater than about 3.0 wt. % of $Yb_2O_3$, not greater than about 2.5 wt. % of $Yb_2O_3$, not greater than about 2.0 wt. % of $Yb_2O_3$, not greater than about 1.5 wt. % of $Yb_2O_3$, not greater than about 1.0 wt. % of $Yb_2O_3$, not greater than about 0.5 wt. % of $Yb_2O_3$, not greater than about 0.1 wt. % of $Yb_2O_3$ and is essentially free of $Yb_2O_3$.

Item 51. The refractory object or method of any one of items 8 and 9, wherein the zircon batch comprises at least about 0.1 wt. % of $Yb_2O_3$ for a total weight of the zircon batch, at least about 0.2 wt. % of $Yb_2O_3$, at least about 0.3 wt. % of $Yb_2O_3$, at least about 0.4 wt. % of $Yb_2O_3$, at least about 0.5 wt. % of $Yb_2O_3$, at least about 0.6 wt. % of $Yb_2O_3$, at least about 0.7 wt. % of $Yb_2O_3$, at least about 0.8 wt. % of $Yb_2O_3$ and at least about 0.9 wt. % of $Yb_2O_3$.

Item 52. The refractory object or method of any one of items 1, 2, 3, 4, 5, 6, 7, 8 and 9, wherein the zircon body comprises not greater than about 5.0 wt. % of $Ta_2O_5$ and $Yb_2O_3$ combined for a total weight of the zircon body, not greater than about 4.0 wt. % of $Ta_2O_5$ and $Yb_2O_3$ combined, not greater than about 3.0 wt. % of $Ta_2O_5$ and $Yb_2O_3$ combined, not greater than about 2.0 wt. % of $Ta_2O_5$ and $Yb_2O_3$ combined, not greater than about 1.0 wt. % of $Ta_2O_5$ and $Yb_2O_3$ combined, not greater than about 0.5 wt. % of $Ta_2O_5$ and $Yb_2O_3$ combined, not greater than about 0.1 wt. % of $Ta_2O_5$ and $Yb_2O_3$ combined and is essentially free of $Ta_2O_5$ and $Yb_2O_3$ combined.

Item 53. The refractory object or method of any one of items 1, 2, 3, 4, 5, 6, 7, 8 and 9, wherein the zircon body comprises at least about 0.1 wt. % of $Ta_2O_5$ and $Yb_2O_3$ combined for a total weight of the zircon body, at least about 0.2 wt. % of $Ta_2O_5$ and $Yb_2O_3$ combined, at least about 0.3 wt. % of $Ta_2O_5$ and $Yb_2O_3$ combined, at least about 0.4 wt. % of $Ta_2O_5$ and $Yb_2O_3$ combined, at least about 0.5 wt. % of $Ta_2O_5$ and $Yb_2O_3$ combined, at least about 0.6 wt. % of $Ta_2O_5$ and $Yb_2O_3$ combined, at least about 0.7 wt. % of $Ta_2O_5$ and $Yb_2O_3$ combined, at least about 0.8 wt. % of $Ta_2O_5$ and $Yb_2O_3$ combined at least about 0.9 wt. % of $Ta_2O_5$ and $Yb_2O_3$ combined.

Item 54. The refractory object or method of any one of items 8 and 9, wherein the zircon batch comprises not greater than about 5.0 wt. % of $Ta_2O_5$ and $Yb_2O_3$ combined a total weight of the zircon batch, not greater than about 4.0 wt. % of $Ta_2O_5$ and $Yb_2O_3$ combined, not greater than about 3.0 wt. % of $Ta_2O_5$ and $Yb_2O_3$ combined, not greater than about 2.0 wt. % of $Ta_2O_5$ and $Yb_2O_3$ combined, not greater than about 1.0 wt. % of $Ta_2O_5$ and $Yb_2O_3$ combined, not greater than about 0.5 wt. % of $Ta_2O_5$ and $Yb_2O_3$ combined, not greater than about 0.1 wt. % of $Ta_2O_5$ and $Yb_2O_3$ combined and is essentially free of $Ta_2O_5$ and $Yb_2O_3$ combined.

Item 55. The refractory object or method of any one of items 8 and 9, wherein the zircon batch comprises at least about 0.1 wt. % of $Ta_2O_5$ and $Yb_2O_3$ combined a total weight of the zircon batch, at least about 0.2 wt. % of $Ta_2O_5$ and $Yb_2O_3$ combined, at least about 0.3 wt. % of $Ta_2O_5$ and $Yb_2O_3$ combined, at least about 0.4 wt. % of $Ta_2O_5$ and $Yb_2O_3$ combined, at least about 0.5 wt. % of $Ta_2O_5$ and $Yb_2O_3$ combined, at least about 0.6 wt. % of $Ta_2O_5$ and $Yb_2O_3$ combined, at least about 0.7 wt. % of $Ta_2O_5$ and $Yb_2O_3$ combined $Ta_2O_5$ and $Yb_2O_3$ combined, at least about 0.8 wt. % of $Ta_2O_5$ and $Yb_2O_3$ combined and at least about 0.9 wt. % of $Ta_2O_5$ and $Yb_2O_3$ combined.

Item 56. The refractory object or method of any one of items 1, 2, 3, 4, 5, 6, 7, 8 and 9, wherein the zircon body comprises not greater than about 1.0 wt. % of $TiO_2$ for a total weight of the zircon body, not greater than about 0.8 wt. % of $TiO_2$, not greater than about 0.5 wt. % of $TiO_2$, not greater than about 0.4 wt. % of $TiO_2$, not greater than about 0.3 wt. % of $TiO_2$, not greater than about 0.2 wt. % of $TiO_2$, not greater than about 0.1 wt. % of $TiO_2$ and is essentially free of $TiO_2$.

Item 57. The refractory object or method of any one of items 8 and 9, wherein the zircon batch comprises not greater than about 1.0 wt. % of $TiO_2$ for a total weight of the zircon batch, not greater than about 0.8 wt. % of $TiO_2$, not greater than about 0.5 wt. % of $TiO_2$, not greater than about 0.4 wt. % of $TiO_2$, not greater than about 0.3 wt. % of $TiO_2$, not greater than about 0.2 wt. % of $TiO_2$, not greater than about 0.1 wt. % of $TiO_2$ and is essentially free of $TiO_2$.

Item 58. The refractory object or method of any one of items 1, 2, 3, 4, 5, 6, 7, 8 and 9, wherein the zircon body comprises not greater than about 1.0 wt. % of CaO for a total weight of the zircon body, not greater than about 0.8 wt. % of CaO, not greater than about 0.5 wt. % of CaO, not greater than about 0.4 wt. % of CaO, not greater than about 0.3 wt. % of CaO, not greater than about 0.2 wt. % of CaO, not greater than about 0.1 wt. % of CaO and is essentially free of CaO.

Item 59. The refractory object or method of any one of items 8 and 9, wherein the zircon batch comprises not greater than about 1.0 wt. % of CaO for a total weight of the zircon batch, not greater than about 0.8 wt. % of CaO, not greater than about 0.5 wt. % of CaO, not greater than about 0.4 wt. % of CaO, not greater than about 0.3 wt. % of CaO, not greater than about 0.2 wt. % of CaO, not greater than about 0.1 wt. % of CaO and is essentially free of CaO.

Item 60. The refractory object or method of any one of items 1, 2, 3, 4, 5, 6, 7, 8 and 9, wherein the zircon body comprises not greater than about 1.0 wt. % of MgO for a total weight of the zircon body, not greater than about 0.8 wt. % of MgO, not greater than about 0.5 wt. % of MgO, not greater than about 0.4 wt. % of MgO, not greater than about 0.3 wt. % of MgO, not greater than about 0.2 wt. % of MgO, not greater than about 0.1 wt. % of MgO and is essentially free of MgO.

Item 61. The refractory object or method of any one of items 8 and 9, wherein the zircon batch comprises not greater than about 1.0 wt. % of MgO for a total weight of the zircon batch, not greater than about 0.8 wt. % of MgO, not greater than about 0.5 wt. % of MgO, not greater than about 0.4 wt. % of MgO, not greater than about 0.3 wt. % of MgO, not greater than about 0.2 wt. % of MgO, not greater than about 0.1 wt. % of MgO and is essentially free of MgO.

Item 62. The refractory object or method of any one of items 1, 2, 3, 4, 5, 6, 7, 8 and 9, wherein the zircon body comprises not greater than about 1.0 wt. % of $K_2O$ for a total weight of the zircon body, not greater than about 0.8 wt. % of $K_2O$, not greater than about 0.5 wt. % of $K_2O$, not greater than about 0.4 wt. % of $K_2O$, not greater than about 0.3 wt. % of $K_2O$, not greater than about 0.2 wt. % of $K_2O$, not greater than about 0.1 wt. % of $K_2O$ and is essentially free of $K_2O$.

Item 63. The refractory object or method of any one of items 8 and 9, wherein the zircon batch comprises not greater than about 1.0 wt. % of $K_2O$ for a total weight of the zircon batch, not greater than about 0.8 wt. % of $K_2O$, not greater than about 0.5 wt. % of $K_2O$, not greater than about 0.4 wt. % of $K_2O$, not greater than about 0.3 wt. % of $K_2O$, not greater than about 0.2 wt. % of $K_2O$, not greater than about 0.1 wt. % of $K_2O$ and is essentially free of $K_2O$.

Item 64. The refractory object or method of any one of items 1, 2, 3, 4, 5, 6, 7, 8 and 9, wherein the zircon body comprises not greater than about 1.0 wt. % of $Na_2O$ for a total weight of the zircon body, not greater than about 0.8 wt. % of $Na_2O$, not greater than about 0.5 wt. % of $Na_2O$, not greater than about 0.4 wt. % of $Na_2O$, not greater than about 0.3 wt. % of $Na_2O$, not greater than about 0.2 wt. % of $Na_2O$, not greater than about 0.1 wt. % of $Na_2O$ and is essentially free of $Na_2O$.

Item 65. The refractory object or method of any one of items 8 and 9, wherein the zircon batch comprises not greater than about 1.0 wt. % of $Na_2O$ for a total weight of the zircon batch, not greater than about 0.8 wt. % of $Na_2O$, not greater than about 0.5 wt. % of $Na_2O$, not greater than about 0.4 wt. % of $Na_2O$, not greater than about 0.3 wt. % of $Na_2O$, not greater than about 0.2 wt. % of $Na_2O$, not greater than about 0.1 wt. % of $Na_2O$ and is essentially free of $Na_2O$.

Item 66. The refractory object or method of any one of items 1, 2, 3, 4, 5, 6, 7, 8 and 9, wherein the zircon body comprises not greater than about 1.0 wt. % of $Y_2O_3$ for a total weight of the zircon body, not greater than about 0.8 wt. % of $Y_2O_3$, not greater than about 0.5 wt. % of $Y_2O_3$, not greater than about 0.4 wt. % of $Y_2O_3$, not greater than about 0.3 wt. % of $Y_2O_3$, not greater than about 0.2 wt. % of $Y_2O_3$, not greater than about 0.1 wt. % of $Y_2O_3$ and is essentially free of $Y_2O_3$.

Item 67. The refractory object or method of any one of items 8 and 9, wherein the zircon batch comprises not greater than about 1.0 wt. % of $Y_2O_3$ for a total weight of the zircon batch, not greater than about 0.8 wt. % of $Y_2O_3$, not greater than about 0.5 wt. % of $Y_2O_3$, not greater than about 0.4 wt. % of $Y_2O_3$, not greater than about 0.3 wt. % of $Y_2O_3$, not greater than about 0.2 wt. % of $Y_2O_3$, not greater than about 0.1 wt. % of $Y_2O_3$ and is essentially free of $Y_2O_3$.

Item 68. The refractory object or method of any one of items 1, 2, 3, 4, 5, 6, 7, 8 and 9, wherein the zircon body comprises not greater than about 1.0 wt. % of $P_2O_5$ for a total weight of the zircon body, not greater than about 0.8 wt. % of $P_2O_5$, not greater than about 0.5 wt. % of $P_2O_5$, not greater than about 0.4 wt. % of $P_2O_5$, not greater than about 0.3 wt. % of $P_2O_5$, not greater than about 0.2 wt. % of $P_2O_5$, not greater than about 0.1 wt. % of $P_2O_5$ and is essentially free of $P_2O_5$.

Item 69. The refractory object or method of any one of items 8 and 9, wherein the zircon batch comprises not greater than about 1.0 wt. % of $P_2O_5$ for a total weight of the zircon batch, not greater than about 0.8 wt. % of $P_2O_5$, not greater than about 0.5 wt. % of $P_2O_5$, not greater than about 0.4 wt. % of $P_2O_5$, not greater than about 0.3 wt. % of $P_2O_5$, not greater than about 0.2 wt. % of $P_2O_5$, not greater than about 0.1 wt. % of $P_2O_5$ and is essentially free of $P_2O_5$.

Item 70. The refractory object or method of any one of items 1, 2, 3, 4, 5, 6, 7, 8 and 9, wherein the zircon body comprises not greater than about 1.0 wt. % of $Fe_2O_3$ for a total weight of the zircon body, not greater than about 0.8 wt. % of $Fe_2O_3$, not greater than about 0.5 wt. % of $Fe_2O_3$, not greater than about 0.4 wt. % of $Fe_2O_3$, not greater than about 0.3 wt. % of $Fe_2O_3$, not greater than about 0.2 wt. % of $Fe_2O_3$, not greater than about 0.1 wt. % of $Fe_2O_3$ and is essentially free of $Fe_2O_3$.

Item 71. The refractory object or method of any one of items 8 and 9, wherein the zircon batch comprises not greater than about 1.0 wt. % of $Fe_2O_3$ for a total weight of the zircon batch, not greater than about 0.8 wt. % of $Fe_2O_3$, not greater than about 0.5 wt. % of $Fe_2O_3$, not greater than about 0.4 wt. % of $Fe_2O_3$, not greater than about 0.3 wt. % of $Fe_2O_3$, not greater than about 0.2 wt. % of $Fe_2O_3$, not greater than about 0.1 wt. % of $Fe_2O_3$ and is essentially free of $Fe_2O_3$.

Item 72. The refractory object or method of any one of items 1, 2, 3, 4, 5, 6, 7, 8 and 9, wherein the zircon body comprises not greater than about 1.0 wt. % of ZnO for a total weight of the zircon body, not greater than about 0.8 wt. % of ZnO, not greater than about 0.5 wt. % of ZnO, not greater than about 0.4 wt. % of ZnO, not greater than about 0.3 wt. % of ZnO, not greater than about 0.2 wt. % of ZnO, not greater than about 0.1 wt. % of ZnO and is essentially free of ZnO.

Item 73. The refractory object or method of any one of items 8 and 9, wherein the zircon batch comprises not greater than about 1.0 wt. % of ZnO for a total weight of the zircon batch, not greater than about 0.8 wt. % of ZnO, not greater than about 0.5 wt. % of ZnO, not greater than about 0.4 wt. % of ZnO, not greater than about 0.3 wt. % of ZnO, not greater than about 0.2 wt. % of ZnO, not greater than about 0.1 wt. % of ZnO and is essentially free of ZnO.

Item 74. The refractory object or method of any one of items 1, 2, 3, 4, 5, 6, 7, 8 and 9, wherein the zircon body comprises not greater than about 1.5 wt. % of $TiO_2$, CaO, MgO, $K_2O$, $Na_2O$, $Y_2O_3$, $P_2O_5$, $Fe_2O_3$ and ZnO combined for a total weight of the zircon body, not greater than about 1.2 wt. % of $TiO_2$, CaO, MgO, $K_2O$, $Na_2O$, $Y_2O_3$, $P_2O_5$, $Fe_2O_3$ and ZnO combined, not greater than about 1.0 wt. % of $TiO_2$, CaO, MgO, $K_2O$, $Na_2O$, $Y_2O_3$, $P_2O_5$, $Fe_2O_3$ and ZnO combined, not greater than about 0.7 wt. % of $TiO_2$, CaO, MgO, $K_2O$, $Na_2O$, $Y_2O_3$, $P_2O_5$, $Fe_2O_3$ and ZnO combined, not greater than about 0.5 wt. % of $TiO_2$, CaO, MgO, $K_2O$, $Na_2O$, $Y_2O_3$, $P_2O_5$, $Fe_2O_3$ and ZnO combined, not greater than about 0.2 wt. % of $TiO_2$, CaO, MgO, $K_2O$, $Na_2O$, $Y_2O_3$, $P_2O_5$, $Fe_2O_3$ and ZnO combined, not greater than about 0.1 wt. % of $TiO_2$, CaO, MgO, $K_2O$, $Na_2O$, $Y_2O_3$, $P_2O_5$, $Fe_2O_3$ and ZnO combined and is essentially free of $TiO_2$, CaO, MgO, $K_2O$, $Na_2O$, $Y_2O_3$, $P_2O_5$, $Fe_2O_3$ and ZnO combined.

Item 75. The refractory object or method of any one of items 8 and 9, wherein the zircon batch comprises not greater than about 1.5 wt. % of $TiO_2$, CaO, MgO, $K_2O$, $Na_2O$, $Y_2O_3$, $P_2O_5$, $Fe_2O_3$ and ZnO combined for a total weight of the zircon batch, not greater than about 1.2 wt. % of $TiO_2$, CaO, MgO, $K_2O$, $Na_2O$, $Y_2O_3$, $P_2O_5$, $Fe_2O_3$ and ZnO combined, not greater than about 1.0 wt. % of $TiO_2$, CaO, MgO, $K_2O$, $Na_2O$, $Y_2O_3$, $P_2O_5$, $Fe_2O_3$ and ZnO combined, not greater than about 0.7 wt. % of $TiO_2$, CaO, MgO, $K_2O$, $Na_2O$, $Y_2O_3$, $P_2O_5$, $Fe_2O_3$ and ZnO combined, not greater than about 0.5 wt. % of $TiO_2$, CaO, MgO, $K_2O$, $Na_2O$, $Y_2O_3$, $P_2O_5$, $Fe_2O_3$ and ZnO combined, not greater than about 0.2 wt. % of $TiO_2$, CaO, MgO, $K_2O$, $Na_2O$, $Y_2O_3$, $P_2O_5$, $Fe_2O_3$ and ZnO combined, not greater than about 0.1 wt. % of $TiO_2$, CaO, MgO, $K_2O$, $Na_2O$, $Y_2O_3$, $P_2O_5$, $Fe_2O_3$ and ZnO combined and is essentially free of $TiO_2$, CaO, MgO, $K_2O$, $Na_2O$, $Y_2O_3$, $P_2O_5$, $Fe_2O_3$ and ZnO combined.

Item 76. The refractory object or method of any one of items 1, 2, 3, 5, 6, 7, 8 and 9, wherein the zircon body comprises a blistering value of not greater than about 8 bubbles per mm2 measured after 8 hours at a temperature of 1200° C.

Item 77. The refractory object or method of any one of items 4 and 76, wherein zircon body comprises a blistering value of not greater than about 7 bubbles per mm2, not greater than about 6 bubbles per mm2, not greater than about 5 bubbles per mm2, not greater than about 4 bubbles per mm2, not greater than about 3 bubbles per mm2, not greater than about 2 bubbles per mm2 and not greater than about 1 bubbles per mm2.

Item 78. The refractory object or method of any one of items 1, 2, 3, 4, 6, 7, 8 and 9, wherein the zircon body comprises a blistering value of not greater than about 1 bubble per mm2 measured after 360 hours at a temperature of 1200° C.

Item 79. The refractory object or method of any one of items 1, 2, 3, 4, 5, 7, 8 and 9, wherein the zircon body comprising a creep deformation rate of not greater than about 1.1 E-4 $h^{-1}$ as measured using a three point bend test at a temperature of 1350° C. and a stress of 2 MPa.

Item 80. The refractory object or method of any one of items 6 and 79, wherein the zircon body comprises a creep deformation rate of not greater than about 1.0 E-4 $h^{-1}$ as measured using a three point bend test at a temperature of 1350° C. and a stress of 2 MPa, not greater than about 9.5 E-5 $h^{-1}$, not greater than about 9.0 E-5 $h^{-1}$, not greater than about 8.5 E-5 $h^{-1}$, not greater than about 8.0 E-5 $h^{-1}$ and not greater than about 7.5 E-5 $h^{-1}$.

Item 81. The refractory object or method of any one of items 1, 2, 3, 4, 5, 6, 7, 8 and 9, wherein the zircon body comprises a creep deformation rate of not greater than about 7.4 E-05 $h^{-1}$ as measured using a three point bend test at a temperature of 1325° C. and a stress of 2 MPa, not greater than about 7.0 E-5 $h^{-1}$, not greater than about 6.5 E-5 $h^{-1}$, not greater than about 6.0 E-5 $h^{-1}$, not greater than about 5.5 E-5 $h^{-1}$ and not greater than about 5.0 E-5 $h^{-1}$.

Item 82. The refractory object or method of any one of items 1, 2, 3, 4, 5, 6, 7, 8 and 9, wherein the zircon body comprises a creep deformation rate of not greater than about 4.0 E-5 $h^{-1}$ as measured using a three point bend test at a temperature of 1300° C. and a stress of 2 MPa.

Item 83. The refractory object or method of any one of items 1, 2, 3, 4, 5, 6, 8 and 9, wherein the zircon body comprises a creep deformation rate of not greater than about 5.0 E-5 $h^{-1}$ as measured using a four point bend test at a temperature of 1350° C. and a stress of 2 MPa.

Item 84. The refractory object or method of any one of items 7 and 83, wherein the zircon body comprises a creep deformation rate of not greater than about 4.9 E-5 h$^{-1}$ as measured using a four point bend test at a temperature of 1350° C. and a stress of 2 MPa, not greater than about 4.8 E-5 h$^{-1}$, not greater than about 4.7 E-5 h$^{-1}$, not greater than about 4.6 E-5 h$^{-1}$, not greater than about 4.5 E-5 h$^{-1}$, not greater than about 4.4 E-5 h$^{-1}$, not greater than about 4.3 E-5 h$^{-1}$, not greater than about 4.2 E-5 h$^{-1}$, not greater than about 4.1 E-5 h$^{-1}$, not greater than about 4.0 E-5 h$^{-1}$, not greater than about 3.9 E-5 h$^{-1}$, not greater than about 3.8 E-5 h$^{-1}$, not greater than about 3.7 E-5 h$^{-1}$, not greater than about 3.6 E-5 h$^{-1}$, not greater than about 3.5 E-5 h$^{-1}$, not greater than about 3.4 E-5 h$^{-1}$, not greater than about 3.3 E-5 h$^{-1}$, not greater than about 3.2 E-5 h$^{-1}$, not greater than about 3.1 E-5 h$^{-1}$ and not greater than about 3.0 E-5 h$^{-1}$.

Item 85. The refractory object or method of any one of items 1, 2, 3, 4, 5, 6, 7, 8 and 9, wherein the zircon body comprises a creep deformation rate of not greater than about 2.7 E-05 h$^{-1}$ as measured using a four point bend test at a temperature of 1325° C. and a stress of 2 MPa, not greater than about 2.6 E-5 h$^{-1}$, not greater than about 2.5 E-5 h$^{-1}$, not greater than about 2.4 E-5 h$^{-1}$, not greater than about 2.3 E-5 h$^{-1}$, not greater than about 2.2 E-5 h$^{-1}$, not greater than about 2.1 E-5 h$^{-1}$, not greater than about 2.0 E-5 h$^{-1}$, not greater than about 1.5 E-5 h$^{-1}$ and not greater than about 1.5 E-5 h$^{-1}$.

Item 86. The refractory object or method of any one of items 1, 2, 3, 4, 5, 6, 7, 8 and 9, wherein the zircon body comprises a creep deformation rate of not greater than about 1.2 E-05 h$^{-1}$ as measured using a four point bend test at a temperature of 1300° C. and a stress of 2 MPa, not greater than about 1.1 E-5 h$^{-1}$, not greater than about 1.0 E-5 h$^{-1}$, not greater than about 9 E-6 h$^{-1}$, not greater than about 8 E-6 h$^{-1}$, not greater than about 7 E-6 h$^{-1}$, not greater than about 6 E-6 h$^{-1}$ and not greater than about 5 E-6 h$^{-1}$.

Item 87. The refractory object or method of any one of items 1, 2, 3, 4, 5, 6, 7, 8 and 9, wherein the zircon body comprises a creep deformation rate of not greater than about 5.0 E-6 h$^{-1}$ as measured using a four point bend test at a temperature of 1275° C. and a stress of 2 MPa, not greater than about 4.8 E-6 h$^{-1}$, not greater than about 4.6 E-6 h$^{-1}$, not greater than about 4.4 E-6 h$^{-1}$, not greater than about 4.2 E-6 h$^{-1}$ and not greater than about 4.0 E-6-h$^{-1}$.

88. The refractory object or method of any one of items 1, 2, 3, 4, 5, 6, 7, 8 and 9, wherein the zircon body a density of at least about 3.7 g/cm$^3$, 3.8 g/cm$^3$, 3.9 g/cm$^3$, 4.0 g/cm$^3$, 4.1 g/cm$^3$, at least about 4.2 g/cm$^3$, at least about 4.3 g/cm$^3$ and at least about 4.4 g/cm$^3$.

Item 89. The refractory object or method of any one of items 1, 2, 3, 4, 5, 6, 7, 8, 9 and 88, wherein the zircon body has a density of not greater than about 4.5 g/cm$^3$, not greater than about 4.4 g/cm$^3$, not greater than about 4.3 g/cm$^3$, not greater than about 4.2 g/cm$^3$, not greater than about 4.1 g/cm$^3$, not greater than about 4.0 g/cm$^3$, not greater than about 3.9 g/cm$^3$, not greater than about 3.8 g/cm$^3$ and not greater than about 3.7 g/cm$^3$.

Item 90. The refractory object or method of any one of items 1, 2, 3, 4, 5, 6, 7, 8 and 9, wherein the zircon body comprises an apparent porosity of at least about 0.1 vol. % for the total volume of the zircon body, at least about 0.5 vol. %, at least about 1.0 vol. %, at least about 1.5 vol. %, at least about 2.0 vol. %, at least about 2.5 vol. %, at least about 3.0 vol. %, at least about 3.5 vol. %, at least about 4.0 vol. %, at least about 4.5 vol. %, at least about 5.0 vol. %, at least about 6 vol. %, at least about 7 vol. %, at least about 8 vol. %, at least about 9 vol. %, at least about 10 vol. %, at least about 11 vol. %, at least about 12 vol. %, at least about 13 vol. %, at least about and at least about 14 vol. %.

Item 91. The refractory object or method of any one of items 1, 2, 3, 4, 5, 6, 7, 8, 9 and 90, wherein the zircon body comprises an apparent porosity of not greater than about 15 vol. % for a total volume of the zircon body, not greater than about 14 vol. %, not greater than about 13 vol. %, not greater than about 12 vol. %, not greater than about 11 vol. %, not greater than about 10 vol. %, not greater than about 9 vol. %, not greater than about 8 vol. %, not greater than about 7 vol. %, not greater than about 6 vol. %, not greater than about 5 vol. %, not greater than about 4.5 vol. %, not greater than about 4.0 vol. %, not greater than about 3.5 vol. %, not greater than about 3.0 vol. %, not greater than about 2.5 vol. %, not greater than about 2.0 vol. %, not greater than about 1.5 vol. %, not greater than about 1.0 vol. % and not greater than about 0.5 vol. %.

Item 92. The refractory object or method of any one of items 1, 2, 3, 4, 5, 6, 7, 8 and 9, wherein the zircon body may comprise an outer portion and an interior portion and wherein the zircon body may further comprise a whole body porosity ratio (Pop/Pip) of not greater than about 2, where Pop represents the apparent porosity of the outer portion of the body measured in vol. % for a total volume of the outer portion of the zircon body and Pip represents the porosity of the interior portion of the body measured in vol. % for a total volume of the interior portion of the body, not greater than about 1.9, not greater than about 1.8, not greater than about 1.7, not greater than about 1.6, not greater than about 1.5, not greater than about 1.4, not greater than about 1.3, not greater than about 1.2, not greater than about 1.0.

Item 93. The refractory object or method of any one of items 1, 2, 3, 4, 5, 6, 7, 8 and 9, wherein the zircon body may comprise an outer portion and an interior portion and wherein the zircon body may further comprise a whole body porosity ratio (Pop/Pip) of at least about 0.1, where Pop represents the apparent porosity of the outer portion of the body measured in vol. % for a total volume of the outer portion of the zircon body and Pip represents the porosity of the interior portion of the body measured in vol. % for a total volume of the interior portion of the body, at least about 0.2, at least about 0.3, at least about 0.4, at least about 0.5, at least about 0.6, at least about 0.7, at least about 0.8 and at least about 0.9.

Item 94. The refractory object or method of any one of items 1, 2, 3, 4, 5, 6, 7, 8 and 9, wherein the zircon body may comprise an outer portion and an interior portion and wherein the zircon body may further comprise a whole body porosity ratio (Pop/Pip) of about 1, where Pop represents the apparent porosity of the outer portion of the body measured in vol. % for a total volume of the outer portion of the zircon body and Pip represents the porosity of the interior portion of the body measured in vol. % for a total volume of the interior portion of the body.

Item 95. The refractory object or method of any one of items 1, 2, 4, 5, 6, 7, 8 and 9, wherein the zircon body comprises zircon grains and a free silica intergranular phase present between the zircon grains and distributed substantially uniformly through the body.

Item 96. The refractory object or method of any one of items 3 and 95, wherein the free silica intergranular phase is distributed substantially uniformly through the zircon body.

Item 97. The refractory object or method of any one of items 3, 95 and 96, wherein the zircon body comprises not greater than about 4.5 wt. % of free silica for a total weight of the zircon body, not greater than about 4.0 wt. % of free silica, not greater than about 3.9 wt. % of free silica, not greater than about 3.8 wt. % of free silica, not greater than about 3.7 wt. % of free silica, not greater than about 3.6 wt. % of free silica, not greater than about 3.5 wt. % of free silica, not greater than about 3.4 wt. % of free silica, not greater than about 3.3 wt. % of free silica, not greater than about 3.2 wt. % of free silica, not greater than about 3.1 wt. % of free silica, not greater than about 3.0 wt. % of free silica, not greater than about 2.9 wt. % of free silica, not greater than about 2.8 wt. % of free silica, not greater than about 2.7 wt. % of free silica, not greater than about 2.6 wt. % of free silica, not greater than about 2.5 wt. % of free silica, not greater than about 2.4 wt. % of free silica, not greater than about 2.3 wt. % of free silica, not greater than about 2.2 wt. % of free silica, not greater than about 2.1 wt. % of free silica, not greater than about 2.0 wt. % of free silica, not greater than about 1.9 wt. % of free silica, not greater than about 1.8 wt. % of free silica, not greater than about 1.7 wt. % of free silica, not greater than about 1.6 wt. % of free silica, not greater than about 1.5 wt. % of free silica, not greater than about 1.4 wt. % of free silica, not greater than about 1.3 wt. % of free silica, not greater than about 1.2 wt. % of free silica, not greater than about 1.1 wt. % of free silica, not greater than about 1.0 wt. % of free silica, not greater than about and not greater than about 0.5 wt. % of free silica.

Item 98. The refractory object or method of any one of items 3, 95, 96 and 97, wherein the zircon body comprises at least about 0.1 wt. % of free silica for a total weight of the zircon body, at least about 0.5 wt. % of free silica, at least about 0.6 wt. % of free silica, at least about 0.7 wt. % of free silica, at least about 0.8 wt. % of free silica, at least about 0.9 wt. % of free silica, at least about 1.0 wt. % of free silica, at least about 1.1 wt. % of free silica, at least about 1.1 wt. % of free silica, at least about 1.2 wt. % of free silica, at least about 1.3 wt. % of free silica, at least about 1.4 wt. % of free silica, at least about 1.5 wt. % of free silica, at least about 1.6 wt. % of free silica, at least about 1.7 wt. % of free silica, at least about 1.8 wt. % of free silica, at least about 1.9 wt. % of free silica, at least about 2.0 wt. % of free silica, at least about 2.1 wt. % of free silica, at least about 2.2 wt. % of free silica, at least about 2.3 wt. % of free silica, at least about 2.4 wt. % of free silica, at least about 2.5 wt. % of free silica, at least about 2.6 wt. % of free silica, at least about 2.7 wt. % of free silica, at least about 2.8 wt. % of free silica, at least about 2.9 wt. % of free silica, at least about 3.0 wt. % of free silica, at least about 3.1 wt. % of free silica, at least about 3.2 wt. % of free silica, at least about 3.3 wt. % of free silica, at least about 3.4 wt. % of free silica, at least about 3.5 wt. % of free silica, at least about 3.6 wt. % of free silica, at least about 3.7 wt. % of free silica, at least about 3.8 wt. % of free silica, at least about 3.9 wt. % of free silica, at least about 4.0 wt. % of free silica and at least about 4.5 wt. % of free silica.

Item 99. The refractory object or method of any one of items 3, 95 and 96, wherein the zircon grains have an average grain size of at least about 3 μm, at least about 4 μm, at least about 5 μm, at least about 6 μm, at least about 7 μm, at least about 8 μm, at least about 9 μm, at least about 10 μm, at least about 12 μm and at least about 14 μm.

Item 100. The refractory object or method of any one of items 3, 95, 96 and 99, wherein the zircon grains have an average grain size of not greater than about 15 μm, not greater than about 14 μm, not greater than about 12 μm, not greater than about 10 μm, not greater than about 9 μm, not greater than about 8 μm, not greater than about 7 μm, not greater than about 6 μm, not greater than about 5 μm, not greater than about 4 μm and not greater than about 3 μm.

Item 101. The refractory object or method of any one of items 1, 2, 3, 4, 5, 6, 7, 8 and 9, wherein the zircon batch comprises zircon particles.

Item 102. The refractory object or method of item 101, wherein the zircon particles have a D10 grain size of not greater than about 1.9 μm, not greater than about 1.0 μm, not greater than about 0.8 μm and not greater than about 0.5 μm.

Item 103. The refractory object or method of any one of items 101 and 102, wherein the zircon particles have a median grain size (D50) of at least about 1 μm, at least about 2 μm, at least about 3 μm, at least about 4 μm, at least about 5 μm, at least about 6 μm, at least about 7 μm, at least about 8 μm, at least about 9 μm, at least about 10 μm, at least about 12 μm and at least about 14 μm.

Item 104. The refractory object or method of any one of item 101, 102 and 103, wherein the zircon particles have a median grain size (D50) of not greater than about 20 μm, not greater than about 19 μm, not greater than about 18 μm, not greater than about 17 μm, not greater than about 16 μm, not greater than about 15 μm, not greater than about 14 μm, not greater than about 13 μm, not greater than about 12 μm and not greater than about 10 μm.

Item 105. The refractory object or method of any one of items 1, 2, 3, 4, 5, 6, 7, 8 and 9, wherein the zircon body comprises a content of rare earth oxides not greater than about 1 wt. % for a total weight of the body.

Item 106. The refractory object or method of any one of items 1, 2, 3, 4, 5, 6, 7, 8 and 9, wherein the zircon body comprises a content of alkali oxides not greater than about 1 wt. % for a total weight of the body.

Item 107. The refractory object or method of any one of items 1, 2, 3, 4, 5, 6, 7, 8 and 9, wherein the body comprises a content of alkali earth oxides not greater than about 1 wt. % for a total weight of the body.

Item 108. The refractory object or method of any one of items 1, 2, 3, 4, 5, 6, 7, 8 and 9, wherein the zircon body comprises zircon grains and an $Al_2O_3$ rich intergranular phase.

Item 109. The refractory object or method of item 108, wherein the $Al_2O_3$ rich intergranular phase comprises a cross-sectional width of at least about 0.5 microns, at least about 0.6 microns, at least about 0.7 microns, at least about 0.8 microns, at least about 0.9 microns, at least about 1 micron, at least about 1.1 micron, at least about 1.2 micron, at least about 1.3 micron, at least about 1.4 micron, at least about 1.5 micron, at least about 2 microns and at least about 3 microns.

Item 110. The refractory object or method of item 108, wherein the $Al_2O_3$ rich intergranular phase comprises a cross-sectional width of not greater than about 5 microns, not greater than about 3 microns, not greater than about 2 microns, not greater than about 1.5 microns, not greater than about 1.4 microns, not greater than about 1.3 microns, not greater than about 1.2 microns and not greater than about 1.1 microns.

Item 111. The refractory object or method of item 108, wherein the $Al_2O_3$ rich intergranular phase comprises a content of $Al_2O_3$ of at least about 40 wt. % for a total weight of the $Al_2O_3$ rich intergranular phase as shown by wavelength dispersive X-ray spectroscopy, at least about 45 wt. %, at least about 50 wt. %, at least about 55 wt. %, at least about 60 wt. %, at least about 65 wt. %, at least about 70 wt. %, at least about 80 wt. %, at least about 85 wt. % and at least about 90 wt. %.

Item 112. The refractory object or method of item 108, wherein the $Al_2O_3$ rich intergranular phase comprises a content of $Al_2O_3$ of not greater than about 95 wt. % for a total weight of the $Al_2O_3$ rich intergranular phase as shown by wavelength dispersive X-ray spectroscopy, not greater than about 90 wt. %, not greater than about 85 wt. %, not greater than about 80 wt. %, not greater than about 75 wt. %, not greater than about 70 wt. %, not greater than about 65 wt. % and not greater than about 60 wt. %.

Item 113. The refractory object or method of item 108, wherein the $Al_2O_3$ rich intergranular phase comprises a content of $Al_2O_3$ of at least about 40 wt. % for a total weight of the $Al_2O_3$ rich intergranular phase as shown by energy dispersive X-ray spectroscopy, at least about 45 wt. %, at least about 50 wt. %, at least about 55 wt. %, at least about 60 wt. %, at least about 65 wt. %, at least about 70 wt. %, at least about 80 wt. %, at least about 85 wt. % and at least about 90 wt. %.

Item 114. The refractory object or method of item 108, wherein the $Al_2O_3$ rich intergranular phase comprises a content of $Al_2O_3$ of not greater than about 95 wt. % for a total weight of the $Al_2O_3$ rich intergranular phase as shown by energy dispersive X-ray spectroscopy, not greater than about 90 wt. %, not greater than about 85 wt. %, not greater than about 80 wt. %, not greater than about 75 wt. %, not greater than about 70 wt. %, not greater than about 65 wt. % and not greater than about 60 wt. %.

Item 115. The refractory object or method of item 108, wherein the $Al_2O_3$ rich intergranular phase comprises a content of $SiO_2$ of at least about 20 wt. % for a total weight of the $Al_2O_3$ rich intergranular phase as shown by wavelength dispersive X-ray spectroscopy, at least about 23 wt. %, at least about 25 wt. %, at least about 28 wt. %, at least about 30 wt. %, at least about 33 wt. %, at least about 35 wt. %, at least about 37 wt. %, at least about 40 wt. % and at least about 45 wt. %.

Item 116. The refractory object or method of item 108, wherein the $Al_2O_3$ rich intergranular phase comprises a content of $SiO_2$ of not greater than about 50 wt. % for a total weight of the $Al_2O_3$ rich intergranular phase as shown by wavelength dispersive X-ray spectroscopy, not greater than about 45 wt. %, not greater than about 40 wt. %, not greater than about 37 wt. %, not greater than about 35 wt. %, not greater than about 33 wt. %, not greater than about 30 wt. % and not greater than about 27 wt. %.

Item 117. The refractory object or method of item 108, wherein the $Al_2O_3$ rich intergranular phase comprises a content of $SiO_2$ of at least about 20 wt. % for a total weight of the $Al_2O_3$ rich intergranular phase as shown by energy dispersive X-ray spectroscopy, at least about 23 wt. %, at least about 25 wt. %, at least about 28 wt. %, at least about 30 wt. %, at least about 33 wt. %, at least about 35 wt. %, at least about 37 wt. %, at least about 40 wt. % and at least about 45 wt. %.

Item 118. The refractory object or method of item 108, wherein the $Al_2O_3$ rich intergranular phase comprises a content of $SiO_2$ of not greater than about 50 wt. % for a total weight of the $Al_2O_3$ rich intergranular phase as shown by energy dispersive X-ray spectroscopy, not greater than about 45 wt. %, not greater than about 40 wt. %, not greater than about 37 wt. %, not greater than about 35 wt. %, not greater than about 33 wt. %, not greater than about 30 wt. % and not greater than about 27 wt. %.

EXAMPLES

Turning to a first set of particular working examples, multiple compositions were prepared, formed into zircon body material and tested, the examples being formed according to embodiments described herein.

Table 1 summarizes the composition of the zircon batches and measured physical characteristics of the formed zircon body material, including creep deformation rate measured using a 3-point bending test, a 4-point bending test and short term blister values, for Examples 1-8. Examples 1-8 are examples of zircon body material formed according to embodiments described herein.

TABLE 1

Example Zircon Materials

| | Example #'s | | | | | | | |
|---|---|---|---|---|---|---|---|---|
| | 1 | 2 | 3 | 4 | 5 | 6 | 7 | 8 |
| Components of Zircon Mixture (wt. % of total mixture) | | | | | | | | |
| $ZrSiO_4$ | 98.30 | 94.30 | | | | | | |
| $ZrSiO_4$-1.5% $SiO_2$ (Zircon doped w/ $SiO_2$) | | | 94.30 | 94.00 | 98.20 | 96.40 | 95.00 | 94.30 |
| $Ta_2O_5$ | 1.00 | 1.00 | 1.00 | 1.00 | | | | 1.00 |
| $Al_2O_3$ | 0.20 | 0.20 | 0.20 | 1.50 | 1.30 | 2.60 | 5.00 | 0.20 |
| $SiO_2$ | 0.50 | 1.50 | 1.50 | | 0.50 | 1.00 | | |
| $GeO_2$ | | | | | | | | 1.50 |
| $TiO_2$ | | | | | | | | |
| $Yb_2O_3$ | | | | 3.50 | | | | |
| $Y_2O_3$ | | | | | | | | |
| Mullite | | 3.00 | 3.00 | | | | | 3.00 |
| YAG | | | | | | | | |
| Total | 100.00 | 100.00 | 100.00 | 100.00 | 100.00 | 100.00 | 100.00 | 100.00 |
| WT % in Formed Zircon Body | | | | | | | | |
| $ZrO_2$ | 64.36 | 61.75 | 61.75 | 62.24 | 64.29 | 63.12 | 62.20 | 61.75 |
| $SiO_2$ | 32.56 | 32.98 | 32.98 | 31.76 | 32.53 | 32.43 | 30.99 | 32.98 |
| $Y_2O_3$ | | | | | | | | |
| $Yb_2O_3$ | | | | 3.50 | | | | |
| $Al_2O_3$ | 0.39 | 2.63 | 2.63 | 1.50 | 1.49 | 2.78 | 5.18 | 2.63 |
| $Ta_2O_5$ | 1.00 | 1.00 | 1.00 | 1.00 | | | | 1.00 |

TABLE 1-continued

Example Zircon Materials

| | Example #'s | | | | | | | |
|---|---|---|---|---|---|---|---|---|
| | 1 | 2 | 3 | 4 | 5 | 6 | 7 | 8 |
| $TiO_2$ | 0.10 | 0.09 | 0.09 | 0.09 | 0.10 | 0.10 | 0.10 | 0.09 |
| $P_2O_5$ | 0.08 | 0.08 | 0.08 | 0.08 | 0.08 | 0.09 | 0.08 | 0.08 |
| $Fe_2O_3$ | 0.05 | 0.06 | 0.06 | 0.05 | 0.05 | 0.06 | 0.05 | 0.06 |
| CaO | 0.04 | 0.04 | 0.04 | 0.04 | 0.04 | 0.04 | 0.04 | 0.04 |
| HfO2 | 1.43 | 1.37 | 1.37 | 1.38 | 1.42 | 1.40 | 1.38 | 1.37 |
| $Na_2O$ | | 0.01 | 0.01 | | | | | 0.01 |
| Zircon Body Properties | | | | | | | | |
| Apparent Porosity (%) | 10.70 | 12.90 | 0.30 | 0.30 | 14.60 | 14.10 | 10.4 | 1.00 |
| Density (g/cc) | 3.90 | 3.80 | 4.11 | 4.28 | 3.84 | 3.82 | 3.96 | 3.98 |
| Creep Deformation Rate Measured by 3-Pts Test (×1E−06/h) | | | | | | | | |
| Creep 1300° C./2 MPa | 37.0 | 19.0 | 15.0 | 26.0 | | | | |
| Creep 1325° C./2 MPa | | | 41.2 | | | | | |
| Creep 1350° C./2 MPa | | | 65.5 | | | | 48.7 | 41.7 |
| Creep Deformation Rate Measured by 4-Pts Test (×1E−06/h) | | | | | | | | |
| Creep 1275° C./2 MPa | | 2.8 | 3.1 | | 7.5 | | | 4.7 |
| Creep 1300° C./2 MPa | | 5.6 | 5.6 | | 11.1 | | | 8.8 |
| Creep 1325° C./2 MPa | | 12.9 | 16.8 | | 18.2 | | | 22.6 |
| Creep 1350° C./2 MPa | | 28.2 | 26.9 | | 26.6 | | | |
| Short Term Blistering Value (bubbles per mm2) | | | | | | | | |
| Blistering LCD A - 1200 C.-8 h | | 4 | | | <1 | <1 | 3 | |
| Blistering LCD A - 1200 C.-360 h | | <1 | | | <1 | | | |

Examples 1-8 were formed from unprocessed raw material comprising zircon and other components. As disclosed with regard to embodiments described herein, raw zircon material was combined with an $Al_2O_3$ containing component (alumina or mullite), $SiO_2$ and, in certain instances, with a sintering aid to form a batch. The combined materials were then dry mixed and the batch mixture was pressed into a block shape in a cold isostatic press at room temperature under a pressure between 100 MPa and 180 MPa. The blocks were then sintered at a maximum temperature of 1600° C. for 28 h.

Table 2 summarizes the composition of the zircon batches, component composition of the formed zircon body material and measured physical characteristics of the formed zircon body material, including creep deformation rate measured using a 4-point being test, short term blister values and long term blister values, for Examples 9-18. Examples 9-18 are examples of zircon body material formed according to embodiments described herein.

TABLE 2

Example Zircon Materials

| | Example #'s | | | | | | | | | |
|---|---|---|---|---|---|---|---|---|---|---|
| | 9 | 10 | 11 | 12 | 13 | 14 | 15 | 16 | 17 | 18 |
| Components of Zircon Mixture (wt. % of total mixture) | | | | | | | | | | |
| $ZrSiO_4$ | 94.30 | | | | | | 95.80 | | | |
| $ZrSiO_4$-1.5% $SiO_2$ | | 94.00 | 96.00 | 96.20 | 98.20 | | | | | |
| $Ta_2O_5$ | 1.00 | 1.00 | 1.00 | 1.00 | | 1.00 | | | | |
| $Al_2O_3$ | 0.20 | | | 1.30 | 1.30 | 0.20 | | | | |
| $SiO_2$ | 1.50 | | | 0.50 | 0.50 | | | | | |

TABLE 2-continued

Example Zircon Materials

| | Example #'s | | | | | | | | | |
|---|---|---|---|---|---|---|---|---|---|---|
| | 9 | 10 | 11 | 12 | 13 | 14 | 15 | 16 | 17 | 18 |
| GeO$_2$ | | | | | | | | | | |
| TiO$_2$ | | | | | | | | | | |
| Yb$_2$O$_3$ | | | | | | | | | | |
| Y$_2$O$_3$ | | | | | | | | | | |
| Mullite | 3.00 | 5.00 | 3.00 | 1.00 | | 3.00 | | | | |
| YAG | | | | | | | | | | |
| Total | 100.00 | 100.00 | 100.00 | 100.00 | 100.00 | 100.00 | | | | |
| WT % in Formed Zircon Body | | | | | | | | | | |
| ZrO$_2$ | 60.71 | 59.16 | 60.92 | 62.55 | 65.98 | 62.72 | 61.88 | 61.62 | 63.51 | 60.23 |
| SiO$_2$ | 33.50 | 33.90 | 33.40 | 32.00 | 30.60 | 31.99 | 33.05 | 32.92 | 32.38 | 30.75 |
| Ta$_2$O$_5$ | 0.91 | 0.97 | 0.98 | 0.97 | 0.03 | 1.00 | 0.80 | 1.20 | | |
| Al$_2$O$_3$ | 2.68 | 3.90 | 2.57 | 2.12 | 1.40 | 2.63 | 2.63 | 2.62 | 2.43 | 3.92 |
| TiO$_2$ | 0.09 | 0.15 | 0.15 | 0.05 | 0.05 | 0.10 | 0.09 | 0.09 | 0.10 | 0.09 |
| Yb$_2$O$_3$ | <0.1 | <0.1 | <0.1 | <0.1 | <0.1 | <0.1 | | | | 3.50 |
| Y$_2$O$_3$ | <0.1 | <0.1 | <0.1 | <0.1 | <0.1 | <0.1 | <0.1 | <0.1 | <0.1 | <0.1 |
| P$_2$O$_5$ | 0.18 | 0.34 | 0.32 | 0.28 | 0.26 | <0.1 | <0.1 | <0.1 | <0.1 | <0.1 |
| Fe$_2$O$_3$ | 0.27 | 0.12 | 0.15 | 0.49 | 0.31 | <0.1 | <0.1 | <0.1 | <0.1 | <0.1 |
| HfO$_2$ | 1.26 | 1.22 | 1.22 | 1.19 | 1.13 | 1.26 | 1.37 | 1.36 | 1.41 | 1.33 |
| Zircon Body Properties | | | | | | | | | | |
| Apparent Porosity (%) | 11.30 | 10.50 | 8.28 | 10.80 | 14.20 | 14.00 | 12.93 | 11.37 | 15.62 | 4.12 |
| Density (g/cc) | 3.84 | 3.88 | 3.89 | 3.88 | 3.79 | 3.79 | 3.79 | 3.84 | 3.73 | 4.16 |
| Creep Deformation Rate Measured by 4-Pts Test (×1E−06/h) | | | | | | | | | | |
| Creep 1275° C./ 2 MPa | 4.0 | 4.2 | 3.9 | 3.3 | | 2.9 | 4.0 | 3.2 | 8.7 | 9.0 |
| Creep 1300° C./ 2 MPa | 5.6 | 8.1 | 7.1 | 7.9 | 10.8 | 7.0 | 8.2 | 7.2 | 11.4 | |
| Creep 1325° C./ 2 MPa | 12.9 | 19.3 | 17.3 | 17.2 | 17.0 | 15.0 | 16.4 | 15.6 | 15.9 | 21.8 |
| Creep 1350° C./ 2 MPa | 28.2 | | 37.0 | 35.6 | 26.6 | 32.2 | 29.2 | 33.9 | 27.8 | 38.6 |
| Short Term Plaque Blistering Value (bubbles per mm2) | | | | | | | | | | |
| Blistering LCD A - 1200 C.-8 h | <1 | | | <1 | 2 | | | | | |
| Long Term Crucible Blistering Value (bubbles per mm2) | | | | | | | | | | |
| Blistering LCD A - 1200 C.- 360 h | <1 | | <1 | <1 | <1 | | | | | |

Examples 9-18 were formed from unprocessed raw material comprising zircon and other components. As disclosed with regard to embodiments described herein, raw zircon material was combined with an Al$_2$O$_3$ containing component (alumina or mullite), SiO$_2$ and, in certain instances, with a sintering aid to form a batch. The combined materials were then spray dried and the spray dried granules were pressed into a block shape in a cold isostatic press at room temperature under a pressure of 100 MPa and 180 MPa. The blocks were then sintered at a maximum temperature of 1600° C. for 30 h.

Figure 3:
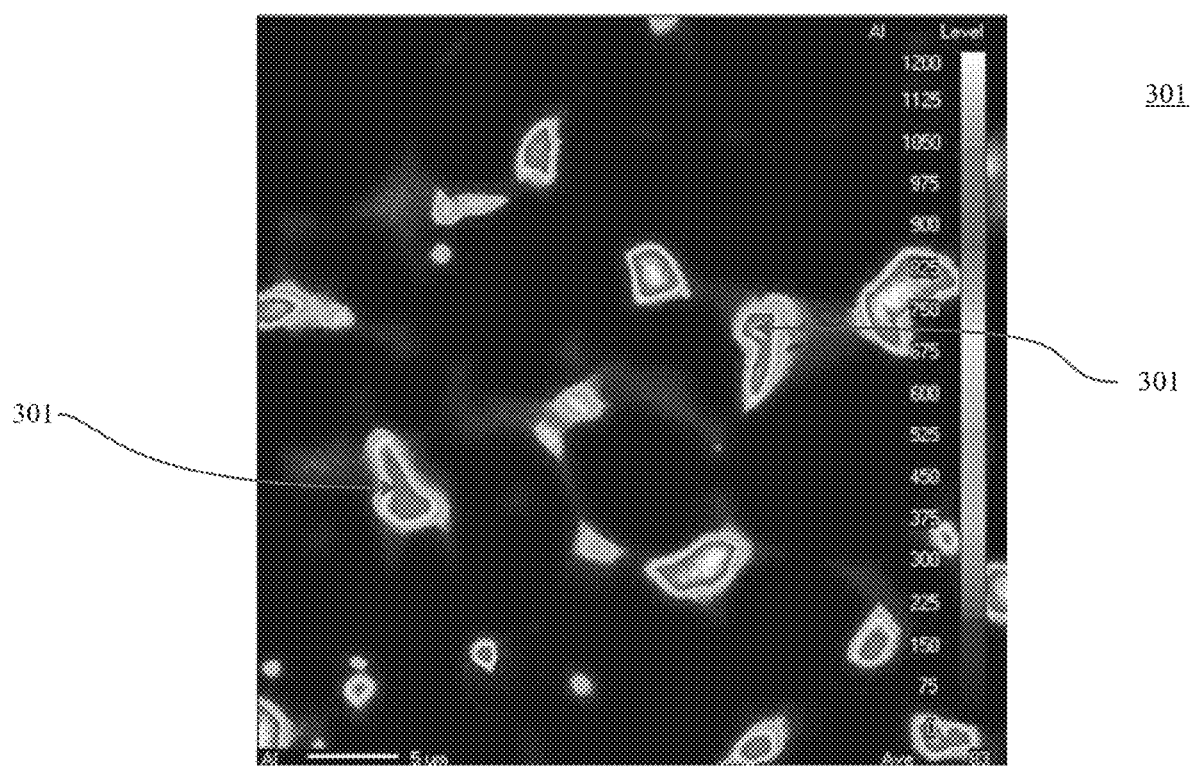
FIG. 3 includes a wavelength dispersive X-ray spectroscopy map of the microstructure of a zircon body of a refractory object formed according to embodiments described herein.

The formed zircon material of Example 9 was also analyzed with a scanning electron microscopy (SEM) and with wavelength dispersive X-ray spectroscopy to identify and calculate to composition of multiple Al$_2$O$_3$ rich phases in the zircon material. FIG. 3 illustrates a wavelength dispersive X-ray spectroscopy map 300 showing the presence of Al$_2$O$_3$ rich phases 301 larger than about 1 micron in the zircon material.

Table 3 summarizes the composition of three of these Al$_2$O$_3$ rich phases from Example 9. Results are normalized so that the sum of all analyzed constituents adds up to 100 wt. %.

TABLE 3

Composition of Al$_2$O$_3$ rich phases in Example 9

| Component (wt. %) | 1 | 2 | 3 |
|---|---|---|---|
| SiO$_2$ | 28.31 | 34.64 | 29.88 |
| Na$_2$O | 0.02 | 0.07 | 0.01 |

TABLE 3-continued

Composition of $Al_2O_3$ rich phases in Example 9

| Component (wt. %) | 1 | 2 | 3 |
|---|---|---|---|
| $Al_2O_3$ | 70.00 | 58.04 | 62.64 |
| $ZrO_2$ | 1.18 | 6.59 | 7.01 |
| CaO | 0.01 | 0.06 | 0.01 |
| MgO | 0.01 | 0.06 | 0.03 |
| $Fe_2O_3$ | 0.25 | 0.34 | 0.24 |
| $TiO_2$ | 0.21 | 0.21 | 0.18 |
| $Ta_2O_5$ | 0.00 | 0.00 | 0.00 |
| Total (wt. %) | 100.00 | 100.00 | 100.00 |

Turning to conventional examples, multiple conventional compositions were prepared, formed into conventional component material and tested for comparison to zircon body material formed according to embodiments described herein.

Table 3 summarizes the composition of the conventional mixtures, component composition of formed conventional material and measured physical characteristics of the formed convention material, including creep deformation rates measured using a 3-point bend test, creep deformation rates measured using a 4-point bend test, short term blister values and long term blister values, for conventional Examples C1-C3.

TABLE 4

Example Conventional Materials

| Example #'s | C1 | C2 | C3 |
|---|---|---|---|
| Components of Zircon Mixture (wt. % of total mixture) | | | |
| $ZrSiO_4$ | 97.50 | | |
| $ZrSiO_4$-1.5% $SiO_2$ | | 99.00 | 99.00 |
| $Ta_2O_5$ | 1.00 | 1.00 | 1.00 |
| $Al_2O_3$ | | | |
| $SiO_2$ | 1.50 | | |
| $TiO_2$ | | | |
| $Yb_2O_3$ | | | |
| $Y_2O_3$ | | | |
| Mullite | | 2 | |
| Total | 100.00 | 100.00 | 100.00 |
| Components of Formed Zircon Material (wt. % of total material) | | | |
| $ZrO_2$ + $HfO_2$ | | | 64.10 |
| $ZrO_2$ | | | 62.84 |
| $SiO_2$ | | | 33.60 |
| $Ta_2O_5$ | | | 0.95 |
| $Al_2O_3$ | | | 0.44 |
| $TiO_2$ | | | 0.16 |
| $Yb_2O_3$ | | | <0.1 |
| $Y_2O_3$ | | | <0.1 |
| $P_2O_5$ | | | 0.37 |
| $Fe_2O_3$ | | | 0.12 |
| $HfO_2$ | | | 1.26 |

TABLE 4-continued

Example Conventional Materials

| Example #'s | C1 | C2 | C3 |
|---|---|---|---|
| Properties of Formed Zircon Material | | | |
| Apparent Porosity (%) | 2.50 | 5.50 | 4.20 |
| Density (g/cc) | 4.24 | 4.20 | 4.13 |
| Creep Rate Measured by 3-Pts Test (×1E−6/h) | | | |
| Creep 1300° C./2 MPa | 72.0 | 40.0 | |
| Creep 1325° C./2 MPa | | 74.2 | |
| Creep 1350° C./2 MPa | | 128.0 | 106.0 |
| Creep Rate Measured by 4-Pts Test (×1E−6/h) | | | |
| Creep 1275° C./2 MPa | | | 6.0 |
| Creep 1300° C./2 MPa | | | 11.8 |
| Creep 1325° C./2 MPa | | | 27.4 |
| Creep 1350° C./2 MPa | | | 49.5 |
| Short Term Blistering Value (bubbles per mm2) | | | |
| Blistering LCD A - 1200 C.- 8 h | | 12 | 8 |
| Long Term Blistering Value (bubbles per mm2) | | | |
| Blistering LCD A - 1200 C.- 360 h | | | 1 |

Conventional Examples C1 and C2 were formed from a combination of unprocessed raw materials. The combined materials were then dry mixed and the batch mixture was pressed into a block shape in a cold isostatic press at room temperature under a pressure of 100 MPa and 180 MPa. The blocks were then sintered at a maximum temperature of 1600° C. for 30 h. Conventional Example C3 was formed from a combination of unprocessed raw materials. The combined materials were then spray dried and the spray dried granules were pressed into a block shape in a cold isostatic press at room temperature under a pressure of 100 MPa and 180 MPa. The blocks were then sintered at a maximum temperature of 1600° C. for 30 h.

Figure 4:
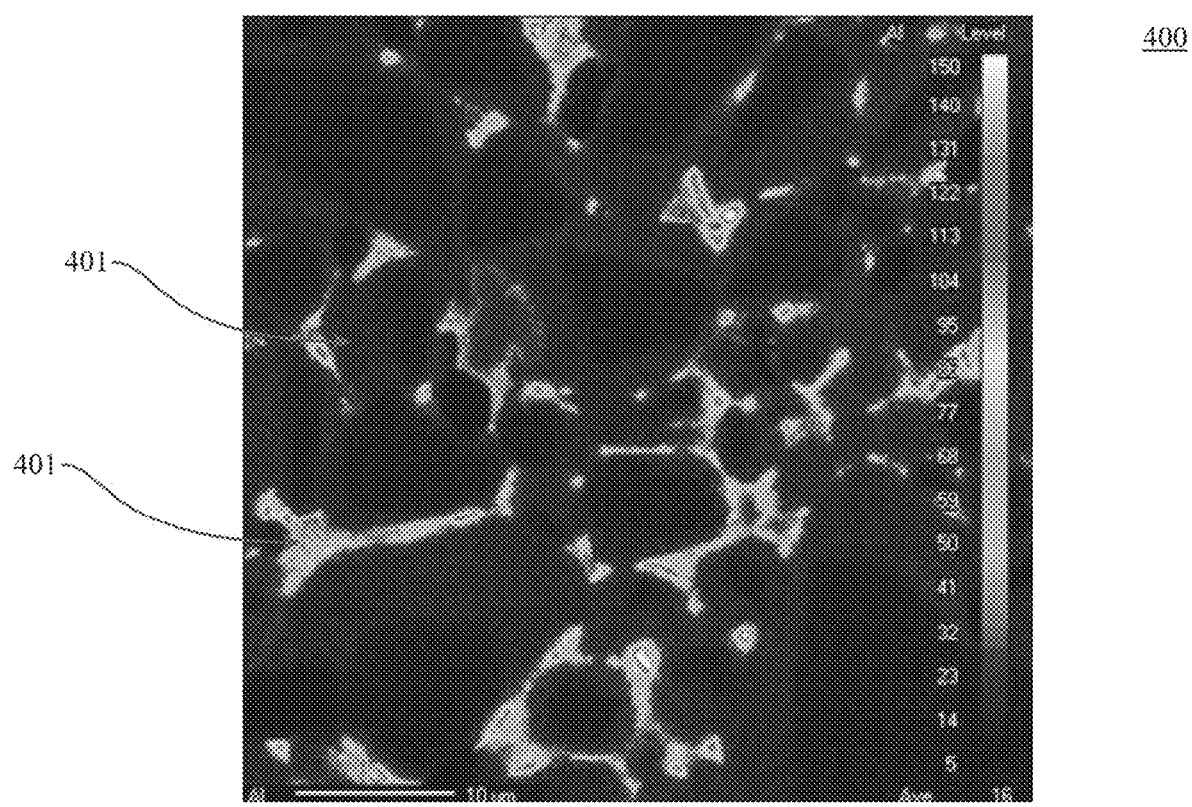
FIG. 4 includes an energy dispersive X-ray spectroscopy map of the microstructure of a conventional zircon body.

The formed conventional material of Example C3 was also analyzed with a scanning electron microscopy (SEM) and with wavelength dispersive X-ray spectroscopy. FIG. 4 illustrates a wavelength dispersive X-ray spectroscopy map 400 having intergranular phases 401. FIG. 4 shows that no $Al_2O_3$ rich phases larger than about 1 micron were formed in the conventional material of Example C3.

Table 5 summarizes the composition of intergranular phases 401 from Example C3 as shown in the wavelength dispersive X-ray spectroscopy map 400 of FIG. 4. Notably, the intergranular phases 401 showed a content of less than 10 wt. % $Al_2O_3$. Results are normalized so that the sum of all analyzed constituents adds up to 100 wt. %.

TABLE 5

Composition of intergranular phases in Example C3

| Component (wt. %) | 1 | 2 | 3 | 4 | 5 | 6 | 7 | 8 | 9 | 10 |
|---|---|---|---|---|---|---|---|---|---|---|
| $SiO_2$ | 74.22 | 80.07 | 75.99 | 81.36 | 82.08 | 73.00 | 77.55 | 71.94 | 76.68 | 79.23 |
| $Na_2O$ | 0.09 | 0.30 | 0.33 | 0.42 | 0.33 | 0.57 | 0.39 | 0.44 | 0.44 | 0.41 |
| $Al_2O_3$ | 7.95 | 7.35 | 7.71 | 8.06 | 8.23 | 7.21 | 7.81 | 7.42 | 7.42 | 7.83 |
| $ZrO_2$ | 10.56 | 5.38 | 9.02 | 1.83 | 1.79 | 9.21 | 6.06 | 13.41 | 2.53 | 4.87 |
| CaO | 1.64 | 1.53 | 1.51 | 1.49 | 1.56 | 1.40 | 1.67 | 1.51 | 1.40 | 1.62 |
| MgO | 0.53 | 0.42 | 0.48 | 0.55 | 0.51 | 0.61 | 0.55 | 0.50 | 0.73 | 0.55 |
| $Fe_2O_3$ | 0.17 | 0.14 | 0.17 | 0.25 | 0.17 | 0.48 | 0.21 | 0.15 | 0.69 | 0.19 |
| $TiO_2$ | 0.60 | 0.58 | 0.50 | 0.65 | 0.57 | 0.83 | 0.64 | 0.47 | 1.09 | 0.68 |
| $Ta_2O_5$ | 3.91 | 3.96 | 3.96 | 5.08 | 4.38 | 6.36 | 4.75 | 3.82 | 8.81 | 4.38 |
| $P_2O_5$ | 0.34 | 0.26 | 0.36 | 0.31 | 0.39 | 0.33 | 0.40 | 0.35 | 0.23 | 0.24 |
| Total (wt. %) | 100.00 | 100.00 | 100.00 | 100.00 | 100.00 | 100.00 | 100.00 | 100.00 | 100.00 | 100.00 |

The present application represents a departure from the state of the art. Notably, the embodiments herein demonstrate improved and unexpected performance over zircon components formed according to conventional methods. While not wishing to be bound to a particular theory, it is suggested that the combination of certain contents of materials in the raw zircon material mixture and in the formed zircon body material, including for example, contents of alumina containing compositions, contents of $SiO_2$, content of sintering aids and ratios of these components to each other facilitate the formation a refractory object or component having a unique combination of features, including but not limited to, low creep deformation rates at high temperatures, low blistering values, large $Al_2O_3$ rich intergranular phases, free silica distribution, free silica content in the finally formed zircon component, apparent porosity of the finally formed zircon component.

Note that not all of the activities described above in the general description or the examples are required, that a portion of a specific activity may not be required, and that one or more further activities may be performed in addition to those described. Still further, the orders in which activities are listed are not necessarily the order in which they are performed. Any values of properties or characteristics of the embodiments herein can represent average or median values derived from a statistically relevant sample size. Unless otherwise stated, it will be appreciated that compositions are based on a total of 100% and the total content of the components does not exceed 100%.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention.

As used herein, the terms "comprises", "comprising", "includes", "including", "has", "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A refractory object comprising: a zircon body, wherein the zircon body comprises:
   at least 1.0 wt. % and not greater than 5 wt. % of an $Al_2O_3$ containing component for a total weight of the zircon body;
   at least 25 wt. % and not greater than 30.0 wt. % of a $SiO_2$ component in wt. % for a total weight of the zircon body; and
   a ratio $CB_{SiO2}/CB_{AlC}$ of at least 5 and not greater than 30, wherein $CB_{SiO2}$ represents a content of a $SiO_2$ component in wt. % for a total weight of the zircon body and $CB_{AlC}$ represents a content of the $Al_2O_3$ containing component in wt. % for a total weight of the zircon body.

2. The refractory object of claim 1, wherein the zircon body comprises a ratio $CB_{SiO2}/CB_{AlC}$ of at least about 10.

3. The refractory object of claim 1, wherein the zircon body comprises a ratio $CB_{SiO2}/CB_{AlC}$ of not greater than about 25.

4. The refractory object of claim 1, wherein the zircon body comprises a content of zircon of at least about 50 wt. % for a total weight of the zircon body.

5. The refractory object of claim 1, wherein the zircon body comprises a creep deformation rate of not greater than about 1.0 E-4 $h^{-1}$ as measured using a three point bend test at a temperature of 1350° C. and a stress of 2 MPa.

6. The refractory object of claim 1, wherein the zircon body comprises a creep deformation rate of not greater than about 4.9 E-5 $h^{-1}$ as measured using a four point bend test at a temperature of 1350° C. and a stress of 2 MPa.

7. The refractory object of claim 1, wherein the zircon body has a density of not greater than about 4.5 g/cm³.

8. The refractory object of claim 1, wherein the zircon body comprises an apparent porosity of not greater than about 15 vol. % for a total volume of the zircon body.

9. The refractory object of claim 1, wherein the zircon body comprises a blistering value of not greater than about 8 bubbles per mm² measured after 8 hours at a temperature of 1200° C.

10. The refractory object of claim 1, wherein the zircon body comprises a blistering value of not greater than about 1 bubble per mm² measured after 360 hours at a temperature of 1200° C.

11. The refractory object of claim 1, wherein the zircon body comprises a ratio of $CB_{AlC}/CB_Z$ of not greater than about 0.08, where $CB_{AlC}$ represents a content of the $Al_2O_3$ containing component in wt. % for a total weight of the zircon body and CBz represents a content of zircon in wt. % for the total weight of the zircon body.

12. The refractory object of claim 1, wherein the zircon body comprises a ratio of $CB_{AlC}/CB_Z$ of at least about 0.002, where $CB_{AlC}$ represents a content of the $Al_2O_3$ containing component in wt. % for a total weight of the zircon body and CBz represents a content of zircon in wt. % for the total weight of the zircon body.

13. The refractory object of claim 1, wherein the zircon body comprises a ratio $CB_{Ta2O5}/CB_{SiO2}$ of at least about 0.001, where $CB_{Ta2O5}$ represents a content of $Ta_2O_5$ in wt. % for a total weight of the zircon body and $CB_{SiO2}$ represents a content of a $SiO_2$ component in wt. % for a total weight of the zircon body.

14. The refractory object of claim 1, wherein the zircon batch comprises a ratio $CM_{Ta2O5}/CM_{SiO2}$ of not greater than about 0.5, where $CM_{Ta2O5}$ represents a content of $Ta_2O_5$ in wt. % for a total weight of the zircon batch and $CM_{SiO2}$ represents a content of a $SiO_2$ component in wt. % for a total weight of the zircon batch.

15. The refractory object of claim 1, wherein the $Al_2O_3$ containing component comprises mullite.

16. The refractory object of claim 15, wherein the mullite comprises $Al_6Si_2O_{13}$.

* * * * *